(12) United States Patent
Oyamada et al.

(10) Patent No.: US 6,535,526 B1
(45) Date of Patent: Mar. 18, 2003

(54) ATM CELL COMPRESSION DEVICE AND ATM CELL RECOVERY DEVICE, ATM CELL COMPRESSION RECOVERY DEVICE, ATM CELL COMPRESSION RECOVERY SYSTEM, AND ATM CELL COMPRESSION RECOVERY METHOD

(75) Inventors: Hisashi Oyamada, Kawasaki (JP); Akira Tokunaga, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/277,889

(22) Filed: Mar. 29, 1999

(30) Foreign Application Priority Data

Jul. 24, 1998 (JP) .......................................... 10-210039

(51) Int. Cl.$^7$ ............................................... H04L 12/50
(52) U.S. Cl. ..................................... 370/477; 370/395.1
(58) Field of Search ............................... 370/345.1, 465, 370/428, 395.64, 395.65, 400, 444, 445, 401, 477, 216, 218, 219, 227, 228, 229–231, 235, 237, 384, 394, 398, 412, 411, 443, 461, 351, 352, 409, 397, 395.31, 395.41, 395.42, 395.51, 395.6, 395.7, 395.1, 395.71

(56) References Cited

U.S. PATENT DOCUMENTS 5,926,477 A * 7/1999 Shirokura et al. .......... 370/352
6,032,197 A * 2/2000 Birdwell et al. ............ 709/247
6,300,887 B1 * 10/2001 Le ................................ 341/60

FOREIGN PATENT DOCUMENTS

JP        5-244104       9/1993
JP        9-331330       12/1997

* cited by examiner

Primary Examiner—Dang Ton
(74) Attorney, Agent, or Firm—Katten Muchin Zavis Rosenman

(57) ABSTRACT

An ATM cell compression recovery device includes an ATM cell recovery device having a compressed cell determination unit that determines whether an ATM cell from a transmission line is a compressed cell, a cell recovery unit that recovers the determined compressed cell in an ATM layer into an original ATM cell, and a switch that switches the recovered ATM cell. The ATM cell compression recovery device also includes a compression object cell determination unit that determines whether ATM cells received from the switch on an identified path have been compressed, and a compressed cell production unit that compresses the ATM cell in an ATM layer to be transmitted on the identified part. With this device, data is compressed and recovered in the ATM layer of the ATM network.

16 Claims, 47 Drawing Sheets

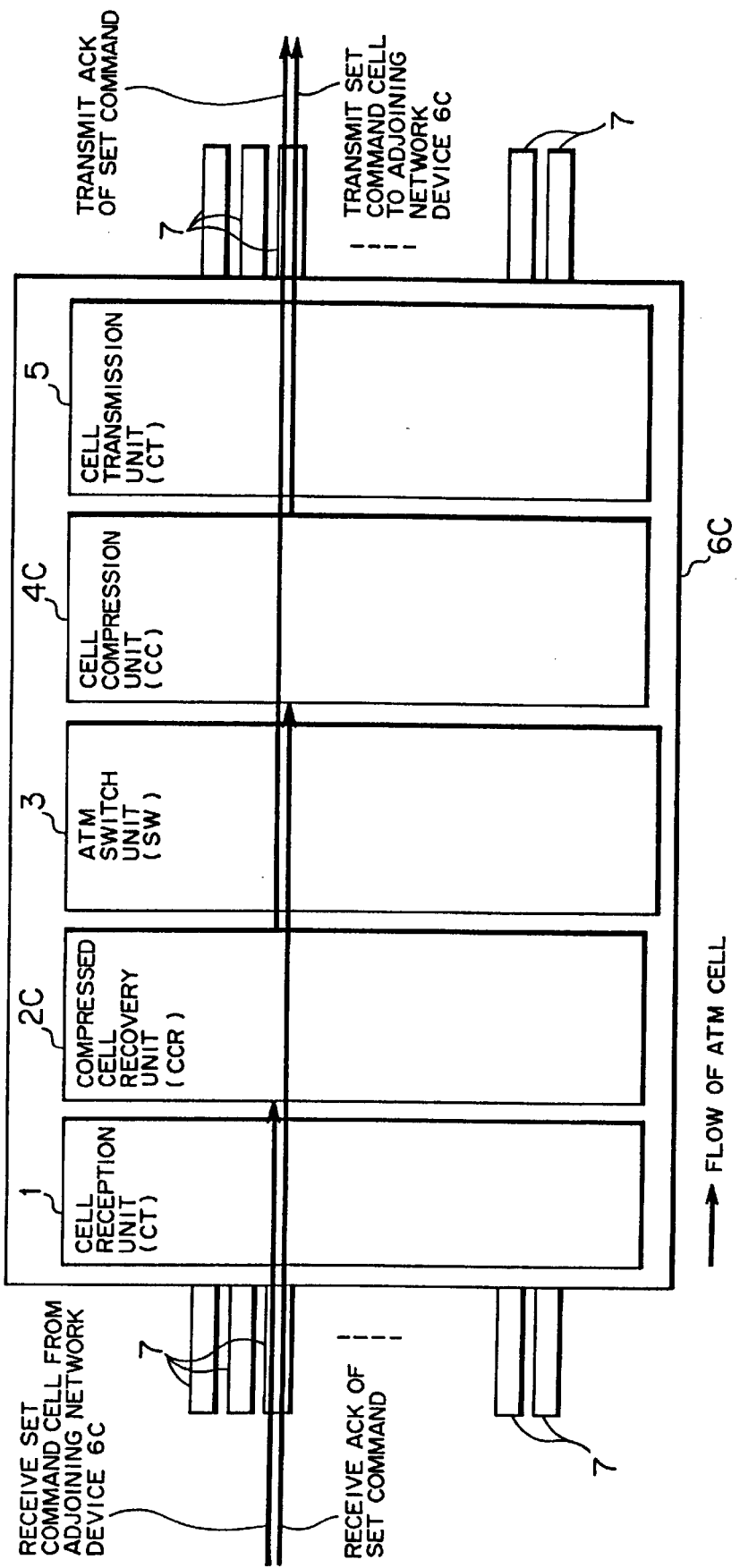

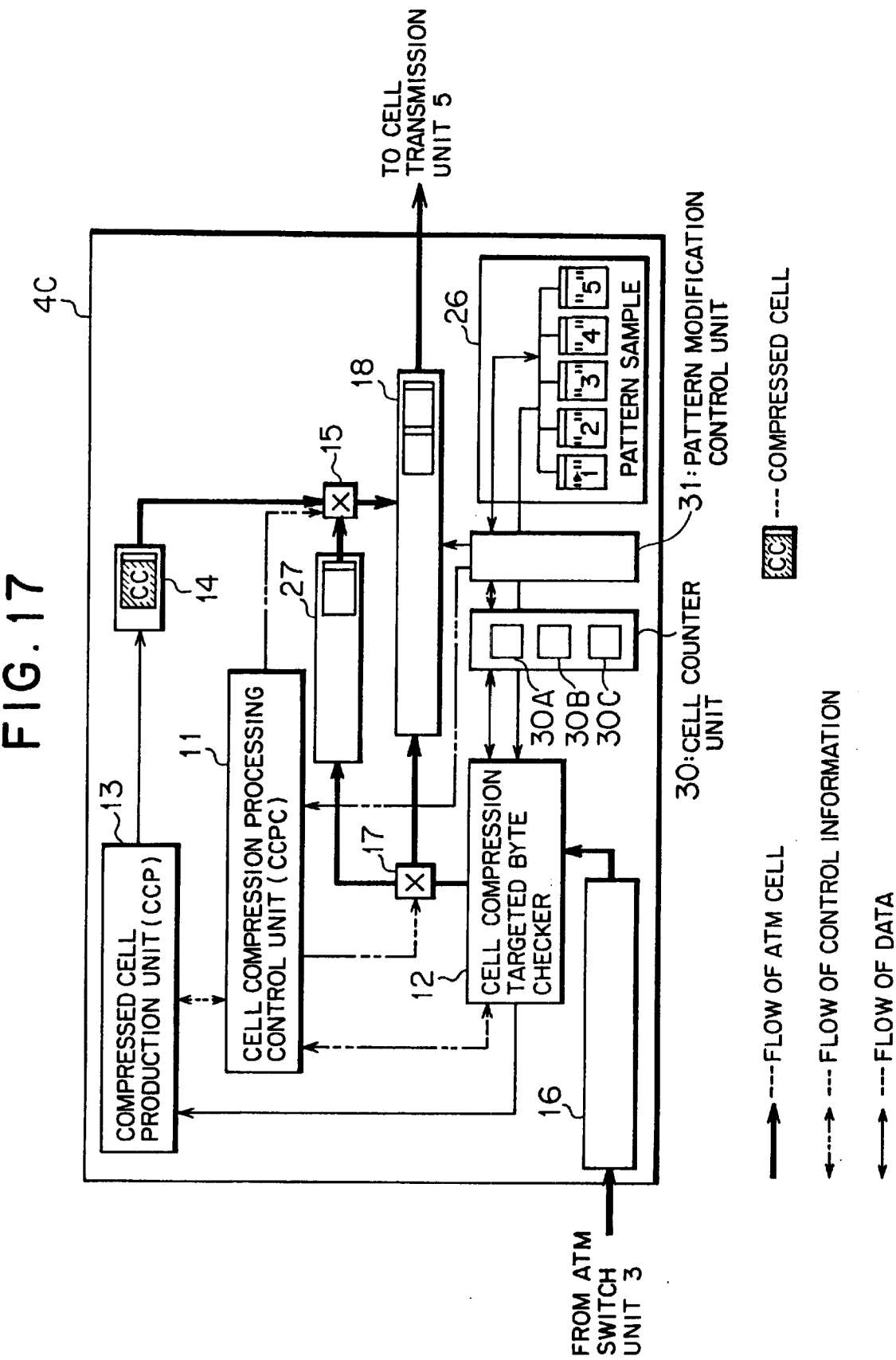

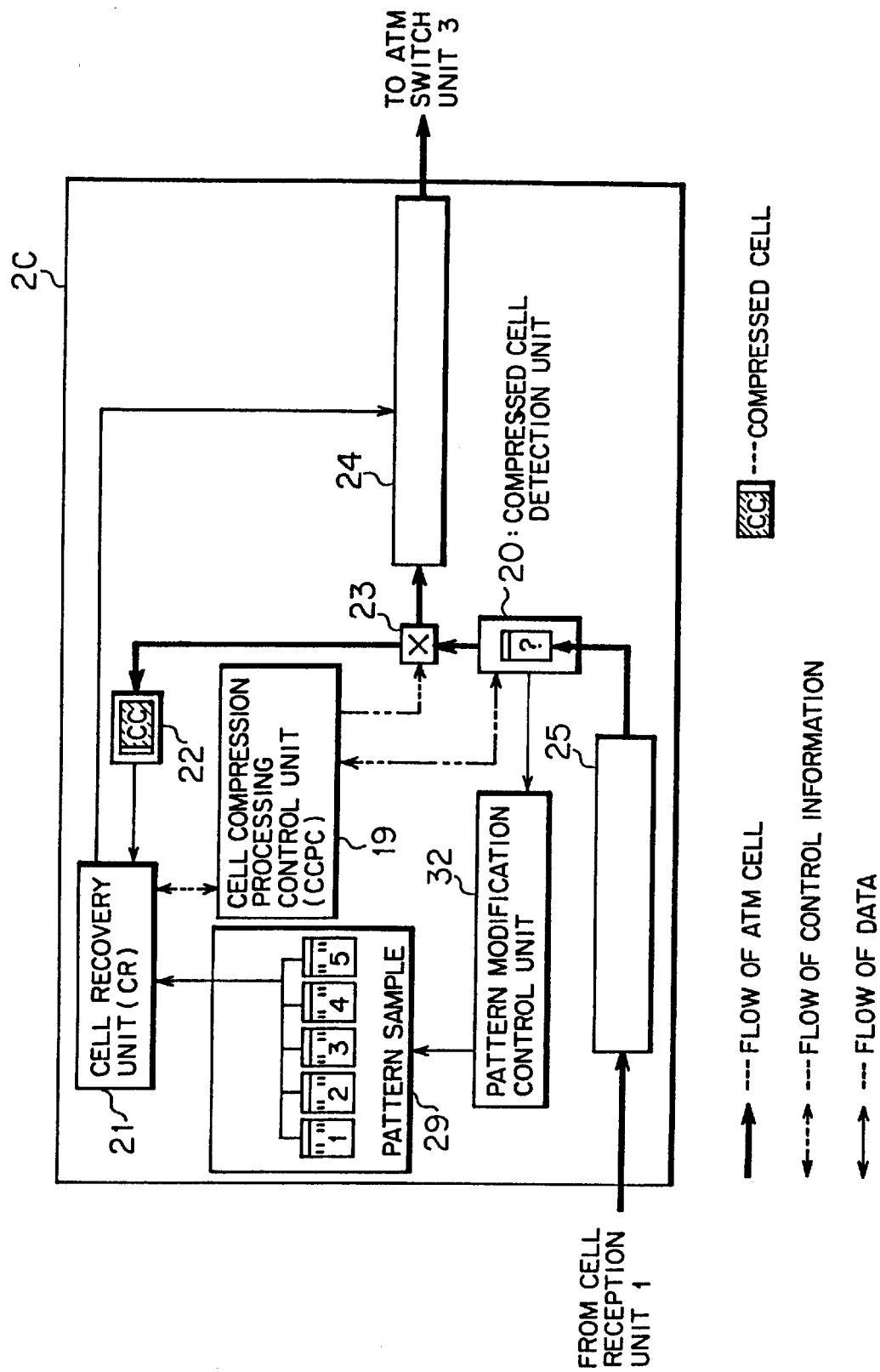

FIG. 19

| ORDER | COUNT NUMBER | STATUS |
|---|---|---|
| 1 | FREQUENCY (X1) IN WHICH PATTERN SAMPLE OF PATTERN SAMPLE NUMBER "1" COINCIDED WITH | OBJECT |
| 2 | FREQUENCY (X2) IN WHICH PATTERN SAMPLE OF PATTERN SAMPLE NUMBER "2" COINCIDED WITH | OBJECT |
| 3 | FREQUENCY (X3) IN WHICH PATTERN SAMPLE OF PATTERN SAMPLE NUMBER "3" COINCIDED WITH | UNDER MODIFICATION |
| 4 | FREQUENCY (X4) IN WHICH PATTERN SAMPLE OF PATTERN SAMPLE NUMBER "4" COINCIDED WITH | UNDER MODIFICATION |
| 5 | FREQUENCY (X5) IN WHICH PATTERN SAMPLE OF PATTERN SAMPLE NUMBER "5" COINCIDED WITH | OBJECT |
| --- | --- | --- |
| P | FREQUENCY (XP) IN WHICH PATTERN SAMPLE OF PATTERN SAMPLE NUMBER "P" COINCIDED WITH | OBJECT |
| P+1 | FREQUENCY (XP+1) IN WHICH PATTERN SAMPLE OF PATTERN SAMPLE CANDIDATE NUMBER "P+1" COINCIDED WITH | CANDIDATE |
| P+2 | FREQUENCY (XP+2) IN WHICH PATTERN SAMPLE OF PATTERN SAMPLE CANDIDATE NUMBER "P+2" COINCIDED WITH | CANDIDATE |
| P+3 | FREQUENCY (XP+3) IN WHICH PATTERN SAMPLE OF PATTERN SAMPLE CANDIDATE NUMBER "P+3" COINCIDED WITH | CANDIDATE |
| P+4 | FREQUENCY (XP+4) IN WHICH PATTERN SAMPLE OF PATTERN SAMPLE CANDIDATE NUMBER "P+4" COINCIDED WITH | CANDIDATE |
| P+5 | FREQUENCY (XP+5) IN WHICH PATTERN SAMPLE OF PATTERN SAMPLE CANDIDATE NUMBER "P+5" COINCIDED WITH | CANDIDATE |
| --- | --- | --- |
| P+PCA | FREQUENCY (XP+PCA) IN WHICH PATTERN SAMPLE OF PATTERN SAMPLE CANDIDATE NUMBER "P+PCA" COINCIDED WITH | CANDIDATE |

P --- NUMBER OF PRESENTLY COMPRESSIBLE PAYLOAD
PCA --- NUMBER OF COMPRESSIBLE PAYLOAD CANDIDATE

| ORDER | 1 | 2 | 3 | 4 | 5 | ... | P | P+1 | P+2 | P+3 | P+4 | P+5 | ... | P+PCA |
|---|---|---|---|---|---|---|---|---|---|---|---|---|---|---|
| RETRANSMISSION FREQUENCY | - | - | 2 | 1 | - | ... | - | - | - | 1 | - | - | ... | - |

ATM CELL COMPRESSION DEVICE AND ATM CELL RECOVERY DEVICE, ATM CELL COMPRESSION RECOVERY DEVICE, ATM CELL COMPRESSION RECOVERY SYSTEM, AND ATM CELL COMPRESSION RECOVERY METHOD

BACKGROUND OF THE INVENTION

1. Field of the Invention

The present invention relates to an ATM cell compression device and ATM cell recovery (decompression) device, ATM cell compression recovery (decompression) device, ATM cell compression recovery system, and ATM cell compression recovery method that are suitable for use in the enhancement of data transmission efficiency in the ATM (Asynchronous Transfer Mode) network to which the ATM system is applied.

2. Description of Related Art

In a data transmission by the ATM system, the data are not transmitted in a fixed timing as in a data transmission by the conventional STM (Synchronous Transfer Mode) system, but are transmitted in an arbitrary timing by treating each data cell as a fixed length, to which the identification information of a destination is attached.

Accordingly, in the data transmission by the ATM system, when there is a vacant band without data transmitted, it is possible to utilize the band with efficiency by allocating arbitrary data according to the contract of a service quality.

Therefore, generally in a certain band are multiplexed the cells of various service categories from a plurality of end users. Accordingly, the ATM system is suitable for providing multimedia services that are different in the transmission speeds.

Further, the service category by the ATM system includes CBR, rtVBR, nrtVBR, ABR, UBR, etc., and these service categories include the priorities of securing the band.

However, in a lower priority service area, the cells can be nullified in case the band cannot be secured. In such a case, the service quality cannot be maintained, which is a problem.

That is, in a lower priority service category, in case there is not a vacancy in the band, data are queued in a buffer in the ATM switch, and the data are transmitted when the band is secured. In the UBR of a low priority, for example, since this UBR is a service in which the band securement is not provided, when the band for transmission is not available and the cells whose quantity exceeds the capacity of the foregoing buffer are queued, the cells are subjected to nullification, and thus the service quality will be lowered.

Accordingly, in the conventional ATM network, end users transmit data compressed in the upper application layer to thereby reduce cells that are nullified, thus lowering the cell loss rate.

However, due to the recent widespread of the internet and advancement of peripheral hardware, the data transmitted by end users are anticipated to increase, and it is expected even more strongly to use the band effectively in the ATM network where these data are multiplexed.

Therefore, it is preferable to compress the data not only in the upper application layer by the end users, but in the ATM nodes being the repeating points of the ATM network; however, the conventional ATM network has not ever performed the compression of data in the lower ATM layer, or the recovery of the compressed data in the ATM layer.

SUMMARY OF THE INVENTION

The present invention has been made in view of the foregoing problems, and it is therefore an object to provide an ATM cell compression device and ATM cell recovery device, ATM cell compression recovery device, ATM cell compression recovery system, and ATM cell compression recovery method, wherein the data compression and recovery is performed in the ATM layer so that the cell loss rate can be lowered to maintain and enhance the service quality and the congestion of transmission lines can be reduced.

In order to accomplish the foregoing object, the ATM cell compression device of the invention comprises a compression object cell determination unit that determines whether an inputted ATM cell is a compression object cell, and a compressed cell production unit that, when the compression object cell determination unit determines that the ATM cell is a compression object cell, applies a compression processing to the ATM cell in an ATM layer to produce a compressed cell.

Concretely, the ATM cell compression device of the invention comprises a compression pattern sample storage unit that stores a compression pattern sample of a compression object cell, wherein the compression object cell determination unit determines whether the ATM cell is a compression object cell on the basis of the compression pattern sample stored in the compression pattern sample storage unit.

Here, the compression pattern sample storage unit may be constructed so as to modify the compression pattern sample stored in the compression pattern sample storage unit.

In this case, it is needed to construct such that the compression pattern sample storage unit updates the compression pattern sample of a plurality of compression pattern samples stored in the compression pattern sample storage unit, serving a pattern sample having a high coincidence with inputted ATM cells as a compression pattern sample having a high priority.

Further, the ATM cell compression device of the invention may be comprised of a transmission cell storage unit that stores an ATM cell to be transmitted, and a transmission cell monitor unit that requests the compressed cell production unit to produce a compressed cell, when the ATM cell in the transmission cell storage unit which is to be transmitted comes into a state of waiting.

Thus, according to the ATM cell compression device of the invention, the compression processing can be applied to an inputted ATM cell to produce a compressed cell; and therefore, the ATM cell quantity transmitted through the ATM network can be reduced and the bands can be utilized by the cell compression in the different communication bands. Therefore, the cell loss rate can be lowered and the service quality can be maintained and enhanced; and since the retransmission processing caused by the cells being lost can be reduced, the congestion of the transmission lines can be reduced, which is advantageous.

And, according to the ATM cell compression device of the invention, the compression pattern sample can be modified which is stored in the compression pattern sample storage unit; and therefore, the types of the pattern samples can be optimized to enhance the patternizing rate, which is advantageous.

Further, the ATM cell recovery device is provided with a compressed cell determination unit that determines whether an ATM cell inputted from an opposite ATM cell compression device is a compressed cell, and a cell recovery unit that, when the compressed cell determination unit determines that the ATM cell is a compressed cell, applies a recovery processing to the ATM cell in an ATM layer to recover the compressed cell into the original ATM cell.

Concretely, the ATM cell recovery device of the invention comprises a recovery pattern sample storage unit that stores a recovery pattern sample of an original ATM cell corresponding to a compressed cell, and when the compressed cell determination unit determines that the ATM cell is a compressed cell, the cell recovery unit recovers the compressed cell into the original ATM cell on the basis of the recovery pattern sample stored in the recovery pattern sample storage unit.

Here, the recovery pattern sample storage unit may be constructed so as to modify the recovery pattern sample stored in the recovery pattern sample storage unit.

In this case, it is needed to construct such that the recovery pattern sample storage unit updates the recovery pattern sample of a plurality of recovery pattern samples stored in the recovery pattern sample storage unit, serving a pattern sample having a high coincidence with the original ATM cell corresponding to an inputted compressed cell as a recovery pattern sample having a high priority.

Thus, according to the ATM cell recovery device of the invention, the recovery processing can be applied to a compressed cell produced by the compression processing that has been applied in the ATM layer, and the compressed cell can be recovered into the original ATM cell; and therefore, the ATM cell quantity transmitted through the ATM network can be reduced and the bands can be utilized by the cell compression in the different communication bands. Therefore, the cell loss rate can be lowered and the service quality can be maintained and enhanced; and since the retransmission processing caused by the cells being lost can be reduced, the congestion of the transmission lines can be reduced, which is advantageous.

And, according to the ATM cell recovery device of the invention, the recovery pattern sample stored in the recovery pattern sample storage unit can be modified to follow the modification contents of the compression pattern sample; and therefore, the types of the pattern samples can be optimized to enhance the patternizing rate, which is advantageous.

Further, the ATM cell compression recovery device of the invention comprises an ATM cell recovery device, a switch device, and an ATM cell compression device. The ATM cell recovery device includes a compressed cell determination unit that determines whether an ATM cell inputted from an opposite ATM cell compression device through a transmission line is a compressed cell, and a cell recovery unit that, when the compressed cell determination unit determines that the ATM cell is a compressed cell, applies a recovery processing to the ATM cell in an ATM layer to recover the compressed cell into an original ATM cell. The switch device applies a switching processing to an ATM cell recovered by the ATM cell recovery device. And, the ATM cell compression device includes a compression object cell determination unit that determines whether an ATM cell outputted from the switch device toward an identical path is a compression object cell, and a compressed cell production unit that, when the compression object cell determination unit determines that the ATM cell is a compression object cell, applies a compression processing to the ATM cell in an ATM layer to produce a compressed cell.

Concretely, in the ATM cell compression recovery device of the invention, the ATM cell recovery device comprises a recovery pattern sample storage unit that stores a recovery pattern sample of an original ATM cell corresponding to a compressed cell, and when the compressed cell determination unit determines that the ATM cell is a compressed cell, the cell recovery unit recovers the compressed cell into the original ATM cell on the basis of the recovery pattern sample stored in the recovery pattern sample storage unit. And accordingly, the ATM cell compression device comprises a compression pattern sample storage unit that stores a compression pattern sample of a compression object cell, and the compression object cell determination unit determines whether the ATM cell is a compression object cell on the basis of the compression pattern sample stored in the compression pattern sample storage unit.

Further, the ATM cell compression recovery device of the invention comprises an ATM cell compression device and an ATM cell recovery device. The ATM cell compression device includes a compression object cell determination unit that determines whether an inputted ATM cell is a compression object cell, and a compressed cell production unit that, when the compression object cell determination unit determines that the ATM cell is a compression object cell, applies a compression processing to the ATM cell in an ATM layer to produce a compressed cell. And, the ATM cell recovery device includes a compressed cell determination unit that determines whether an ATM cell inputted from an opposite ATM cell compression device through a transmission line is a compressed cell, and a cell recovery unit that, when the compressed cell determination unit determines that the ATM cell is a compressed cell, applies a recovery processing to the ATM cell in an ATM layer to recover the compressed cell into the original ATM cell.

Concretely, in the ATM cell compression recovery device of the invention, the ATM cell compression device comprises a compression pattern sample storage unit that stores a compression pattern sample of a compression object cell, and the compression object cell determination unit determines whether the ATM cell is a compression object cell on the basis of the compression pattern sample stored in the compression pattern sample storage unit. And accordingly, the ATM cell recovery device comprises a recovery pattern sample storage unit that stores a recovery pattern sample of an original ATM cell corresponding to a compressed cell, and when the compressed cell determination unit determines that the ATM cell is a compressed cell, the cell recovery unit recovers the compressed cell into the original ATM cell on the basis of the recovery pattern sample stored in the recovery pattern sample storage unit.

Further, the ATM cell compression recovery system of the invention comprises an ATM cell compression device and an ATM cell recovery device. The ATM cell compression device includes a compression object cell determination unit that determines whether an inputted ATM cell is a compression object cell, and a compressed cell production unit that, when the compression object cell determination unit determines that the ATM cell is a compression object cell, applies a compression processing to the ATM cell in an ATM layer to produce a compressed cell. And, the ATM cell recovery device includes a compressed cell determination unit that determines whether an ATM cell inputted from the ATM cell compression device through a transmission line is a compressed cell, and a cell recovery unit that, when the compressed cell determination unit determines that the ATM cell is a compressed cell, applies a recovery processing to the ATM cell in an ATM layer to recover the compressed cell into the original ATM cell.

Concretely, in the ATM cell compression recovery system of the invention, the ATM cell compression device comprises a compression pattern sample storage unit that stores a compression pattern sample of a compression object cell, and the compression object cell determination unit determines whether the ATM cell is a compression object cell on the basis of the compression pattern sample stored in the compression pattern sample storage unit. And accordingly, the ATM cell recovery device comprises a recovery pattern sample storage unit that stores a recovery pattern sample of an original ATM cell corresponding to a compressed cell, and when the compressed cell determination unit determines that the ATM cell is a compressed cell, the cell recovery unit recovers the compressed cell into the original ATM cell on the basis of the recovery pattern sample stored in the recovery pattern sample storage unit.

In this case, the compression pattern sample storage unit may be constructed so as to modify the compression pattern sample stored in the compression pattern sample storage unit. And, the recovery pattern sample storage unit may be constructed so as to modify the recovery pattern sample stored in the recovery pattern sample storage unit, while following the modification contents of the compression pattern sample stored in the compression pattern sample storage unit.

Further, the ATM cell compression recovery method of the invention comprises an ATM cell compression step and an ATM cell recovery step. The ATM cell compression step contains a compression object cell determination step that determines whether an inputted ATM cell is a compression object cell, and a compressed cell production step that, when the compression object cell determination step determines that the ATM cell is a compression object cell, applies a compression processing to the ATM cell in an ATM layer to produce a compressed cell. And accordingly, the ATM cell recovery step contains a compressed cell determination step that determines whether an ATM cell produced by the ATM cell compression step transmitted through a transmission line is a compressed cell, and a cell recovery step that, when the compressed cell determination step determines that the ATM cell is a compressed cell, applies a recovery processing to the ATM cell in an ATM layer to recover the compressed cell into the original ATM cell.

In this case, the processings in the ATM cell compression step and the ATM cell recovery step may be executed in each ATM service category.

Further, the compression object cell determination step, the compressed cell production step, the compressed cell determination step, and the cell recovery step of the ATM cell compression recovery method may be constructed as follows. The compression object cell determination step determines whether the ATM cell is a compression object cell on the basis of the compression pattern sample. The compressed cell production step includes, when the compression object cell determination step determines that an ATM cell subsequent to the ATM cell determined to be the compression object cell is determined not to be a compression object cell, the compression pattern sample information corresponding to the ATM cell determined to be the compression object cell in the subsequent ATM cell to thereby produce the compressed cell. The compressed cell determination step determines whether an ATM cell produced by the ATM cell compression step transmitted through the transmission line is a compressed cell, on the basis of whether the concerned ATM cell contains the compression pattern sample information. And, when the compressed cell determination step determines that the ATM cell is a compressed cell, the cell recovery step recovers the compressed cell into the original ATM cell on the basis of the recovery pattern sample of the original ATM cell corresponding to the compression pattern sample information.

Thus, according to the ATM cell compression recovery device, the ATM cell compression recovery system, and the ATM cell compression recovery method, the compression processing can be applied to an inputted ATM cell in the ATM layer to produce a compressed cell, and the recovery processing can be applied to the compressed cell thus produced in the ATM layer to recover the original ATM cell; and therefore, the ATM cell quantity transmitted through the ATM network can be reduced and the bands can be utilized by the cell compression in the different communication bands. Therefore, the cell loss rate can be lowered and the service quality can be maintained and enhanced; and since the retransmission processing caused by the cells being lost can be reduced, the congestion of the transmission lines can be reduced, which is advantageous.

And, according to the ATM cell compression recovery system of the invention, the compression pattern sample stored in the compression pattern sample storage unit can be modified on one side, and the recovery pattern sample stored in the recovery pattern sample storage unit can be modified to follow the modification contents of the compression pattern sample; and therefore, the types of the pattern samples can be optimized to enhance the patternizing rate, which is advantageous.

BRIEF DESCRIPTION OF THE DRAWINGS

FIG. 16 is a block diagram of the network device as the ATM cell compression recovery device relating to the second embodiment of the invention;

FIG. 17 is a block diagram of the cell compression unit in the network device relating to the second embodiment of the invention;

FIG. 18 is a block diagram of the compressed cell recovery unit in the network device relating to the second embodiment of the invention;

FIG. 19 is a chart to explain a payload pattern counter;

DESCRIPTION OF THE PREFERRED EMBODIMENTS (a) Description of the Aspect of the Invention First, the aspect of the invention will be described with reference to the accompanying drawing.

Figure 1:
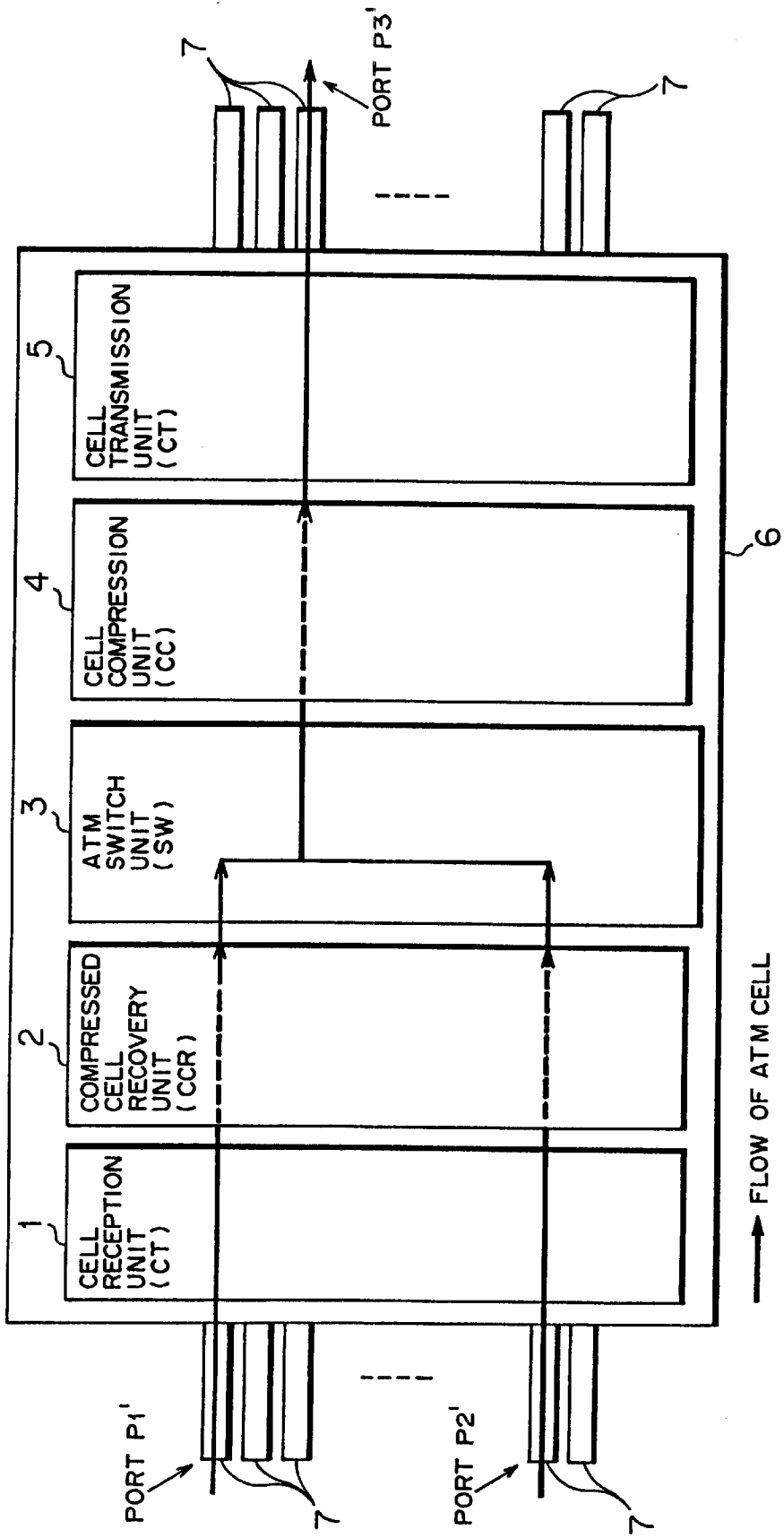
FIG. 1 is a block diagram to illustrate the aspect of a network device as an ATM cell compression recovery device of the invention.

FIG. 1 is a block diagram to illustrate the aspect of a network device as an ATM cell compression recovery device of the invention.

Figure 2:
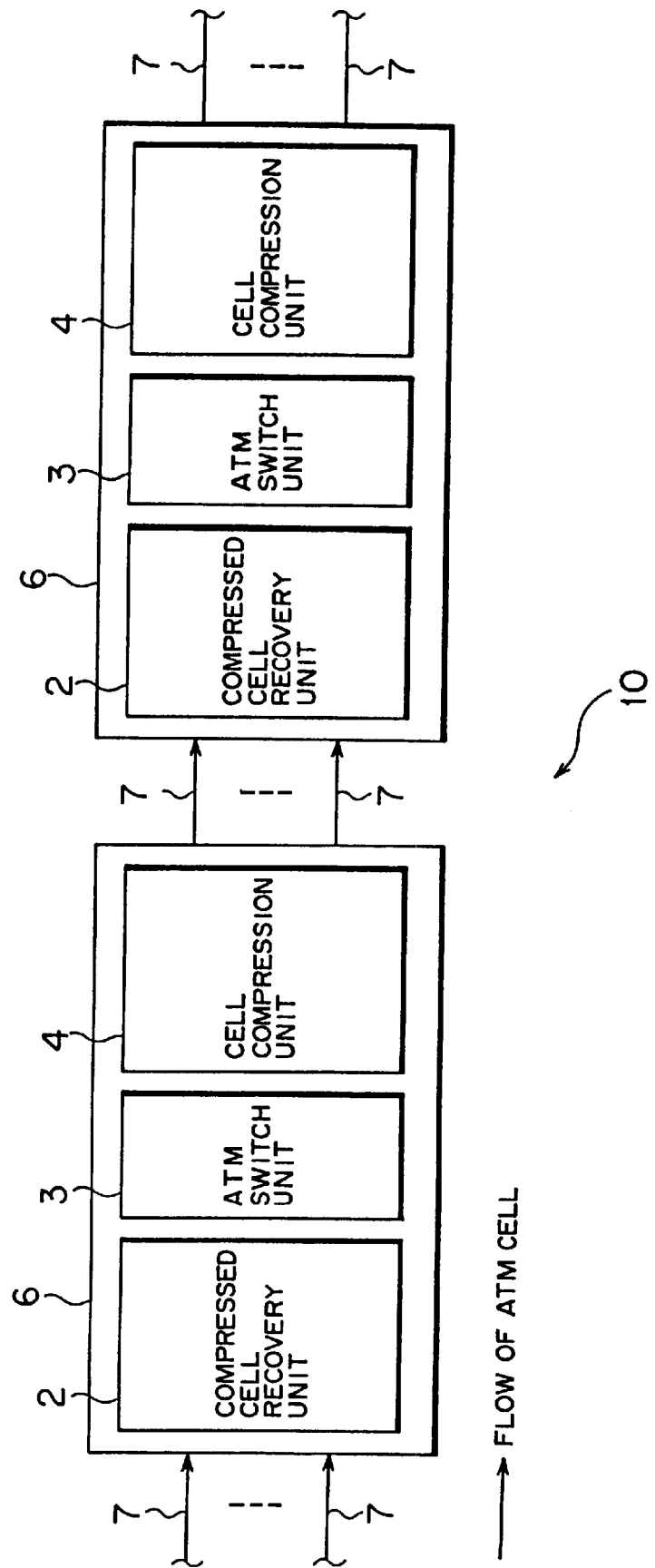
FIG. 2 is a block diagram of an ATM network as an ATM cell compression recovery system to which the network device shown in FIG. 1 is applied.

A network device 6 shown in FIG. 1 is an ATM switch to apply the switching processing of an ATM cell transmitted in an ATM network 10 as an ATM cell compression recovery system as shown in FIG. 2.

Here, the ATM network 10 is constructed by mutually connecting a plurality of the network devices 6 through transmission lines 7. FIG. 2 shows a case in which the ATM network 10 is constructed by connecting two network devices 6, however, the ATM network 10 can be constructed by more than three network devices 6.

Receiving an ATM cell (compressed cell) compressed in the ATM layer and an ATM cell (non-compressed cell) not compressed in the ATM layer through the transmission lines 7, the network device 6 applies the switching processing of each of the foregoing cells, and sends out the result. The network device 6 is provided with, as shown in FIG. 1, a cell reception unit (CT) 1, a compressed cell recovery unit (CCR) 2 as an ATM cell recovery device, an ATM switch unit (SW) 3 as a switch device, a cell compression unit (CC) 4 as an ATM cell compression device, and a cell transmission unit (CT) 5.

The cell reception unit 1 receives the ATM cells (compressed cell and non-compressed cell) coming in through the transmission lines 7 through each of the ports (see the symbols P1', P2').

The compressed cell recovery unit 2, detecting a compressed cell out of the received ATM cell flow, applies the recovery processing of the compressed cell in the ATM layer to recover the original ATM cell, and outputs the result to the ATM switch unit 3.

The ATM switch 3 switches the ATM cell into each port (see the symbol P3') in accordance with the value of VPI/VCI contained in the header of the received ATM cell.

The cell compression unit 4, detecting a compressible cell among the ATM cells after switched, applies the compression processing of the compressible ATM cell to produce a compressed cell, and outputs the produced compressed cell and the non-compressed cell to the cell transmission unit 5.

The cell transmission unit 5 sends out the ATM cell (compressed cell and non-compressed cell) received from the cell compression unit 4 through the transmission port (port P3' in FIG. 1).

Here, the network device 6 is additionally provided with the foregoing cell compression unit 4 and compressed cell recovery unit 2 in order that the compression and recovery of data can be performed in the ATM layer. The cell compression unit 4 and compressed cell recovery unit 2 will be described further with reference to FIG. 3 and FIG. 4.

Figure 3:
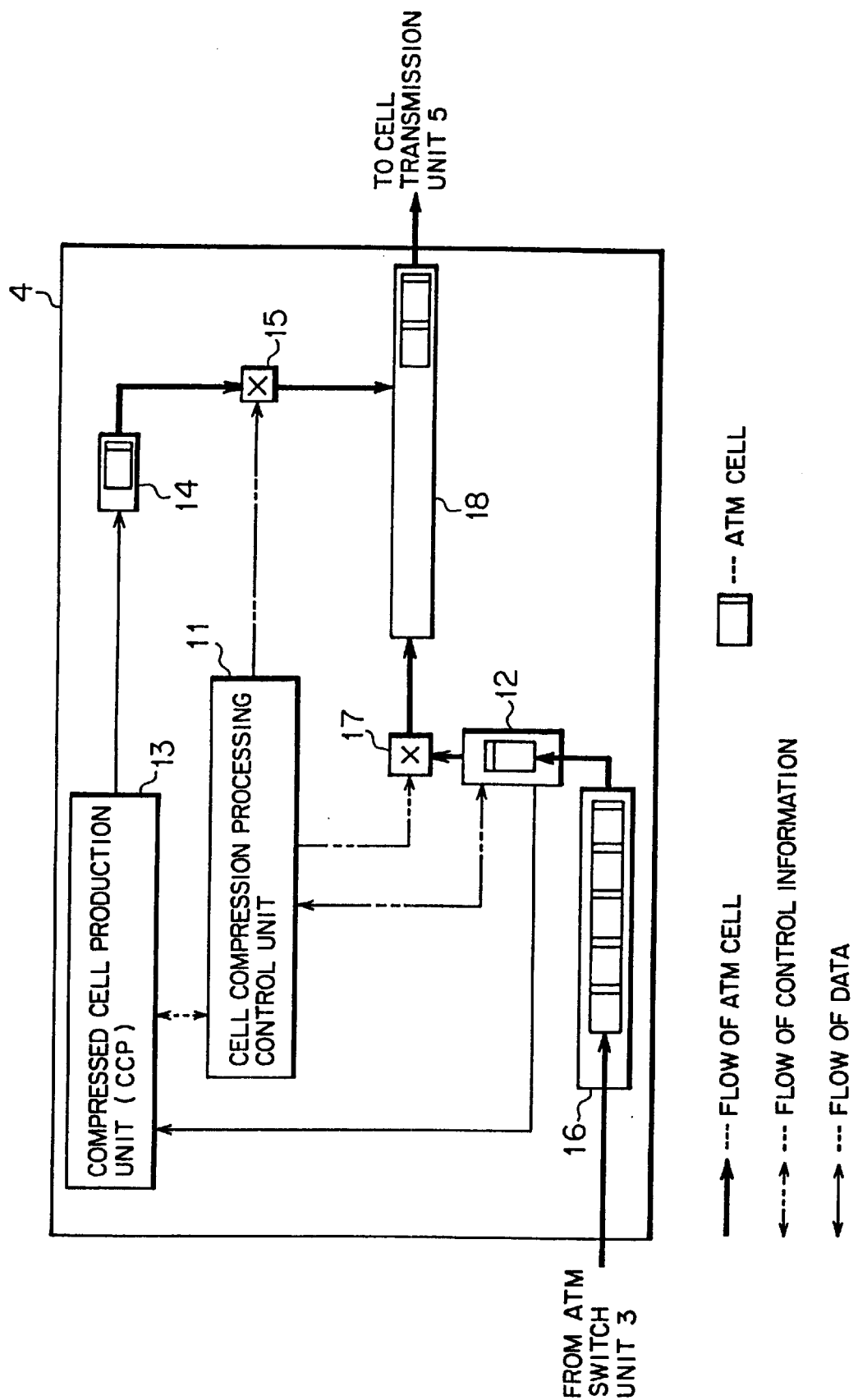
FIG. 3 is a block diagram of a cell compression unit in the network device shown in FIG. 1.

The cell compression unit 4 is provided with, as shown in FIG. 3, a cell compression processing control unit (CCPC) 11, a cell compression targeted byte checker (CCTBC) 12, a compressed cell production unit (CCP) 13, a compressed cell storage buffer (CCSB) 14, stream switch units (SS) 15 and 17, a cell compression inner buffer (CCIB) 16, and a transmission cell storage buffer (TCSB) 18 as a transmission cell storage unit.

The cell compression processing control unit 11 instructs each processing to each of the foregoing units in the cell compression unit 4, and synchronizes each processing according to the instruction.

To detect a compressible cell among inputted ATM cells, the cell compression targeted byte checker 12 determines whether an inputted ATM cell can be handled as a compression object cell, and notices the result to the cell compression processing control unit 11.

The compressed cell production unit 13, receiving an ATM cell determined as a compression object cell by the cell compression targeted byte checker 12, applies the compression processing to this ATM cell in the ATM layer to produce a compressed cell, and stores the produced compressed cell in the compressed cell storage buffer 14.

The compressed cell storage buffer 14 temporarily stores the compressed cell while the compressed cell production unit 13 sends out another compressed cell.

The stream switch unit 15 sends out the compressed cell in the compressed cell storage buffer 14 to the transmission cell storage buffer 18.

The cell compression inner buffer 16 is a buffer to keep subsequent ATM cells waiting, while the compression processing of an ATM cell is executed by the compressed cell production unit 13.

The stream switch unit 17 sends out an ATM cell determined as a non-compression object cell by the cell compression targeted byte checker 12 to the transmission cell storage buffer 18.

The transmission cell storage buffer 18 is a buffer where the ATM cells (compressed cells or non-compressed cells) are queued which are sent out to the cell transmission unit 5 shown in FIG. 1.

Figure 4:
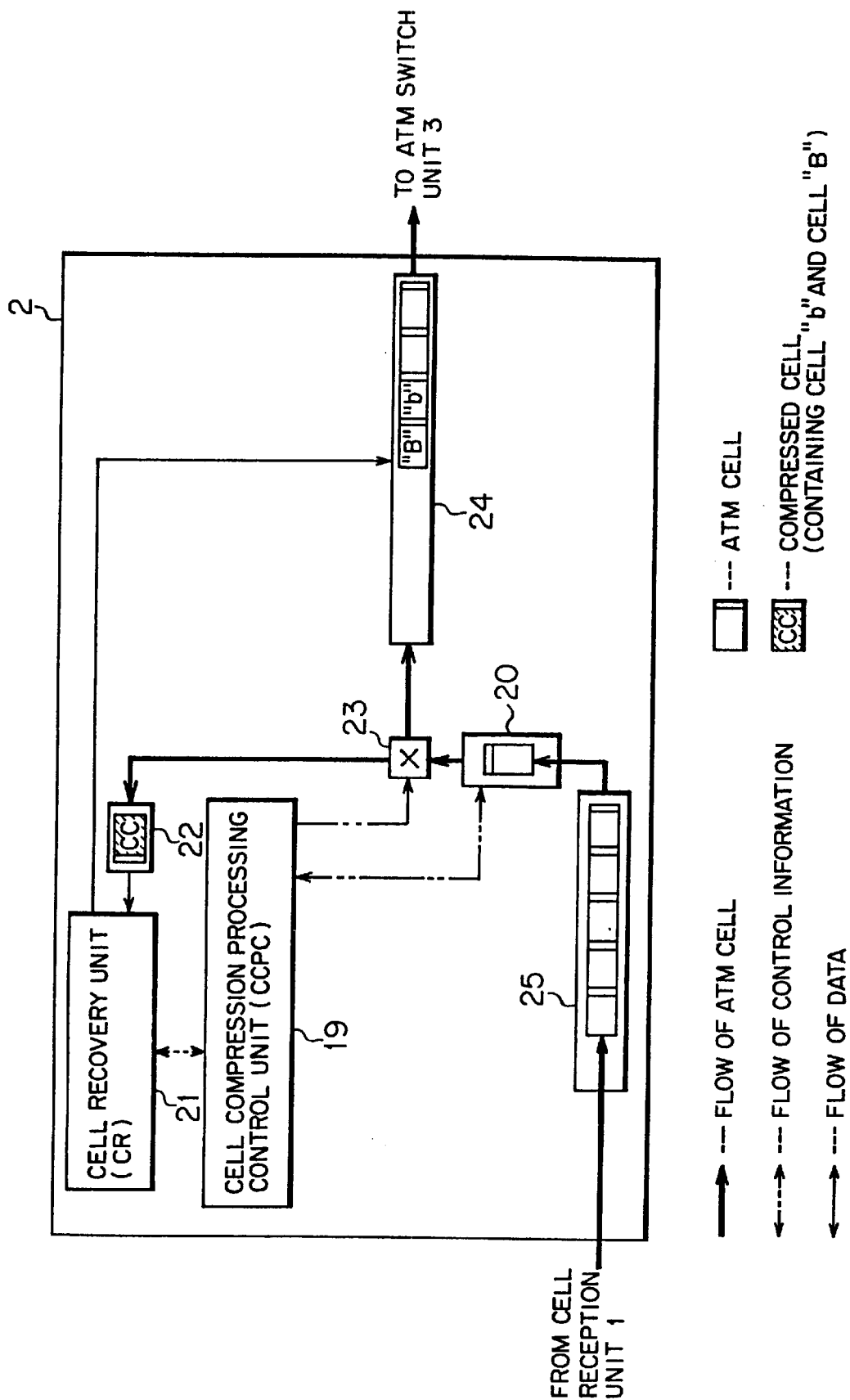
FIG. 4 is a block diagram of a recovery unit compressed cell in the network device shown in FIG. 1.

The compressed cell recovery unit 2 is comprised of, as shown in FIG. 4, a cell compression processing control unit (CCPC) 19, a compressed cell detection unit (CCD) 20 as a compressed cell determination unit, a cell recovery unit (CR) 21 as a cell recovery unit, a compressed cell storage buffer (CCSB) 22, a stream switch unit (SS) 23, a transmission cell storage buffer for ATM switch unit 24, and a cell compression internal buffer 25.

The cell compression processing control unit 19 instructs each processing to each of the foregoing units in the compressed cell recovery unit 2, and synchronizes each processing according to the instruction.

To detect a compressible cell among inputted ATM cells, the compressed cell detection unit 20 determines whether an inputted ATM cell is a compressible cell, and notices the result to the cell compression processing control unit 19.

The cell recovery unit 21, receiving a compressed cell detected by the compressed cell detection unit 20, applies the recovery processing to this compressed cell in the ATM layer to recover the original ATM cell, and transfers the recovered ATM cell to the transmission cell storage buffer 24.

The compressed cell storage buffer 22 is a buffer to temporarily store a compressed cell, while the recovery processing of the compressed cell is executed by the cell recovery unit 21.

The stream switch unit 23, receiving an instruction from the cell compression processing control unit 19, switches the transmission route of the ATM cell so as to send the ATM cell to the compressed cell storage buffer 22 in case an inputted ATM cell is a compressed cell, and switches so as to send the ATM cell to the transmission cell storage buffer for ATM switch unit 24 in case the inputted ATM cell is a non-compressed cell.

The transmission cell storage buffer for ATM switch unit 24 is a buffer where the ATM cells (recovered ATM cells or non-compressed cells) are queued which are sent out to the ATM switch unit 3 shown in FIG. 1.

The cell compression internal buffer 25 is a buffer where the subsequent ATM cells are queued, while the recovery processing of the compressed cell is executed by the cell recovery unit 21.

Thus, as shown in FIG. 1 and FIG. 2, the network device 6 is comprised of the compressed cell recovery unit 2 as an ATM cell recovery unit including the compressed cell detection unit 20 (see FIG. 4) as a compressed cell determination unit that determines whether an ATM cell inputted through the transmission lines 7 from a facing network device 6 having the function as an ATM cell compression device is a compressed cell, and the cell recovery unit 21 (see FIG. 4) as a cell recovery unit that, when the compressed cell detection unit 20 determines the ATM cell as a compressed cell, applies the recovery processing to the compressed ATM cell in the ATM layer to recover the original ATM cell; the ATM switch unit 3 as a switch device that applies the switching processing to the ATM cell recovered by the compressed cell recovery unit 2; and the cell compression unit 4 as the ATM cell compression device including the cell compression targeted byte checker 12 (see FIG. 3) that determines whether an ATM cell outputted toward the same port from the ATM switch unit 3 is a compression object cell, and the compressed cell production unit 13 (see FIG. 3) that, when the cell compression targeted byte checker 12 determines the ATM cell as a compression object cell, applies the compression processing to the ATM cell in the ATM layer to produce a compressed cell.

As shown in FIG. 2, the ATM network 10 is provided with a pre-stage network device 6 containing the cell compression unit 4 as the ATM cell compression device including the cell compression targeted byte checker 12 (see FIG. 3) that determines whether an ATM cell inputted is a compression object cell, and the compressed cell production unit 13 (see FIG. 3) that, when the cell compression targeted byte checker 12 determines the ATM cell as a compression object cell, applies the compression processing to the ATM cell in the ATM layer to produce a compressed cell; and a post-stage network device 6 containing the compressed cell recovery unit 2 as an ATM cell recovery unit including the compressed cell detection unit 20 (see FIG. 4) as a compressed cell determination unit that determines whether an ATM cell inputted through the transmission lines 7 from the foregoing pre-stage network device 6 is a compressed cell, and the cell recovery unit 21 (see FIG. 4) as a cell recovery unit that, when the compressed cell detection unit 20 determines the ATM cell as a compressed cell, applies the recovery processing to the compressed ATM cell in the ATM layer to recover the original ATM cell.

According to the foregoing construction, in the network device 6 shown in FIG. 1, when ATM cells (compressed cells or non-compressed cells) are inputted through the transmission lines 7, the ATM cell are received by the cell reception unit 1, and transmitted to the compressed cell recovery unit 2.

In the compressed cell recovery unit 2, when a compressed cell is detected out of the received ATM cells, the compressed cell is recovered to the original ATM cell, and the recovered ATM cell and the non-compressed cells are outputted to the ATM switch unit 3.

Next, in the ATM switch unit 3, the ATM cells are switched into each of the ports in accordance with the values of VPI/VCI contained in the headers of the received ATM cells. In the cell compression unit 4, when a compressible cell is detected out of the ATM cells after switched, the cell is compressed in the ATM layer to produce a compressed cell.

The compressed cell thus produced and non-compressed cells are outputted to the cell transmission unit 5, and sent out by the cell transmission unit 5 through the transmission port (P3' in FIG. 1).

The operation in ATM network 10 (see FIG. 2) of the network devices 6 will now be described. In the pre-stage network device 6, the cell compression unit 4 executes ATM cell compression steps, in which the cell compression targeted byte checker 12 of the cell compression unit 4 determines whether an inputted ATM cell is a compression object cell (compression object cell determination step). And, when the cell compression targeted byte checker 12 determines that the ATM cell is a compression object cell, the compressed cell production unit 13 applies the compression processing to the ATM cell in the ATM layer to produce a compressed cell (compressed cell production step).

In the post-stage network device 6, the compressed cell recovery unit 2 executes ATM cell recovery steps, in which the compressed cell detection unit 20 of the compressed cell recovery unit 2 determines whether the ATM cell transmitted through the transmission lines 7, produced in the foregoing ATM cell compression steps, is a compressed cell (compressed cell determination step). And, when the compressed cell detection unit 20 determines that the ATM cell is a compressed cell, the cell recovery unit 21 applies the recovery processing to the ATM cell in the ATM layer to recover-the original ATM cell (cell recovery step).

Here, the cell compression processing in the cell compression unit 4 will be described with reference to FIG. 3.

First, of the ATM cells inputted through the ports P1' and the port P2', the ATM cells having VPI/VCI switched into the port P3' are put together into one ATM cell flow by the ATM switch unit 3 to be sent to the cell compression unit 4 (see FIG. 1).

In the cell compression unit 4, the ATM cells from the ATM cell switch unit 3 are inputted to the cell compression inner buffer 16.

The cell compression targeted byte checker 12 extracts an ATM cell from the cell compression inner buffer 16 and determines whether it is an ATM cell of a compression object. And, when the cell compression targeted byte checker 12 determines that the foregoing ATM cell is an ATM cell of a compression object, the compressed cell production unit 13 produces a compressed cell and stores it in the compressed cell storage buffer 14.

After the compressed cell production processing is completed in the compressed cell production unit 13, the stream switch unit 15 sends out the compressed cells in the compressed cell storage buffer 14 to the transmission cell storage buffer 18, thus completing the cell compression processing.

The cell compression processing control unit 11 instructs, when executing the cell compression processing, each processing to each of the units in the cell compression unit 4, and synchronizes the processing of each unit.

The compressed cell recovery processing in the compressed cell recovery unit 2 will be described with reference to FIG. 4.

First, ATM cells inputted through the port P1' are transmitted to the compressed cell recovery unit 2 through the cell reception unit 1 (see FIG. 1).

Next, in the compressed cell recovery unit 2, the ATM cells from the cell reception unit 1 are inputted to the cell compression internal buffer 25.

The compressed cell detection unit 20 extracts an ATM cell from the cell compression internal buffer 25 and determines whether it is a compressed cell. And, when the compressed cell detection unit 20 determines that the foregoing ATM cell is a compressed cell, the stream switch unit 23 sends out the compressed cell to the compressed cell storage buffer 22.

The cell recovery unit 21 recovers the original cell from the compressed cell, and outputs to write the recovered ATM cell to the transmission cell storage buffer for ATM switch unit 24, thus completing the cell recovery processing.

The cell compression processing control unit 19 instructs, when executing the cell recovery processing, each processing to each of the units in the compressed cell recovery unit 2, and synchronizes the processing of each unit.

Thus, in the network device 6 shown in FIG. 1, containing the cell compression unit 4, in the process that the ATM cells are transmitted through the network device 6, when part of the ATM cells are acknowledged as compression object cells, the ATM cells acknowledged as the compression object cells are compressed in the ATM layer to be transmitted, regardless of that the ATM cells of the compression object cells are transmitted from which end user or inputted from which port; and therefore, the data quantity of the ATM cells transmitted in the ATM network can be reduced.

Further, when compressing data, it is not necessary to transfer the data in the ATM cells to the upper layer (for example, application layer); and therefore, the effective utilization of bands can be achieved by the cell compression in different communication bands being the advantage of the ATM.

(b) Description of the First Embodiment

The first embodiment of the invention will be described with reference to the accompanying drawings.

Figure 5:
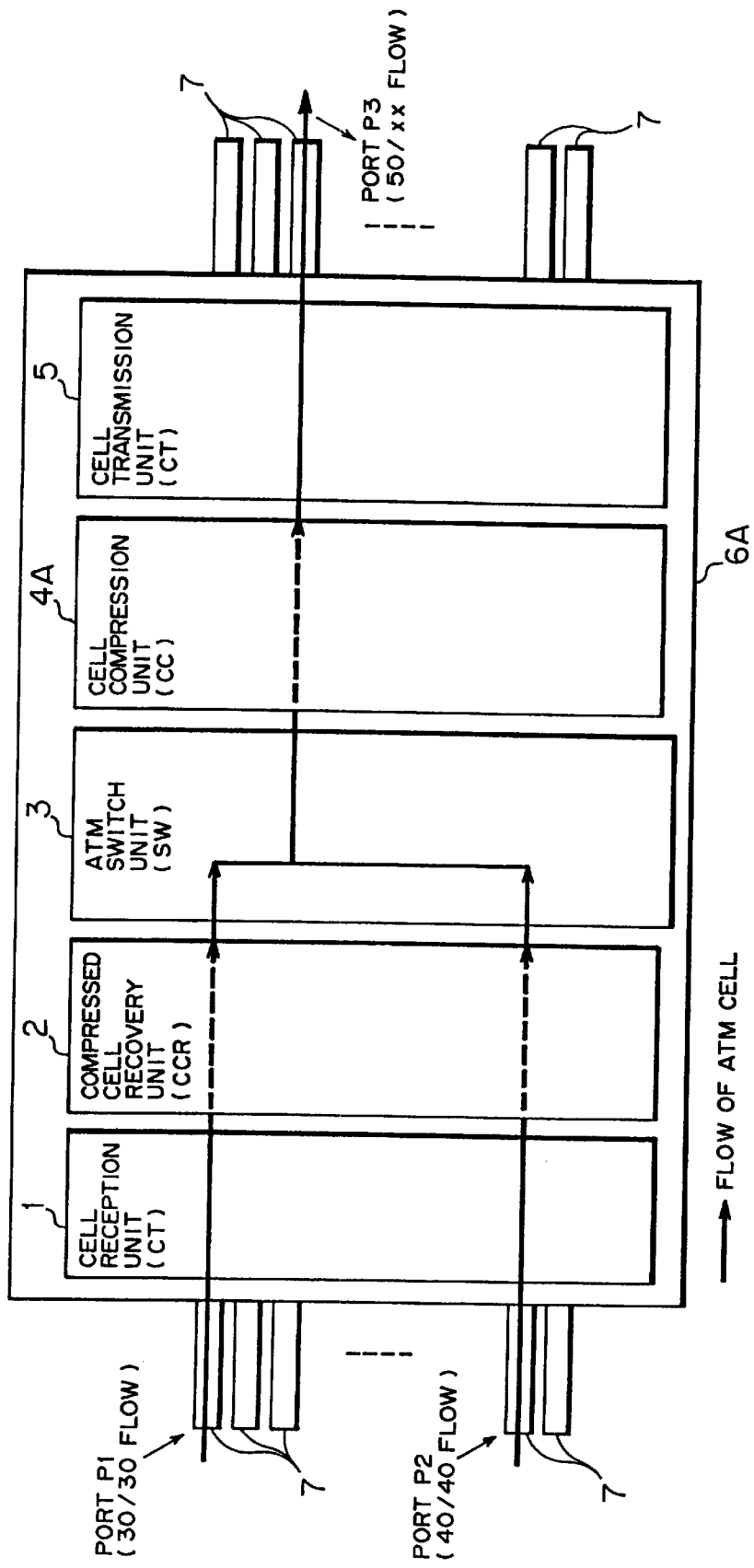
FIG. 5 and FIG. 7 are block diagrams of the network device as the ATM cell compression recovery device relating to the first embodiment of the invention.
Figure 7:
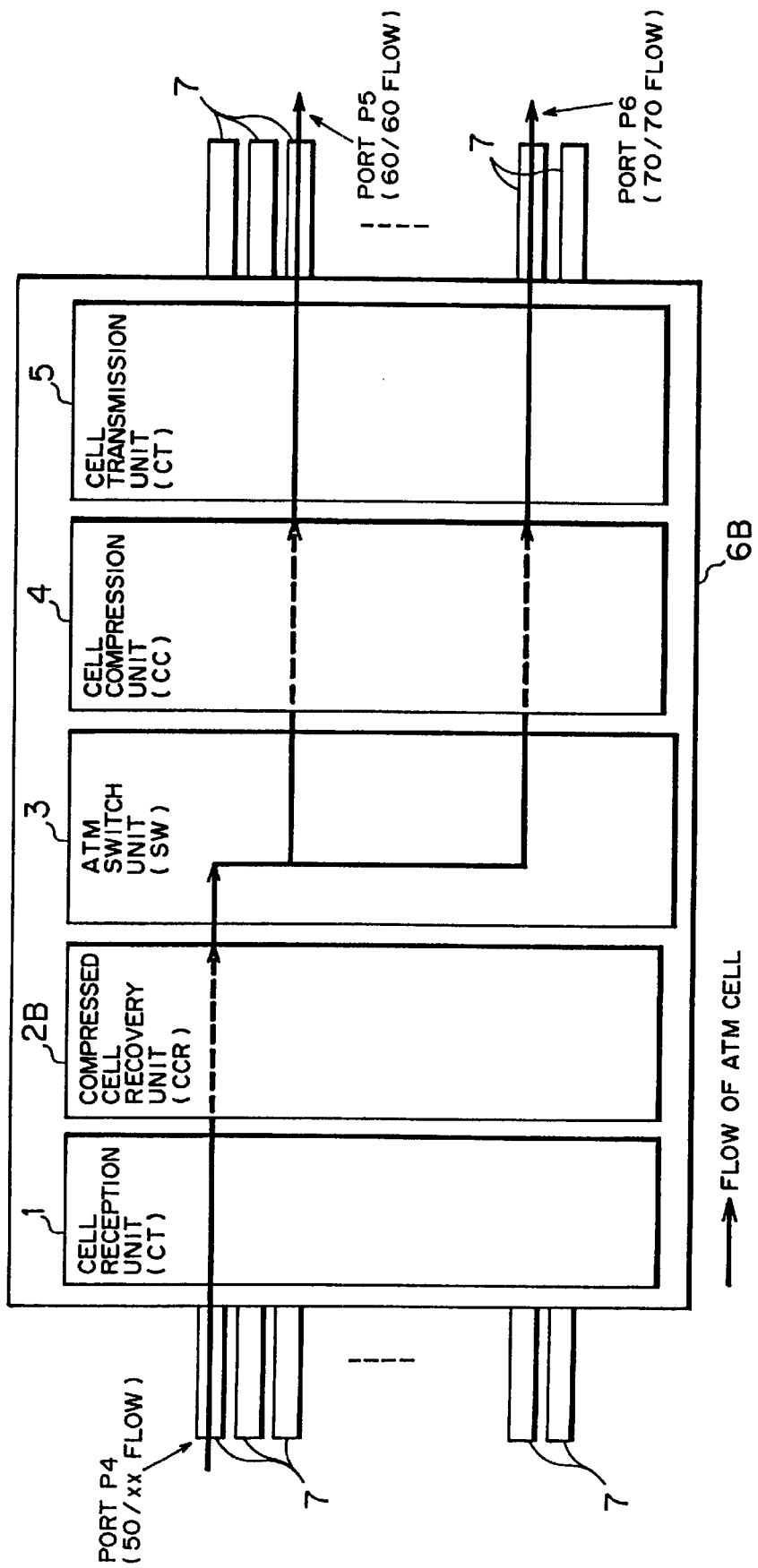

FIG. 5 and FIG. 7 are block diagrams to illustrate the constructions of the network devices 6A and 6B as the ATM cell compression recovery device relating to the first embodiment of the invention.

The network devices 6A, 6B shown in FIG. 5, FIG. 7 are used in the same manner as the network device 6 shown in FIG. 1, as the ATM switch that applies, when an ATM cell (compressed cell) compressed in the ATM layer and an ATM cell (non-compressed cell) not compressed in the ATM layer are inputted through the transmission lines 7, the switching processing to the foregoing ATM cells in the ATM network as shown in FIG. 2.

Figure 9:
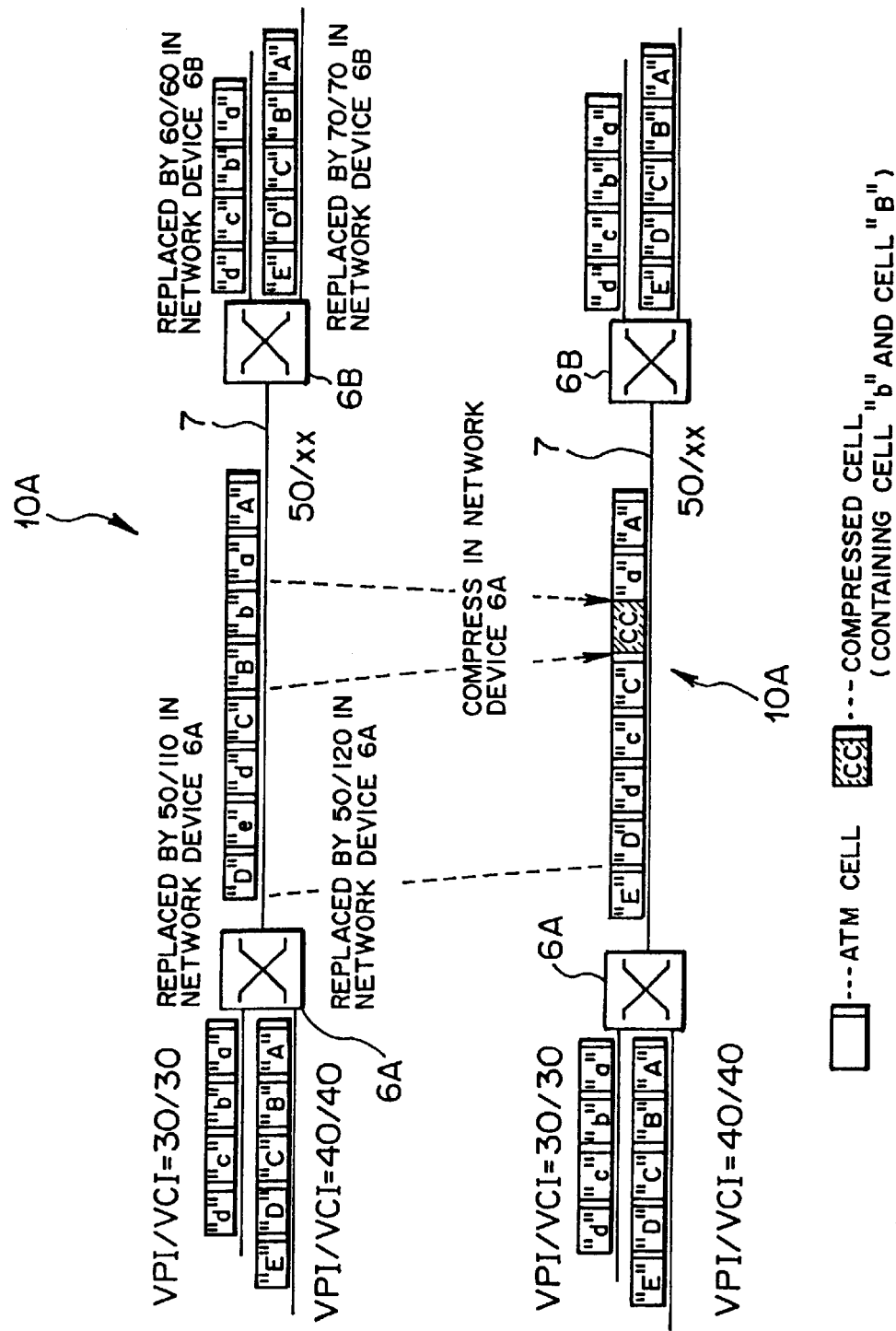
FIG. 9 is an explanatory illustration of the ATM network as the ATM cell compression recovery system to which the network device relating to the first embodiment of the invention is applied.

Specially, in the first embodiment, as shown in FIG. 9, the network device 6A and the network device 6B are mutually connected through the transmission lines 7 to constitute an ATM network 10A. Here, the network 6A has a switch configuration, as shown in FIG. 5, such that ATM cells received through a plurality of ports are switched to be outputted through one port; and on the other hand, the network device 6B has a switch configuration, as shown in FIG. 7, such that ATM cells received through one port are switched to be outputted through a plurality of ports. Further, the network device 6A functions as the ATM cell compression device that executes the compression processing of the ATM cells, and the network device 6B functions as the ATM cell recovery device that executes the recovery processing of the compressed cells. The first embodiment with the foregoing construction will be described. The flows of the ATM cells inside the network devices 6A and 6B are shown in FIG. 5 and FIG. 7, respectively.

The network device 6A shown in FIG. 5 applies the recovery processing to the ATM cells inputted from outside (end user terminals, other network devices, etc.) through the transmission lines 7, as needed, further applies the switching processing, and thereafter applies the compression processing in the ATM layer to send out the result to the network device 6B placed in the subsequent stage of the network device 6A. The network device 6A is comprised of the cell reception unit 1, compressed cell recovery unit 2, ATM switch unit 3, a cell compression unit 4A as an ATM cell compression device, and cell transmission unit 5. Here, in FIG. 5, the ports are illustrated by the symbols P1 through P3.

Here, the cell reception unit 1, compressed cell recovery unit 2, ATM switch unit 3, and cell transmission unit 5 each possess the same functions and constructions as those described in the "(a) Description of the Aspect of the Invention".

And, the cell compression unit 4A, detecting a compressible cell among the ATM cells after switched, applies the compression processing to the compressible ATM cell in the ATM layer to produce a compressed cell, and outputs the produced compressed cell and the non-compressed cells to the cell transmission unit 5. Here, during detecting a compressible cell, the cell compression unit 4A employs a detection method by the pattern recognition as described later.

Figure 6:
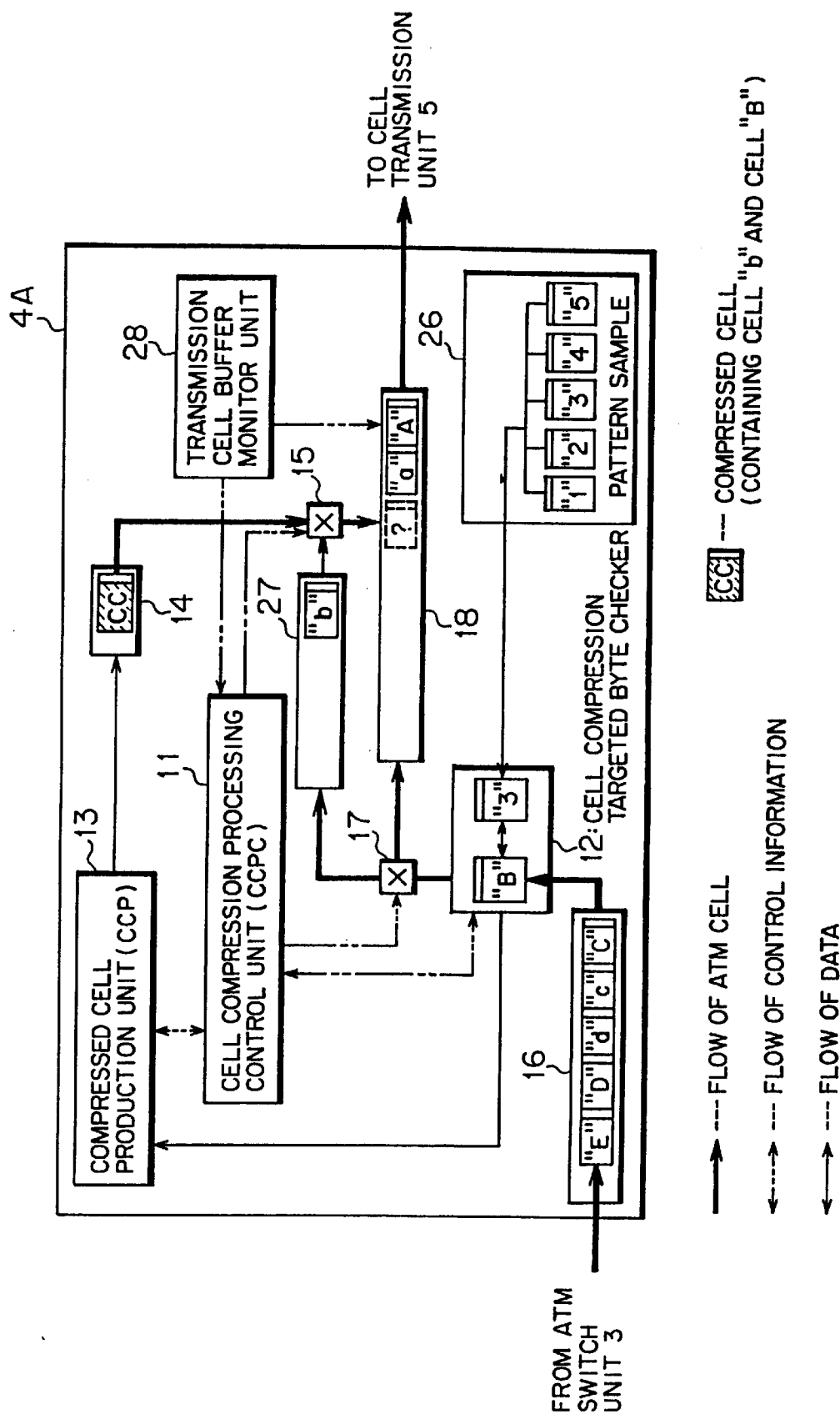
FIG. 6 is a block diagram of the cell compression unit in the network device relating to the first embodiment of the invention.

To achieve the foregoing, the cell compression unit 4A is comprised of, as shown in FIG. 6, the cell compression processing control unit (CCPC) 11, cell compression targeted byte checker (CCTBC) 12, compressed cell production unit (CCP) 13, compressed cell storage buffer (CCSB) 14, stream switch units (SS) 15 and 17, inner buffer cell compression unit (CCIB) 16, and transmission cell storage buffer (TCSB) 18 as a transmission cell storage unit. The cell compression unit 4A further contains a compression pattern sample storage unit 26, a temporary storage buffer 27, and a transmission cell buffer monitor unit 28 as a transmission cell monitor unit.

Here, the cell compression processing control unit 11, compressed cell storage buffer 14, and transmission cell storage buffer 18 each possess the same functions and constructions as those described in the "(a) Description of the Aspect of the Invention".

The cell compression targeted byte checker 12, to detect a compressible cell among inputted ATM cells, determines whether an inputted ATM cell can be handled as a compression object cell, and notices the result to the cell compression processing control unit 11; however in the first embodiment, the cell compression targeted byte checker 12 determines whether the ATM cell is a compression object cell, on the basis of the compression pattern sample (payload pattern sample served as the compression object) stored in the compression pattern sample storage unit 26. Here, the payload pattern is a bit pattern consisting of 384 bits (48 bytes×8 bits)

Here, the compression pattern sample storage unit 26 is a buffer to store the compression pattern sample of the compression object cell. Referring to the compression pattern sample storage unit 26, the cell compression targeted byte checker 12 compares a payload pattern of an inputted ATM cell with a compression pattern sample stored in the compression pattern sample storage unit 26, and thereby determines whether the inputted ATM cell is a compression object cell.

Receiving the ATM cell determined as the compression object cell by the cell compression targeted byte checker 12, the compressed cell production unit 13 applies the compression processing to the ATM cell in the ATM layer to produce a compressed cell, and stores the compressed cell in the compressed cell storage buffer 14. However, when compressing an ATM cell, the first embodiment employs as the header of a compressed cell a header that indicates the cell to be an OAM cell of F4 or F5, and employs a method to indicate that the ATM cell is a compressed cell in the OAM type field of the compressed cell.

In the first embodiment, a compressed cell is designed to be produced, when there are two continuous ATM cells as compression objects.

Figure 10:
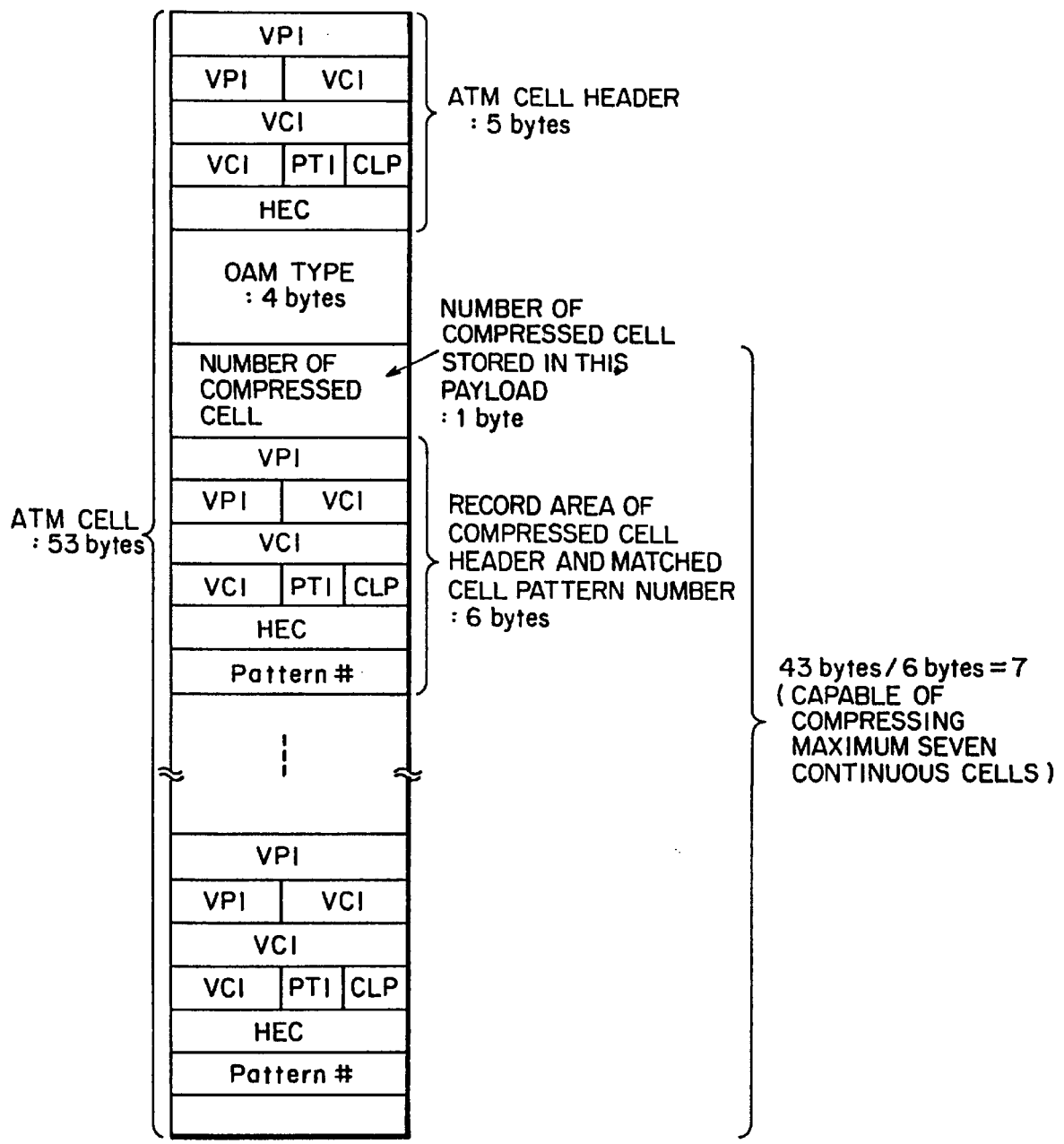
FIG. 10 is a chart to illustrate an example of the format of a compressed cell.

Here, one example of the format of a compressed cell is illustrated in FIG. 10. The format of the compressed cell shown in FIG. 10 illustrates a case in which seven compression object cells are compressed into one compressed cell, however the number of cells to be compressed can be increased. Incidentally, in the compressed cell shown in FIG. 10, the format indicates in the header that the ATM cell is the OAM cell (F4/F5), and defines in the OAM type field a specific value to indicate that the ATM cell is a compressed cell (the specific value here can be set arbitrarily, as long as it does not bring about any discrepancy in the ATM network 10).

The temporary storage buffer 27 is a buffer that temporarily stores the ATM cell first determined as a compression object, in order to produce a compressed cell when there are two continuous ATM cells as the compression objects.

Accordingly, in the first embodiment, when an ATM cell determined as a non-compression object cell by the cell compression targeted byte checker 12 is inputted, the stream switch unit 17 transfers the ATM cell to the transmission cell storage buffer 18, and when an ATM cell determined as a first compression object cell by the cell compression targeted byte checker 12 is inputted, the stream switch unit 17 transfers the ATM cell to the temporary storage buffer 27.

The stream switch unit 15 transfers compressed cells in the compressed cell storage buffer 14 to the transmission cell storage buffer 18.

The cell compression inner buffer 16 is a buffer to queue the subsequent ATM cells when the compression processing of ATM cells is being executed. However, in the first embodiment, the cell compression inner buffer 16 is partitioned into service categories, and thereby the cell compression processing is made by each of the service categories.

The transmission cell buffer monitor unit 28 monitors whether the ATM cells to be sent out which are covered in the transmission cell storage buffer 18 are in a queue. And, when detecting that the ATM cells are in a queue, the transmission cell buffer monitor unit 28 requests the compressed cell production unit 13 to produce a compressed cell.

Concretely, detecting that the ATM cells waiting for transmission are present in the transmission cell storage buffer 18, the transmission cell buffer monitor unit 28 informs the cell compression processing control unit 11 of the effect. Receiving the information, the cell compression processing control unit 11 requests the compressed cell production unit 13 to produce a compressed cell, and thereby the compressed cell production unit 13 is made to start the compression processing.

On the other hand, the network device 6B shown in FIG. 7 applies the recovery processing in the ATM layer to the ATM cells inputted from the facing network device 6A (see FIG. 5) through the transmission lines 7. The network device 6B is comprised of the cell reception unit (CT) 1, the compressed cell recovery unit (CCR) 2B as an ATM cell recovery device. Further, in order to apply the switching processing and the compression processing in the ATM layer to the ATM cells having the recovery processing applied and send out the processing results to the other network devices (not illustrated) placed in the subsequent stages of the network device 6B, the network device 6B further includes the ATM switch unit (SW) 3, cell compression unit (CC) 4, and cell transmission unit (CT) 5. Here, in FIG. 7, the ports are illustrated by the symbols P4 through P6.

Here, the cell reception unit 1, ATM switch unit 3, cell compression unit 4, and cell transmission unit 5 each possess the same functions and constructions as those described in the "(a) Description of the Aspect of the Invention".

And, the compressed cell recovery unit 2B, detecting a compressed cell among the ATM cell flows received, applies the recovery processing to the compressed ATM cell in the ATM layer to recover the original ATM cell, and outputs the recovered cell to the ATM switch unit 3. Here, during recovering the compressed cell into the original ATM cell, the compressed cell recovery unit 2B employs a recovery method by the pattern recognition as described later.

Figure 8:
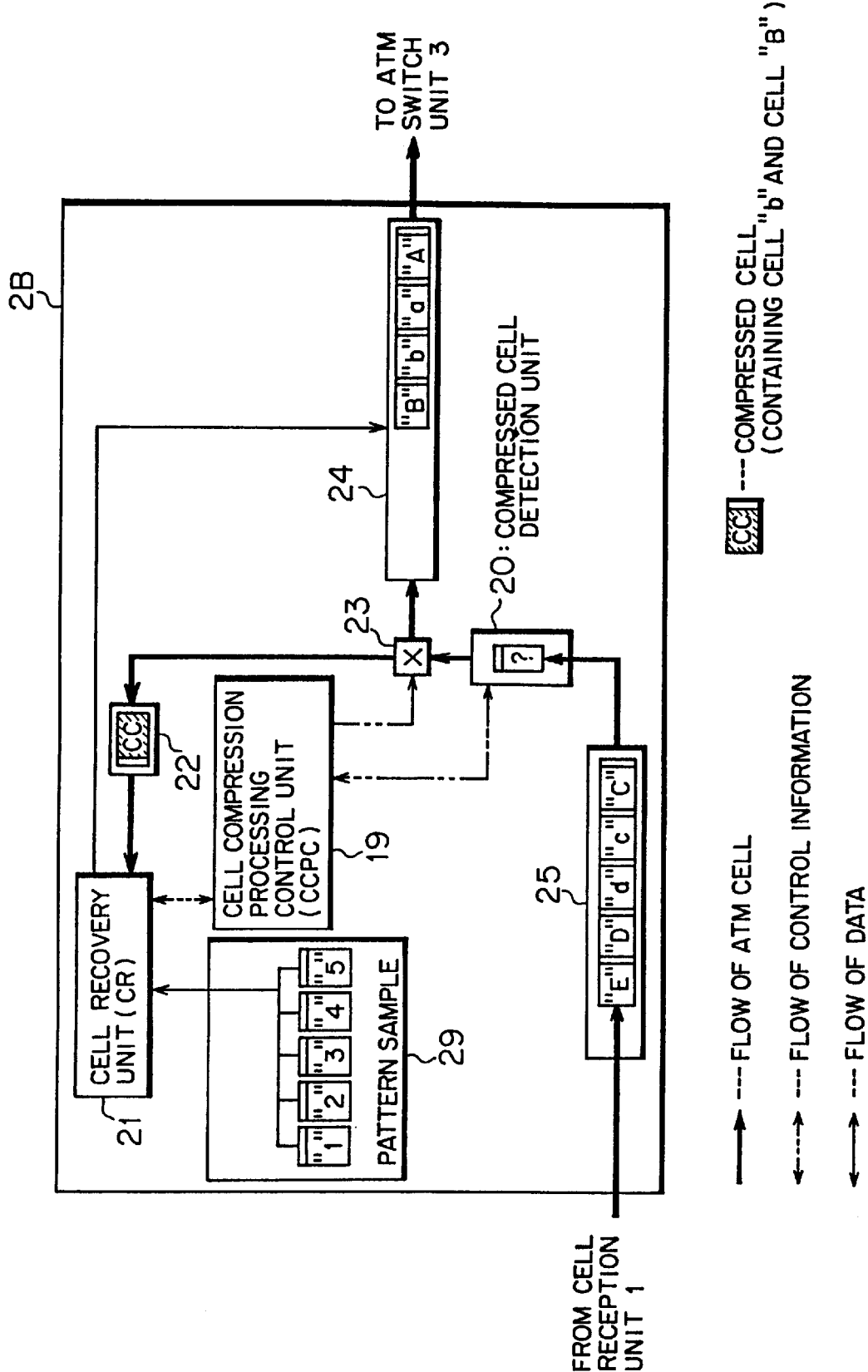
FIG. 8 is a block diagram of the recovery unit compressed cell in the network device relating to the first embodiment of the invention.

To achieve the foregoing, the compressed cell recovery unit 2B is comprised of, as shown in FIG. 8, the cell compression processing control unit (CCPC) 19, the compressed cell detection unit (CCD) 20, the cell recovery unit (CR) 21, the compressed cell storage buffer (CCSB) 22, the stream switch unit (SS) 23, the transmission cell storage buffer for ATM switch unit 24, the cell compression internal buffer 25, and a recovery pattern sample storage unit 29.

Here, the cell compression processing control unit 19, compressed cell storage buffer 22, stream switch unit 23, transmission cell storage buffer for ATM switch unit 24, and cell compression internal buffer 25 each possess the same functions and constructions as those described in the "(a) Description of the Aspect of the Invention".

The compressed cell detection unit 20, to detect a compressed cell among inputted ATM cells, determines whether an inputted ATM cell can be handled as a compressed cell, and notices the result to the cell compression processing control unit 19; however in the first embodiment, the compressed cell detection unit 20 determines whether the ATM cell inputted from the opposite network 6A through the transmission lines 7 is a compressed cell.

Receiving a compressed cell detected by the compressed cell detection unit 20, the cell recovery unit 21 applies the recovery processing to the ATM cell in the ATM layer to recover the original ATM cell, and outputs to store the recovered cell to the transmission cell storage buffer for ATM switch unit 24. However, in the first embodiment, when the compressed cell detection unit 20 determines the ATM cell as a compressed cell, the cell recovery unit 21 recovers the compressed cell into the original ATM cell on the basis of the recovery pattern sample (payload pattern sample served as the compression object) stored in the recovery pattern sample storage unit 29.

Here, the recovery pattern sample storage unit 29 is a buffer to store the recovery pattern sample of the original ATM cell corresponding to the compressed cell. Referring to the recovery pattern sample storage unit 29, the cell recovery unit 21 retrieves the recovery pattern sample of the original ATM cell corresponding to the compressed cell inputted, and recovers the original ATM cell on the basis of the recovery pattern sample.

Thus, as shown in FIG. 5 and FIG. 7, the network devices 6A, 6B relating to the first embodiment are each comprised of the compressed cell recovery unit (the compressed cell recovery unit 2 in case of the network device 6A, the compressed cell recovery unit 2B in case of the network device 6B) as an ATM cell recovery unit including the compressed cell detection unit 20 as a compressed cell determination unit that determines whether an ATM cell inputted through the transmission lines 7 from an opposite network device (the other network device not illustrated in case of the network device 6A, the network device 6A in case of the network device 6B) having the function as an ATM cell compression device is a compressed cell, and the cell recovery unit 21 as a cell recovery unit that, when the compressed cell detection unit 20 determines the ATM cell as a compressed cell, applies the recovery processing to the compressed ATM cell in the ATM layer to recover the original ATM cell; the ATM switch unit 3 as a switch device that applies the switching processing to the ATM cell recovered by the compressed cell recovery unit 2; and the cell compression unit (the cell compression unit 4A in case of the network device 6A, the cell compression unit 4 in case of the network device 6B) as the ATM cell compression device including the cell compression targeted byte checker 12 that determines whether an ATM cell outputted toward the same port from the ATM switch unit 3 is a compression object cell, and the compressed cell production unit 13 that, when the cell compression targeted byte checker 12 determines the ATM cell as a compression object cell, applies the compression processing to the ATM cell in the ATM layer to produce a compressed cell.

As shown in FIG. 9, the ATM network 10A is provided with a pre-stage network device 6A containing the cell compression unit 4A as the ATM cell compression device including the cell compression targeted byte checker 12 that determines whether an ATM cell inputted is a compression object cell, and the compressed cell production unit 13 that, when the cell compression targeted byte checker 12 determines the ATM cell as a compression object cell, applies the compression processing to the ATM cell in the ATM layer to produce a compressed cell; and a post-stage network device 6B containing the compressed cell recovery unit 2B as an ATM cell recovery unit including the compressed cell detection unit 20 as a compressed cell determination unit that determines whether an ATM cell inputted through the transmission lines 7 from the foregoing pre-stage network device 6A is a compressed cell, and the cell recovery unit 21 as a cell recovery unit that, when the compressed cell detection unit 20 determines the ATM cell as a compressed cell, applies the recovery processing to the compressed ATM cell in the ATM layer to recover the original ATM cell.

The points of the first embodiment are as follows.

(1) In the network devices 6A, 6B having the repeating or interchanging function of the ATM cells, when ATM cells received from plural ports are switched into one physical port, the ATM cells switched into one physical port are compressed.

(2) When the payload patterns of the ATM cells from plural ports coincide with the pattern sample registered in advance, the identifiers of these cells are recorded in one compressed cell to be transmitted. The device that receives a compressed cell acknowledges the concerned identifier, and recovers the compressed cell into the original cell.

(3) The device automatically acknowledges that there are not a vacancy in the communication band between the reception device and the concerned device and the ATM cells are in a queue, and starts the compression processing.

(4) The compression/recovery processing are performed in each of the ATM service categories.

According to the foregoing construction, the operation as described hereunder is performed in the network devices 6A, 6B relating to the first embodiment.

Here, in the network devices 6A, 6B, ATM cells received through plural ports are switched to be outputted into one port by the ATM switch unit 3 in the network device 6A; and on the other hand, ATM cells received through one port are switched to be outputted into plural ports by the ATM switch unit 3 in the network device 6B. The other operations than the foregoing are the same as the network device 6 described in the "(a) Description of the Aspect of the Invention".

On the other hand, when the foregoing network devices 6A, 6B transmit ATM cells between themselves, the pre-stage network device 6A mainly performs the compression processing of the ATM cells, and the post-stage network device 6B mainly performs the recovery processing of the compressed cells (see FIG. 9). Incidentally, the compression processing of the ATM cells and the recovery processing of the compressed cells are carried out in each of the ATM service categories.

First, the compression processing of the ATM cells in the pre-stage network device 6A will be explained (see FIG. 6). In the network device 6A, the cell compression unit 4A executes the ATM cell compression step, in which the cell compression targeted byte checker 12 of the cell compression unit 4A determines whether an inputted ATM cell is a compression object cell (compression object cell determination step). Here, the cell compression targeted byte checker 12 determines, on the basis of the compression pattern sample stored in the compression pattern sample storage unit 26, whether the ATM cell is a compression object cell.

The cell compression targeted byte checker 12 determines that the ATM cell is a compression object cell, and then the compressed cell production unit 13 applies the compression processing to the ATM cell in the ATM layer to produce a compressed cell (compressed cell production step).

The compression processing of the ATM cell in this case will further be explained with reference to the flowcharts shown in FIG. 11 through FIG. 13.

Figure 11:
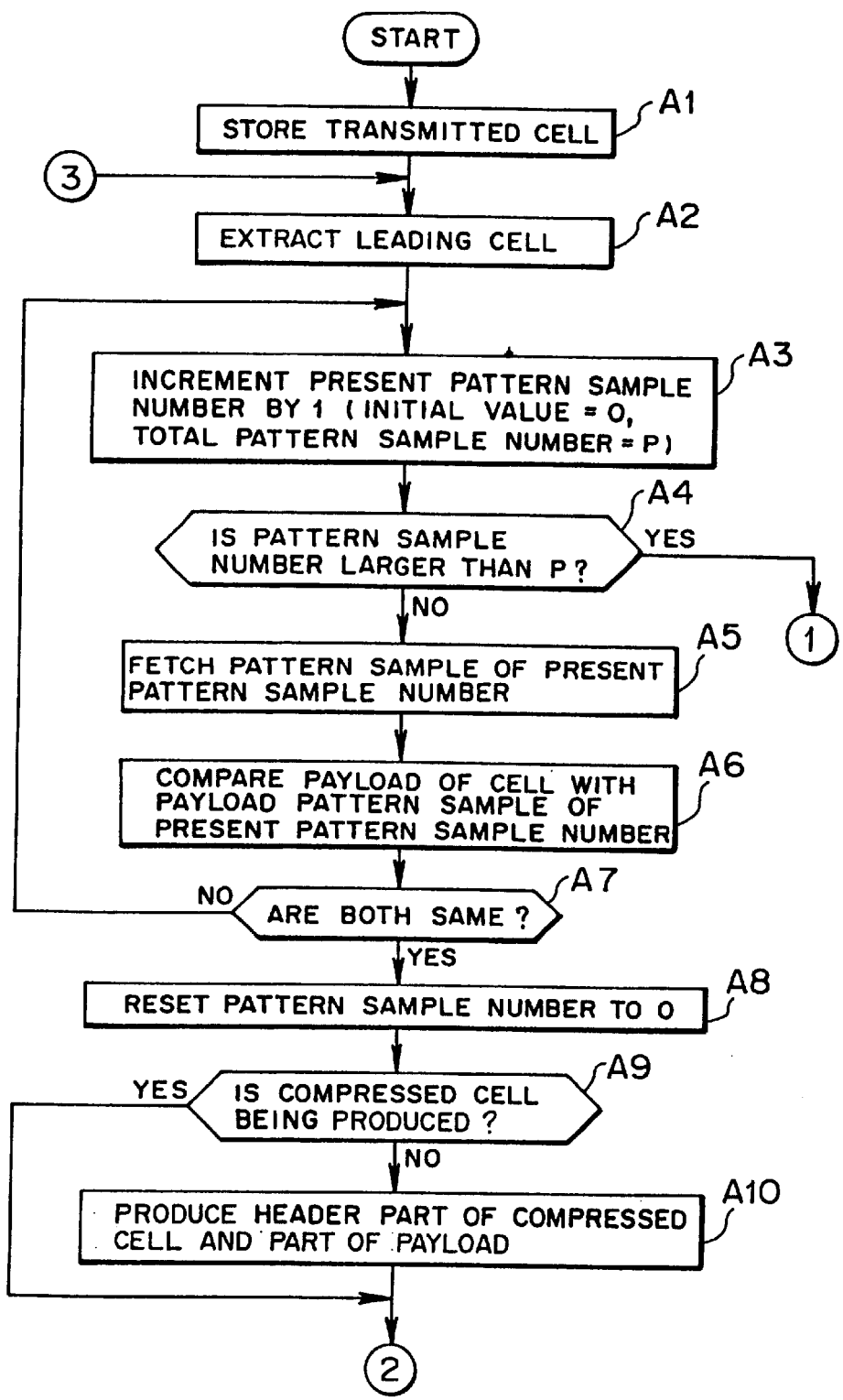
FIG. 11 through FIG. 13 are flowcharts to explain the compression processing of an ATM cell in the network device relating to the first embodiment of the invention.

The ATM cell transmitted to the cell compression unit 4A is received by the cell compression inner buffer 16 (step A1 in FIG. 11).

The cell compression targeted byte checker 12 extracts the leading ATM cell from the cell compression inner buffer 16 (step A2 in FIG. 11), and increments the present pattern sample number by 1. Here, the initial value of the pattern sample number is set to 0, and the total number of the pattern samples is set to P (step A3 in FIG. 11).

The cell compression targeted byte checker 12 determines whether the pattern sample number is larger than P (whether the pattern sample number does not coincides with all the pattern samples) (step A4 in FIG. 11). If the pattern sample number is smaller than P (if it coincides with the compression pattern sample stored in the compression pattern sample storage unit 26), the cell compression targeted byte checker 12 extracts the pattern sample of the present pattern sample number from the compression pattern sample storage unit 26 (from No route of step A4 to step A5 in FIG. 11).

Further, the cell compression targeted byte checker 12 compares the payload of the ATM cell with the payload pattern sample of the present pattern sample number (step A6 in FIG. 11), and determines whether both are the same (step A7 in FIG. 11). If it determines that they are not coincident, the cell compression targeted byte checker 12 repeats the processings after step A3 mentioned above (from No route of step A7 to step A3). If it determines that they are coincident, the cell compression targeted byte checker 12 resets the pattern sample number to 0 (from Yes route of step A7 to step A8 in FIG. 11).

Next, the compressed cell production unit 13 determines whether a compressed cell is already produced (step A9 in FIG. 11). If the compressed cell is not produced yet, the compressed cell production unit 13 produces the header part (to indicate OAM) of the compressed cell and part of the payload (OAM type field to indicate the compressed cell) in the compressed cell storage buffer 14 (from No route of step A9 to step A10 in FIG. 11). If the compressed cell is already produced, the compressed cell production unit 13 does not executes the processing of this step A10 (Yes route of step A9).

Figure 12:
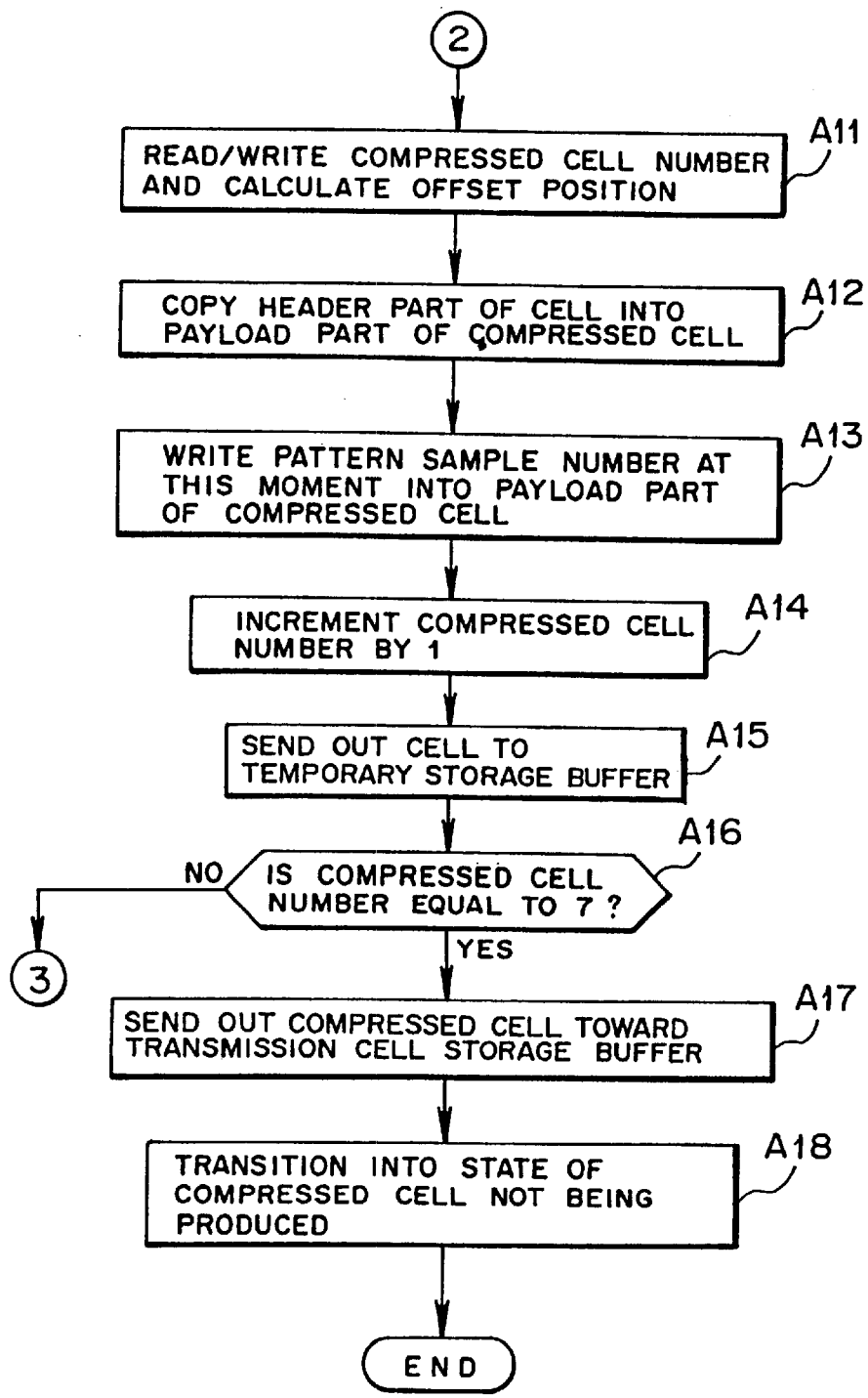

The compressed cell production unit 13 reads/writes the number of compressed cells from/in the compressed cell storage buffer 14, and calculates the offset position (step A11 in FIG. 12).

The compressed cell production unit 13 copies the header part of the cell into the payload part of the compressed cell stored in the compressed cell storage buffer 14 (step A12 in FIG. 12), writes the pattern sample number at this moment into the foregoing payload part (step A13 in FIG. 12), and increments the compressed cell number of the compressed cells (step A14 in FIG. 12).

The stream switch unit 17 sends out the ATM cell to the temporary storage buffer 27 (step A15 in FIG. 12). The compressed cell production unit 13 determines whether the compressed cell number is equal to 7 (step A16 in FIG. 12). If the compressed cell number is equal to 7, the stream switch 15 sends out the compressed cell toward the transmission cell storage buffer 18 (from Yes route of step A16 to step A17 in FIG. 12), and make a transition into a state of the compressed cell not being produced (step A18 in FIG. 12). If the compressed cell number is determines as being smaller than 7 at step A16, the processings after the foregoing step A2 are repeated (from No route of step A16 to step A2).

Figure 13:
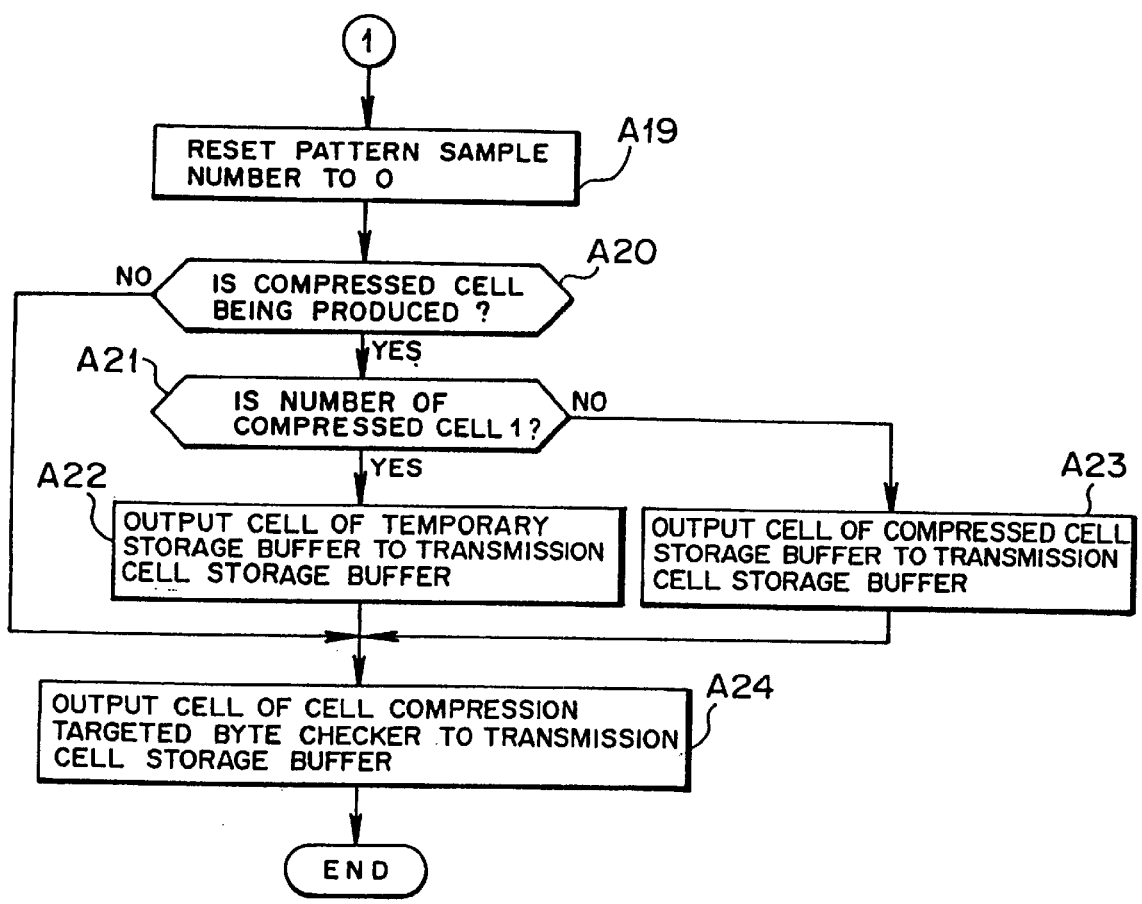

Incidentally, at the foregoing step A4, if the determination unit compression cell object 12 determines that the pattern sample number is larger than P (that it does not coincide with all of the pattern sample), the determination unit compression cell object 12 resets the pattern sample number to 0 (from Yes route of step A4 in FIG. 11 to step A19 in FIG. 13).

The compressed cell production unit 13 determines whether a compressed cell is already produced (step A20 in FIG. 13). If the compressed cell is already produced, the compressed cell production unit 13 further determines whether the compressed cell number is 1 (from Yes route of step A20 to step A21 in FIG. 13). If the compressed cell number is 1, the stream switch unit 17 outputs the cell of the temporary storage buffer 27 to the transmission cell storage buffer 18 (from Yes route of step A21 to step A22 in FIG. 13). If the compressed cell number is not 1, the stream switch unit 15 outputs the ATM cell of the compressed cell storage buffer 14 to the transmission cell storage buffer 18 (from No route of step A21 to step A23 in FIG. 13). Further, at the foregoing step A20, if the compressed cell production unit 13 determines that the compressed cell is not produced yet, the compressed cell production unit 13 does not executes the processings of the foregoing steps A21 through A23 (No route of step A20).

After the foregoing steps A20, A22, A23 have been processed, the stream switch unit 17 outputs the ATM cell of the determination unit compression cell object 12 to the transmission cell storage buffer 18 (step A24 in FIG. 13).

Next, the recovery processing of the compressed cell in the post-stage network device 6B will be explained (see FIG. 8). In the network device 6B, the compressed cell recovery unit 2B executes the ATM cell recovery step, in which the compressed cell detection unit 20 of the compressed cell recovery unit 2B determines whether the ATM cell produced by the foregoing ATM cell compression step which has been sent through the transmission lines 7 is a compressed cell (compressed cell determination step).

The compressed cell detection unit 20 determines that the ATM cell is a compressed cell, and then the cell recovery unit 21 applies the recovery processing to the ATM cell in the ATM layer to produce the original ATM cell (recovered cell production step). Here, the cell recovery unit 21 recovers the ATM cell into the original ATM cell on the basis of the recovery pattern sample stored in the recovery pattern sample storage unit 29.

The recovery processing of the compressed cell in this case will further be explained with reference to the flowcharts shown in FIG. 14 and FIG. 15.

Figure 14:
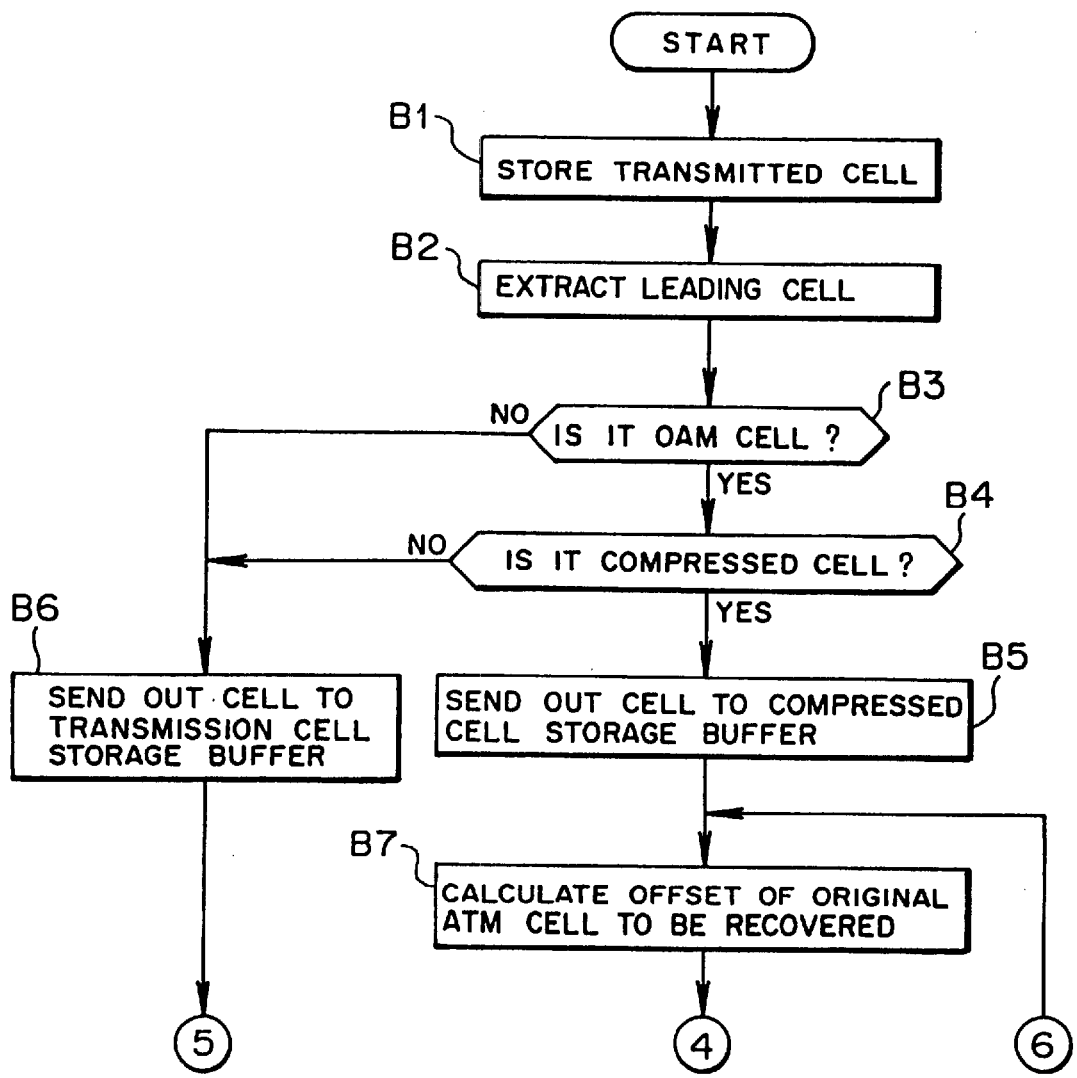
FIG. 14 and FIG. 15 are flowcharts to explain the recovery processing of a compressed ATM cell in the network device relating to the first embodiment of the invention.

The ATM cell transmitted to the compressed cell recovery unit 2B is received by the compression internal buffer 25 (step B1 in FIG. 14).

The compressed cell detection unit 20 extracts the leading ATM cell from the compression internal buffer 25 (step B2 in FIG. 14), checks the header part of the ATM cell extracted, and determines whether the ATM cell is an OAM cell (step B3 in FIG. 14). If the ATM cell is an OAM cell, the compressed cell detection unit 20 further checks the OAM type of the payload of the ATM cell, and determines whether the ATM cell is a compressed (from Yes route of step B3 to step B4 in FIG. 14). If the ATM cell is a compressed, the stream switch unit 23 sends out the ATM cell to the compressed cell storage buffer 22 (from Yes route of step B4 to step B5 in FIG. 14).

On the other hand, if the compressed cell detection unit 20 determines that the ATM cell is not an OAM cell (No route of step B3), or if it determines that the ATM cell is not a compressed (No route of step B4), the stream switch unit 23 sends out the ATM cell to the transmission cell storage buffer for ATM switch unit 24 to finish the recovery processing of a compressed cell (step B6 in FIG. 14).

Figure 15:
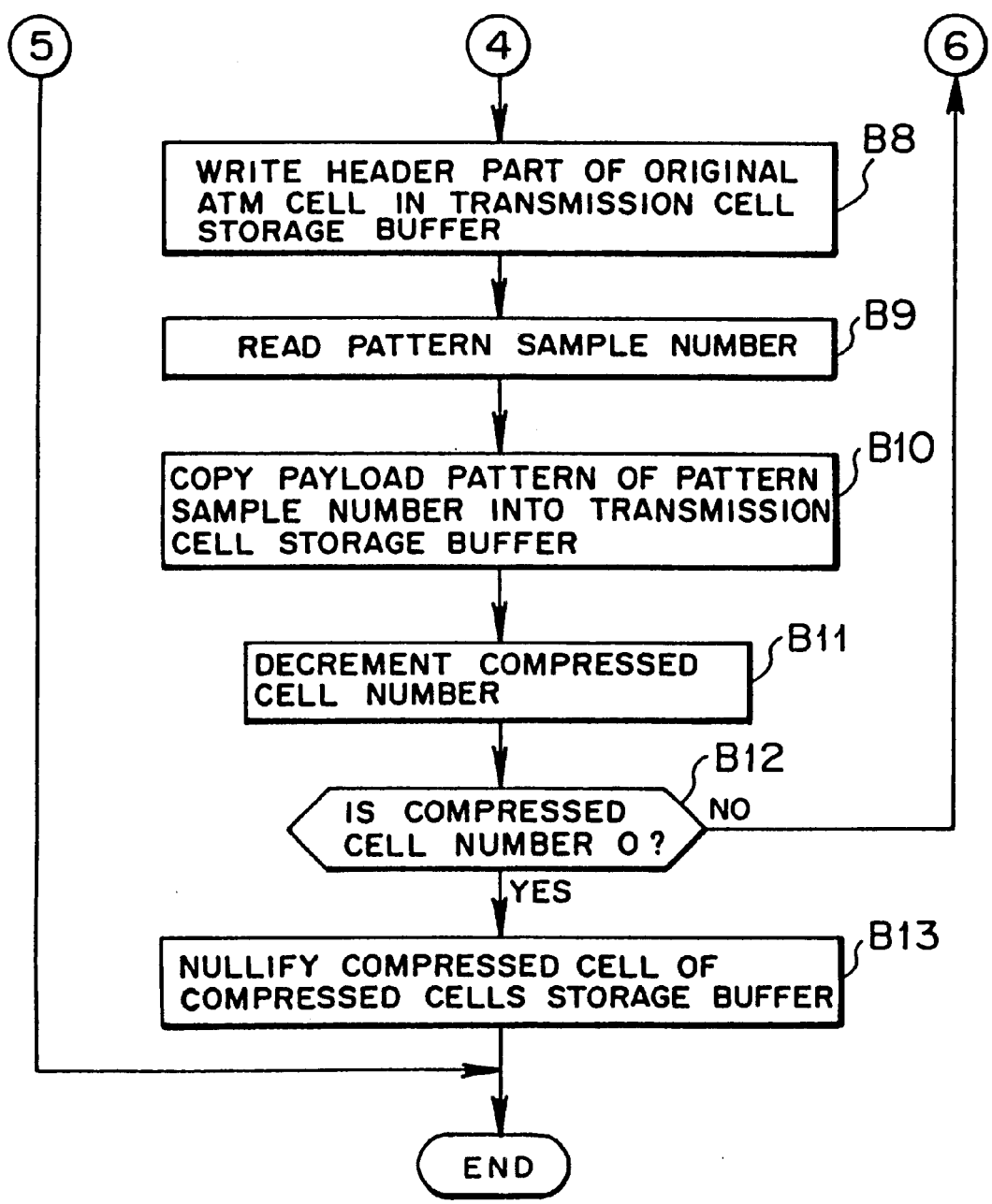

Thereafter, the cell recovery unit 21 calculates the offset of the original ATM cell to be recovered on the payload of a compressed cell from the compressed cell number stored in the compressed cell (step B7 in FIG. 14), and writes the header part of the original ATM cell in the transmission cell storage buffer for ATM switch unit 24 (step B8 in FIG. 15).

Further, the cell recovery unit 21 retrieves the pattern sample number that is coincident with the original ATM cell on the payload of a compressed cell (step B9 in FIG. 15), copies the payload pattern of the pattern sample number retrieved from the recovery pattern sample storage unit 29 into the transmission buffer switch unit 24 (step B10 in FIG. 15), and decrements the compressed cell number of the compressed cell storage buffer 22 (step B11 in FIG. 15).

Further, the cell recovery unit 21 checks the compressed cell number of compressed cells stored in the compressed cell storage buffer 22, and determines whether the compressed cell number is 0 (step B12 in FIG. 15). If the compressed cell number is not 0, the cell recovery unit 21 repeats the processings after the foregoing step B7 (from No route of step B13 to step B7). If the compressed cell number is 0, the recovery of the compressed cell is completed, and accordingly, the cell recovery unit 21 nullifies compressed cells in the compressed cell storage buffer 22 (from Yes route of step B12 to step B13 in FIG. 15).

Thus, according to the network devices 6A, 6B relating to the first embodiment, when data are transmitted, the compression and recovery processings are applied to the data in the ATM layer (more in detail, when an inputted ATM cell is a compression object cell, the network device 6A applies the compression processing to the ATM cell in the ATM layer to produce a compressed cell; and when an ATM cell inputted from the network device 6A is a compressed cell, the network device 6B applies the recovery processing to the ATM cell in the ATM layer to recover the original ATM cell) Thereby, it is possible to utilize the band effectively on the transmission lines 7 having a limited bandwidth, and reduce the number of the ATM cells nullified; and accordingly, it is possible to lower the cell loss rate to maintain and enhance the quality of the service, and reduce the retransmission processing and the like, thus reducing the congestion on the transmission lines 7.

In short, the characteristics of the invention are as follows.

(1) The compression and recovery of ATM cells in the ATM layer are made possible, which is impossible in the conventional technique.

(2) The compression/recovery is made possible also in the network devices 6A, 6B at the repeating point of transmission, as well as at end users.

(3) If the ATM cells are the ones to be sent out to the same port, the ATM cells from plural end users can be compressed into one cell without distinguishing end users at transmission sources.

In other words, the invention proposes a method, in which the network device 6A to switch bandwidths having ATM cells from plural end users multiplexed compresses the ATM cells stored in the buffer inside the network device 6A effectively in the service category having a low priority in securing band without having any relation with the transmission sources of the ATM cells, and the network device 6B on the reception end of the compressed cells recovers the compressed cells. According to the foregoing characteristics, the cell loss rate on the ATM network 10A can be lowered. Therefore, in the private network under the trunk line contract, a limited physical transmission band can be utilized with efficiency, the service quality can be maintained and enhanced, the retransmission due to a loss of cells can be reduced; and accordingly, the congestion of the ATM network 10A can be reduced.

Incidentally, in the first embodiment, the network device 6A contains the cell compression unit 4A, and the network device 6B contains the compressed cell recovery unit 2B. However, the network device 6A may contain the compressed cell recovery unit 2B in stead of the compressed cell recovery unit 2, and the network device 6B may contain the cell compression unit 4A instead of the cell compression unit 4. With this arrangement, the similar effect can be achieved.

(c) Description of the Second Embodiment

FIG. 16 is a block diagram to illustrate the constructions of a network device 6C as the ATM cell compression recovery device relating to the second embodiment of the invention.

The network device 6C shown in FIG. 16 is also used in the same manner as the network device 6 shown in FIG. 1, as the ATM switch that applies the switching processing to the ATM cells transmitted in the ATM network as shown in FIG. 2.

The network device 6C applies, when an ATM cell (compressed cell) compressed in the ATM layer and an ATM cell (non-compressed cell) not compressed in the ATM layer are inputted through the transmission lines 7, the switching processing to the foregoing ATM cells to send out the results in the same manner as the network device 6 shown in FIG. 1. The network device 6C is comprised of the cell reception unit (CT) 1, a compressed cell recovery unit (CCR) 2C, the ATM switch unit (SW) 3 as a switch device, a cell compression unit (CC) 4C, and the cell transmission unit (CT) 5 as shown in FIG. 16.

Here, the cell reception unit 1, ATM switch unit 3, and cell transmission unit 5 each possess the same functions and constructions as those described in the "(a) Description of the Aspect of the Invention".

Figure 23:
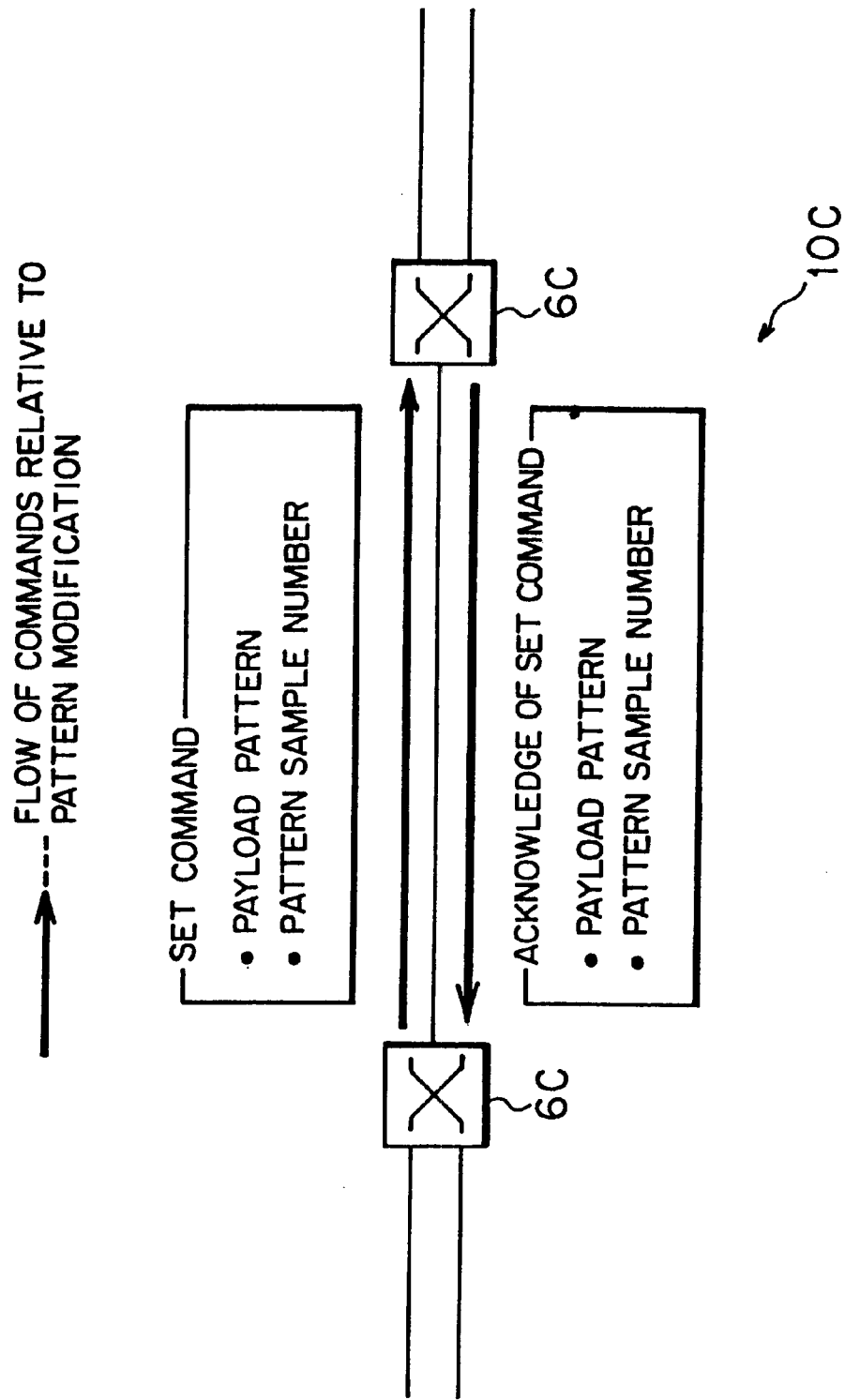
FIG. 23 and FIG. 24 are charts to illustrate the flows of the SET command and the Acknowledge to the SET command between the network devices relating to the second embodiment of the invention.

The cell compression unit 4C functions as an ATM cell compression device that compresses the data in the ATM layer; and the compressed cell recovery unit 2C functions as an ATM cell recovery device that recovers the data in the ATM layer. Specially, in the second embodiment, as shown in FIG. 23, two of the network devices 6C are mutually connected through the transmission lines 7 to constitute an ATM network 10C. Here, the description is made on the assumption that the pre-stage network device 6C functions as the ATM cell compression device that executes the compression processing of the ATM cells, and the post-stage network device 6C functions as the ATM cell recovery device that executes the recovery processing of the compressed cells.

Here, the cell compression unit 4C, detecting a compressible cell among the ATM cells after switched, applies the compression processing to the compressible ATM cell in the ATM layer to produce a compressed cell, and outputs the produced compressed cell and the non-compressed cells to the cell transmission unit 5. The cell compression unit 4C also employs the detection method by the pattern recognition during detecting a compressible cell, in the same manner as the cell compression unit 4A in the first embodiment To achieve the foregoing, the cell compression unit 4C is comprised of, as shown in FIG. 17, the cell compression processing control unit 11, cell compression targeted byte checker 12, compressed cell production unit 13, compressed cell storage buffer 14, stream switch units 15 and 17, cell compression inner buffer 16, transmission cell storage buffer 18, and compression pattern sample storage unit 26. Incidentally, these units have the same functions and constructions as those of the cell compression unit 4A in the first embodiment.

Further, in the cell compression unit 4C in the second embodiment, the compression pattern sample storage unit 26 is incorporated with a cell counter unit 30 and a pattern modification control unit 31, whereby the compression pattern sample storage unit 26 is able to dynamically modify compression pattern samples stored in the compression pattern sample storage unit 26.

Concretely, being provided with the cell counter unit 30 and the pattern modification control unit 31, the compression pattern sample storage unit 26 updates plural compression pattern samples stored in the compression pattern sample storage unit 26, serving the pattern sample of a high coincidence with inputted ATM cells as the compression pattern sample having a high priority; thus optimizing the compression pattern samples stored in the compression pattern sample storage unit 26.

Here, the pattern modification control unit 31 refers to the cell count results of the cell counter unit 30 described later, in order to optimize the type of the payload pattern samples, extracts the candidate of the payload pattern that has a high frequency of coincidence with the inputted ATM cells, and substitutes the one having a low frequency of coincidence of the payload pattern samples that are currently treated as the compression objects by the extracted candidate (that is, replaces the payload pattern sample in which the count number by the cell counter unit 30 is low by a new payload pattern; hereunder this work is also called as re-sampling).

Further, the pattern modification control unit 31 executes this re-sampling work of the payload pattern samples, to be synchronized with the compressed cell recovery unit 2C in the post-stage network device 6C to this network device 6C.

This is because it is necessary to bring the payload pattern sample stored in the compression pattern sample storage unit 26 of the cell compression unit 4C into coincidence with the payload pattern sample stored in the recovery pattern sample storage unit 29 of the compressed cell recovery unit 2C of the adjoining network device 6C, in order to compress and recover the data in the ATM network 10C. Thus, the pattern modification control unit 31 is designed to transmit a command [SET command being a command to modify the payload pattern sample] that registers the payload pattern sample of the ATM cell treated as a new compression object in the recovery pattern sample storage unit 29 of the compressed cell recovery unit 2C of the adjoining network device 6C. And, when it does not receive a response of this SET command, within a fixed time the pattern modification control unit 31 retransmits the SET command.

Figure 21:
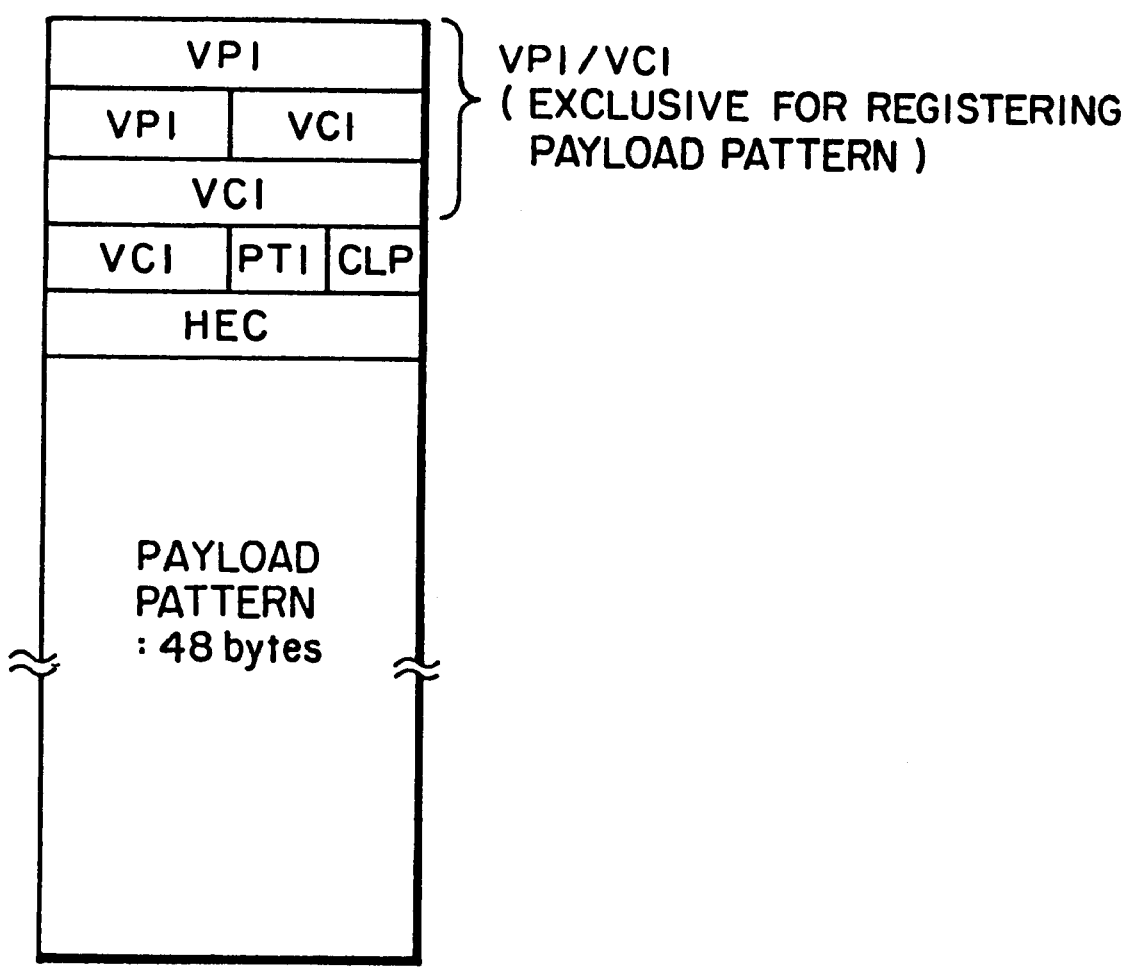
FIG. 21 is a chart to illustrate an example of the format of a SET command.

FIG. 21 illustrates one example of the format of the SET command. As shown in FIG. 21 and FIG. 23, the SET command includes information to indicate the payload pattern and the pattern sample number. Further, in the SET command shown in FIG. 21, VPI/VCI are preset exclusively for registering the payload pattern, the pattern sample number (for example, 0 through 15) of the payload pattern newly registered is indicated in PTI/CLP, and the entity of the compressible payload newly registered is designed to be written in the payload pattern.

The cell counter unit 30 counts the data whereby the pattern sample of a high coincidence with inputted ATM cells is selected among plural compression pattern samples stored in the compression pattern sample storage unit 26. The cell counter unit 30 contains a total cell counter 30A, a payload pattern counter 30B, and a SET command retransmission counter 30C.

The total cell counter 30A counts the total number of the ATM cells transmitting through the cell compression unit 4C, after the total cell counter 30A was reset at the last time.

The payload pattern counter 30B counts a frequency that, of the compression pattern samples stored in the compression pattern sample storage unit 26, the payload pattern samples currently treated as a compression object and the candidates of the payload pattern samples that can be a future compression object are coincident with the payload patterns of the ATM cells that transmit through the cell compression unit 4C. The payload pattern counter 30B contains a table 30d as shown in FIG. 19, and stores the foregoing count results in this table.

The data stored in the table 30d will now be described.

(1) Priority

The 'priority' presents a frequency that the payload patterns of the ATM cells transmitting through the cell compression unit 4C are coincident with the payload pattern samples in the compression pattern sample storage unit 26, and a lower number indicates a higher frequency. In this case, the priority is made coincident with the pattern sample number to simplify the processing.

(2) Count Number

The 'count number' presents a frequency that the ATM cells having the same payload patterns as the samples of the payload patterns corresponding to each priority in the compression pattern sample storage unit 26 transmit through the cell compression unit 4C, after the total cell counter 30A was reset at the last time.

(3) Status

The 'status' presents a status of the payload pattern of each priority, and the meaning of each status will be explained hereunder.

(i) Object

The 'object' indicates that the sample of the concerned payload pattern is now treated as a compression object. When the payload pattern sample under this status is coincident with the payload part of an ATM cell transmitting through the cell compression unit 4C, the ATM cell becomes a compression object.

(ii) Candidate

The 'candidate' indicates the possibility that the sample of the concerned payload pattern will become a compression object. When the payload pattern sample under this status is coincident with the payload part of an ATM cell transmitting through the cell compression unit 4C, the ATM cell is not compressed however, the count number of the payload pattern sample by the cell counter unit 30 is incremented.
(iii) Under Modification The 'under modification' indicates that the pattern modification control unit 31 is in a queue of a response to the transmitted SET command. It turns into the status of the 'object' when the pattern modification control unit 31 receives the response to the transmitted SET command.

Figure 20:
FIG. 20 is a chart to explain a SET command retransmission counter.

The SET command retransmission counter 30C counts the retransmission frequency of the foregoing SET command and contains a table 30e as shown in FIG. 20 to store the count results therein. The field of this table 30e presents the retransmission frequency of the SET command.

Incidentally, the compressed cell recovery unit 2C, detecting a compressed cell among the ATM cell flows received, recovers the compressed cell into the original cell, and outputs the recovered cell to the ATM switch unit 3. Here, the compressed cell recovery unit 2C also employs the recovery method by the pattern recognition in the same manner as the compressed cell recovery unit 2B in the first embodiment, during recovering the compressed cell into the original ATM cell.

To achieve the foregoing, the compressed cell recovery unit 2C is comprised of, as shown in FIG. 18, the cell compression processing control unit (CCPC) 19, the compressed cell detection unit (CCD) 20, the cell recovery unit (CR) 21, the compressed cell storage buffer (CCSB) 22, the stream switch unit (SS) 23, the transmission cell storage buffer for ATM switch unit 24, the cell compression internal buffer 25, and the recovery pattern sample storage unit 29, each possesses the same functions and constructions as those of compressed recovery cell 2B in the first embodiment.

Further, in the compressed cell recovery unit 2C in the second embodiment, the recovery pattern sample storage unit 29 is incorporated with a pattern modification control unit 32, whereby the recovery pattern sample storage unit 29 is able to dynamically modify recovery pattern samples stored in the recovery pattern sample storage unit 29.

Concretely, being incorporated with the pattern modification control unit 32, the recovery pattern sample storage unit 29 updates plural recovery pattern samples stored in the recovery pattern sample storage unit 29, serving the pattern sample of a high coincidence with the original ATM cell corresponding to the inputted compressed cell as the recovery pattern sample having a high priority; thus optimizing the recovery pattern samples (concretely, the recovery pattern sample storage unit 29 modifies the recovery pattern samples stored in the recovery pattern sample storage unit 29, while following the modified contents of the compression pattern samples stored in the compression pattern sample storage unit 26, thereby optimizing the recovery pattern samples).

Here, the pattern modification control unit 32, detecting the pattern sample modification command (SET command) from the pre-stage network device 6C, executes in accordance with this SET command the modification work of the payload pattern samples in the recovery pattern sample storage unit 29 into the same ones as the payload pattern samples in the compression pattern sample storage unit 26.

When completing the modification work of the payload pattern sample, the pattern modification control unit 32 sends back a completion response pattern sample modification [Acknowledge of the SET command] to the network device 6C being the transmission source of the pattern sample modification command.

Figure 22:
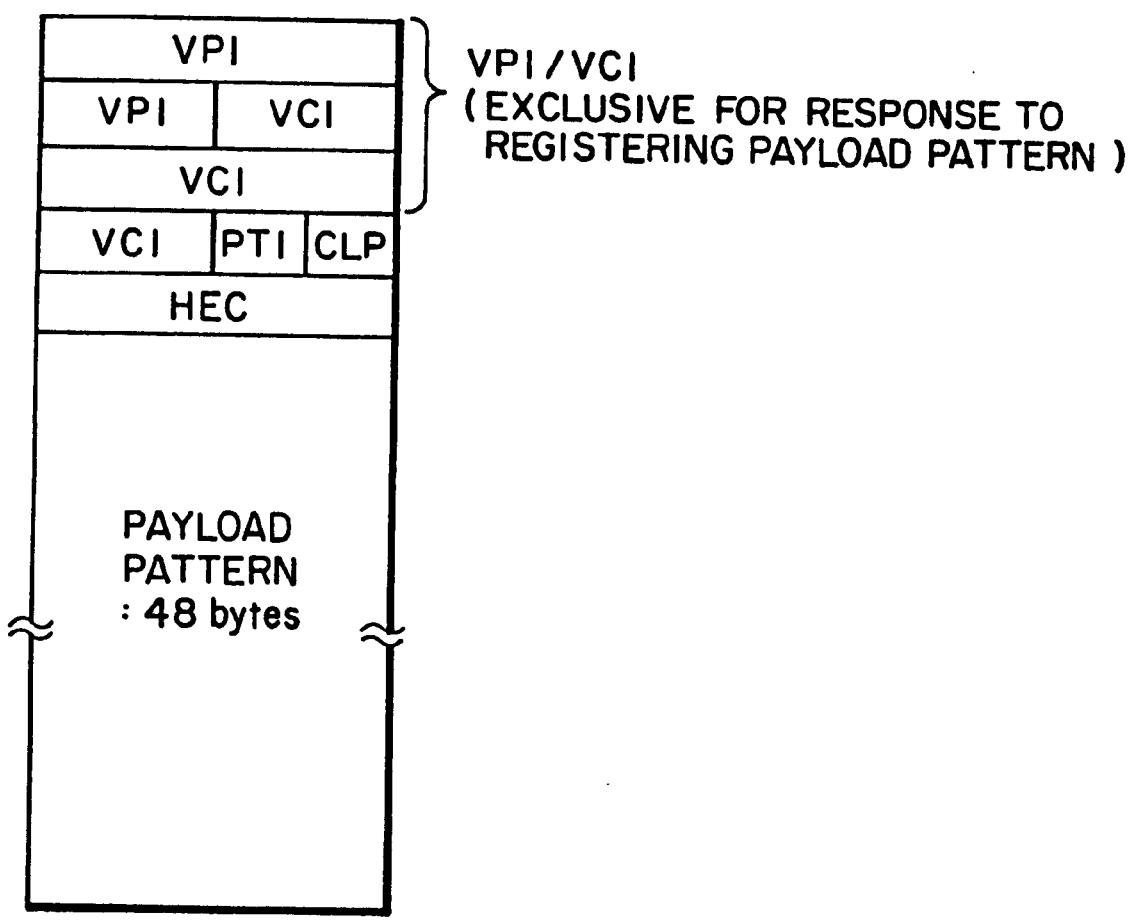
FIG. 22 is a chart to illustrate an example of the format of Acknowledge to the SET command.

FIG. 22 illustrates one example of the format of the Acknowledge (response) of the SET command. As shown in FIG. 22 and FIG. 23, the Acknowledge of the SET command includes information to indicate the payload pattern and the pattern sample number. Further, in the Acknowledge of the SET command shown in FIG. 22, VPI/VCI are preset exclusively for a response to a command for registering the payload pattern, the pattern sample number (for example, 0 through 15) of the payload pattern newly registered is indicated in PTI/CLP, and the entity of the compressible payload newly registered is designed to be written in the payload pattern.

Figure 24:
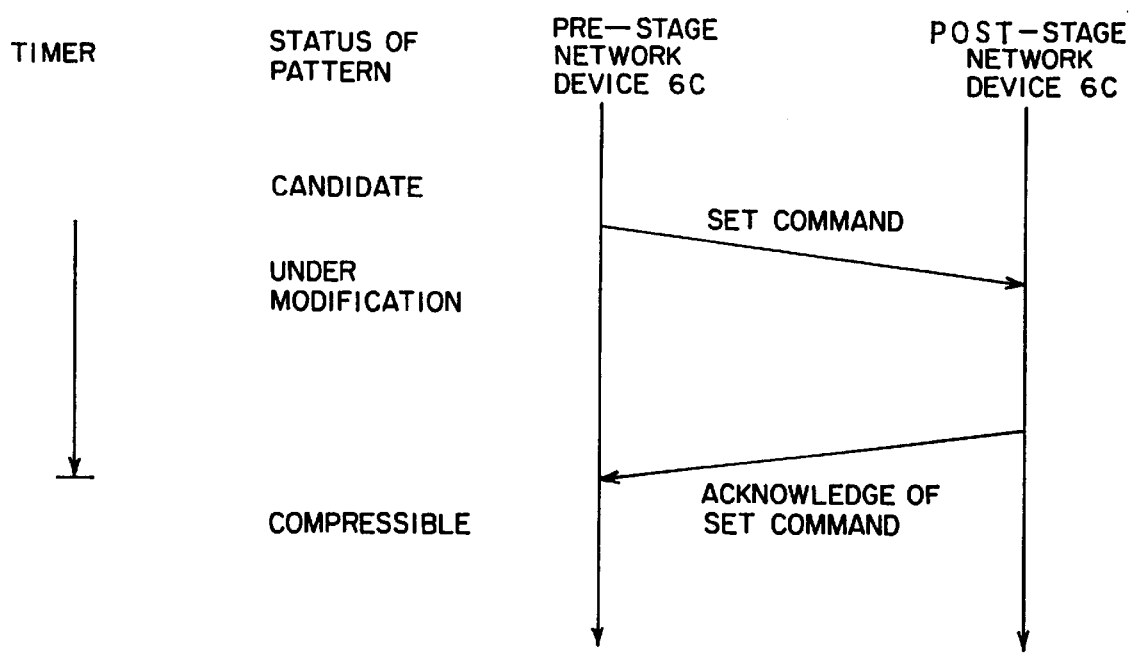

FIG. 16 illustrates the flows of the pattern sample modification command (SET command) and the completion response pattern sample modification [Acknowledge of the SET command] inside of the network device 6C. FIG. 23 and FIG. 24 illustrate the flows of the pattern sample modification command (SET command) and the completion response pattern sample modification [Acknowledge of the SET command] between the network devices 6C.

The points of the second embodiment are as follows.

(1) The cell counter unit 30 and pattern modification control unit 31 of the cell compression unit 4C monitor the flows of the ATM cells to search frequently appearing recognition patterns, and optimize to dynamically modify the types of the compression pattern samples stored in the compression pattern sample storage unit 26, thus enhancing the patternizing rate.

(2) When the cell compression unit 4C of the pre-stage network device 6C dynamically modifies the types of the compression pattern samples stored in the compression pattern sample storage unit 26, the pre-stage network device 6C communicates in synchronization with the post-stage network device 6C, and thereby the cell compression unit 4C automatically reflects the modified contents of the pattern samples upon the recovery pattern samples stored in the recovery pattern sample storage unit 29 of the compressed cell recovery unit 2C of the post-stage network device 6C.

According to the foregoing construction, the operation as described hereunder is performed in the network devices 6C relating to the second embodiment.

Here, the network devices 6C perform the same operations as the network device 6 described in the "(a) Description of the Aspect of the Invention".

On the other hand, in the ATM network 10C (see FIG. 23), the pre-stage network device 6A mainly performs the compression processing of the ATM cells, and the post-stage network device 6B mainly performs the recovery processing of the compressed cells. Incidentally, the compression processing of the ATM cells and the recovery processing of the compressed cells are carried out in each of the ATM service categories.

First, the compression processing of the ATM cells in the pre-stage network device 6C will be explained. In the network device 6C, the cell compression unit 4C executes the ATM cell compression step, in which the cell compression targeted byte checker 12 of the cell compression unit 4C determines whether an inputted ATM cell is a compression object cell (compression object cell determination step). Here, the cell compression targeted byte checker 12 determines, on the basis of the compression pattern sample stored in the compression pattern sample storage unit 26, whether the ATM cell is a compression object cell.

The cell compression targeted byte checker 12 determines that the ATM cell is a compression object cell, and then the compressed cell production unit 13 applies the compression processing to the ATM cell in the ATM layer to produce a compressed cell (compressed cell production step).

Here, in the cell compression unit 4C of the network device 6C relating to the second embodiment, the pattern modification control unit 31 updates plural compression pattern samples stored in the compression pattern sample storage unit 26, serving the pattern sample of a high coincidence with inputted ATM cells as the compression pattern sample having a high priority; thus optimizing the compression pattern samples stored in the compression pattern sample storage unit 26.

The compression processing of the ATM cell and the optimization processing of the compression pattern sample in this case will further be explained with reference to the flowcharts shown in FIG. 26 through FIG. 33.

First, the abbreviations used in the following description will be explained.

(1) 'P' indicates the total number of the payload pattern samples registered as compression objects.

(2) 'PCA' indicates the number of candidates of the payload pattern samples having the possibility of being registered as compression objects in the future. The frequency in which these patterns are coincident with the payloads passing through the cell compression unit 4C is searched.

(3) 'MCC' indicates the total number of cells transmitting through the cell compression unit 4C in the re-sampling interval between the previous re-sampling and the next re-sampling.

(4) 'RES' indicates the number of types of payload pattern samples that were re-sampled during re-sampling. In other words, the re-sampling of the payload pattern samples is executed by the number of 'RES' in the ascending order of the count number. 'RES' is needed to be more than 0 and less than the value of 'PCA'; and usually 'RES' is regarded as the total candidate number of 'PCA', because all the pattern samples being candidates are re-sampled. Each time the payload pattern is re-sampled, 'RES' is decremented by 1, and when the re-sampling is finished, 'RES' is returned to 0.

(5) 'SRTR' indicates the maximum retransmission frequency of the SET command when the response to the SET command is not sent back.

(6) '$X_R$' (R=priority) indicates the count number of the pattern sample in a certain priority in the cell counter unit 30 (see FIG. 19).

In order to simplify the following explanation, the pattern sample number is made to coincide with the priority.

Figure 26:
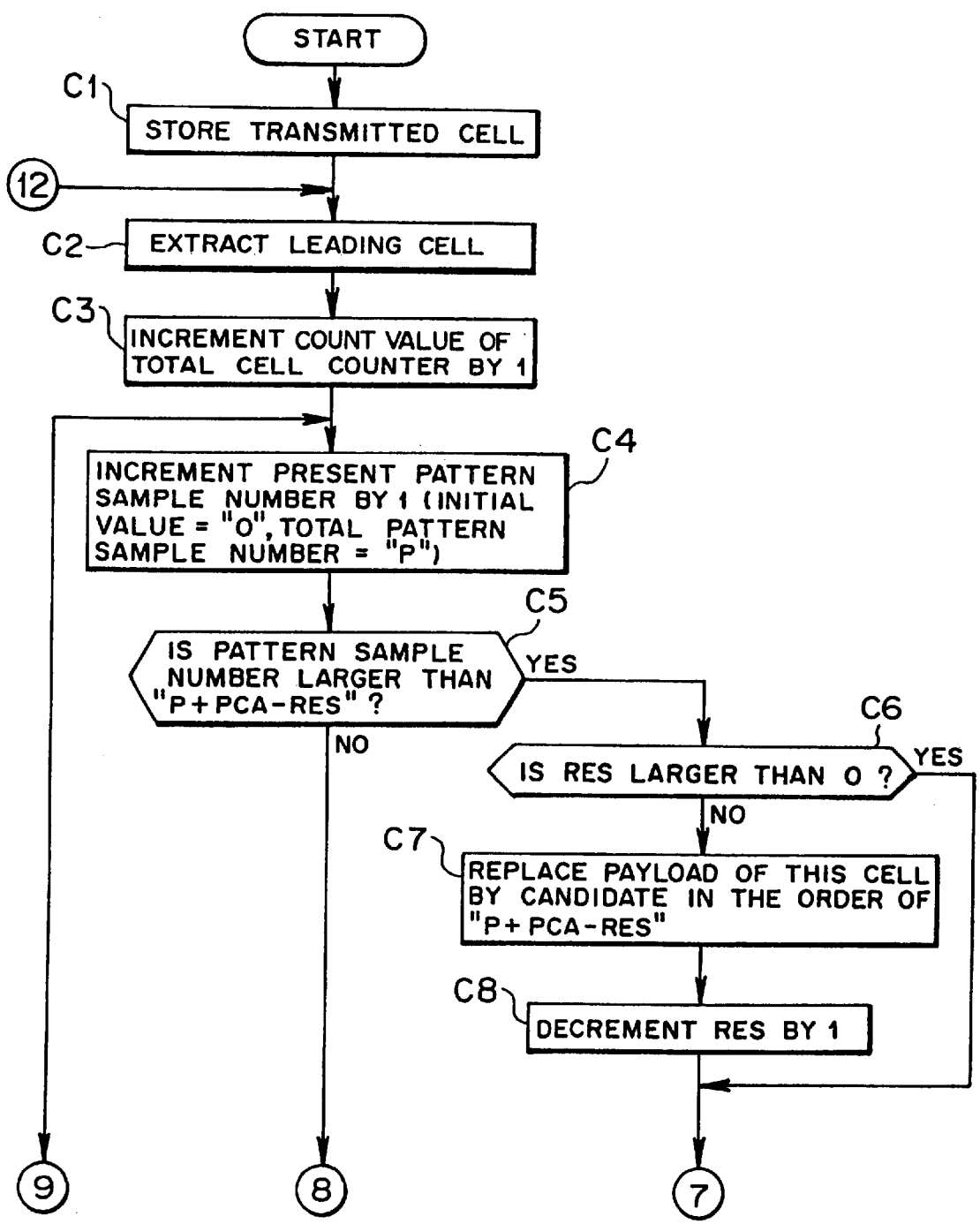
FIG. 26 through FIG. 33 are flowcharts to explain the compression processing of an ATM cell and the optimization processing of a compression pattern sample, in the network device relating to the second embodiment of the invention.

First, the ATM cells transmitted to the cell compression unit 4C are covered in the cell compression inner buffer 16 (step C1 in FIG. 26).

The cell compression targeted byte checker 12 extracts the leading ATM cell from the cell compression inner buffer 16 (step C2 in FIG. 26), and increments by 1 the count value of the total cell counter unit 30A in the cell counter unit 30 (step C3 in FIG. 26).

Further, the cell compression targeted byte checker 12 increments by 1 the present number of the pattern sample. Here, the initial value of the pattern sample number is set to '0', and the total number of the pattern samples stored is set to 'P' (step C4 in FIG. 26).

And, the cell compression targeted byte checker 12 determines whether the pattern sample number is larger than 'P+PCA−RES' (namely, whether the pattern sample of the inputted ATM cell does not coincide with all the pattern samples except the payload pattern samples that are to be replaced by the re-sampling) (step C5 in FIG. 26).

If the pattern sample number is larger than 'P+PCA−RES', the pattern modification control unit 31 determines whether RES>0 is met (namely whether the re-sampling is completed) (from Yes route of step C5 to step C6 in FIG. 26).

And, if RES>0 is met, the pattern modification control unit 31 replaces the payload of this cell by the candidate in the order of 'P+PCA−RES' (replaces a new payload pattern by the sample of a lower order payload pattern), re-samples the payload pattern (from No route of step C6 to step C7 in FIG. 26), and decrements RES by 1 (subtracts by 1 the number of the samples of the payload patterns to be re-sampled) (step C8 in FIG. 26). If RES>0 is not met, the processings at step C7 and step C8 are not executed (Yes route of step C6).

Figure 27:
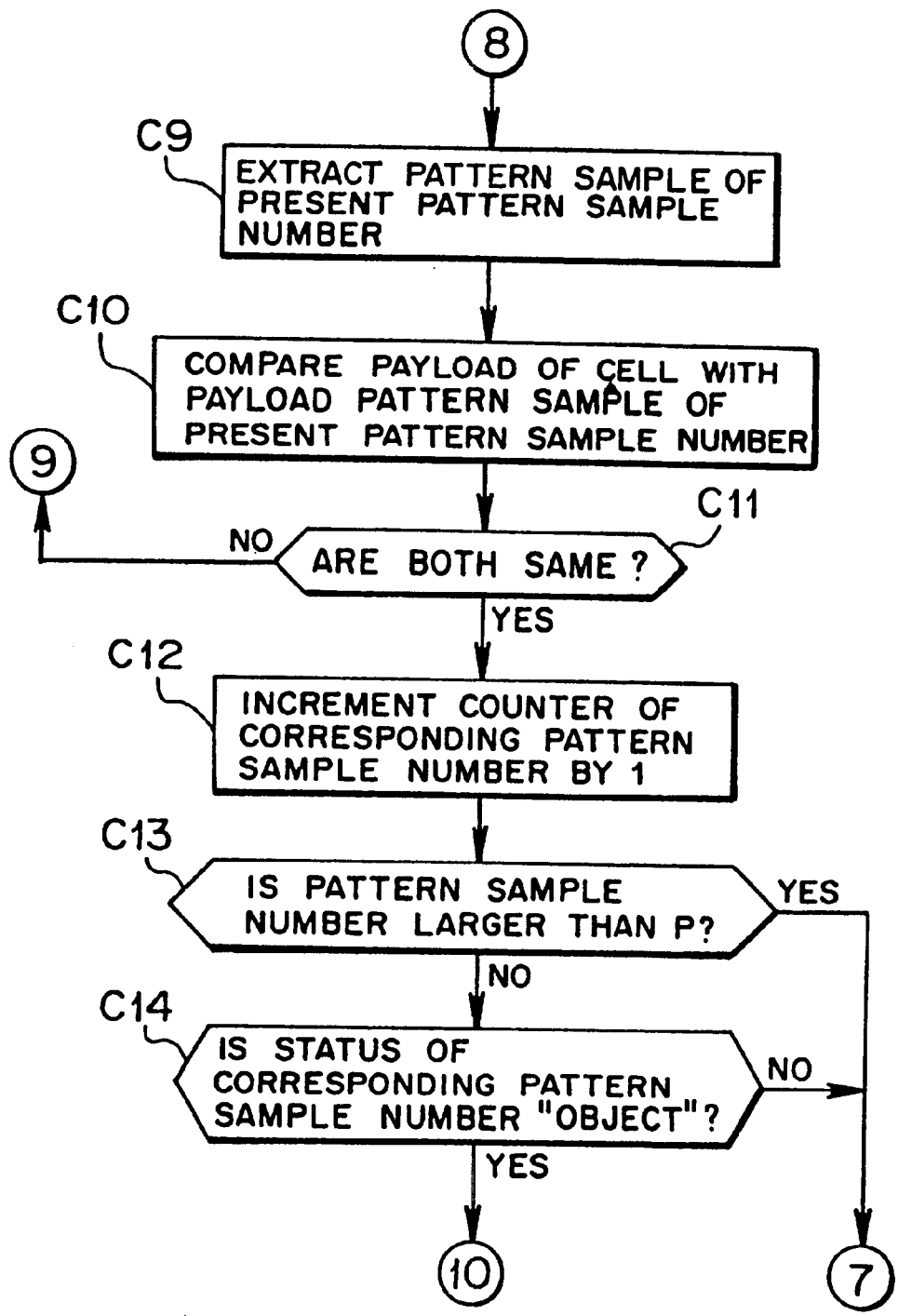

If the pattern sample number is smaller than 'P+PCA−RES', the cell compression targeted byte checker 12 extracts a pattern sample of the present pattern sample number from the compression pattern sample storage unit 26 (from No route of step C5 to step C9 in FIG. 27), compares the payload of the cell with the sample of the present pattern sample number (step C10 in FIG. 27), and determines whether the payload of the cell is identical to the present pattern sample number (step C11 in FIG. 27).

If the payload of the cell is identical to the present pattern sample number, the cell counter unit 30 increments by 1 the payload pattern counter 30B corresponding to the pattern sample number (from Yes route of step C11 to step C12 in FIG. 27). If the payload of the cell is not identical to the present pattern sample number, the foregoing steps after step C4 are repeated (from No route of step C11 to step C4).

Further, the pattern modification control unit 31 determines whether the pattern sample number is greater than 'P' (step C13 in FIG. 27). If the pattern sample number is not greater than 'P', the pattern modification control unit 31 determines whether the status of the payload pattern corresponding to the pattern sample number is 'object' (from No route of step C13 to step C14 in FIG. 27).

Figure 28:
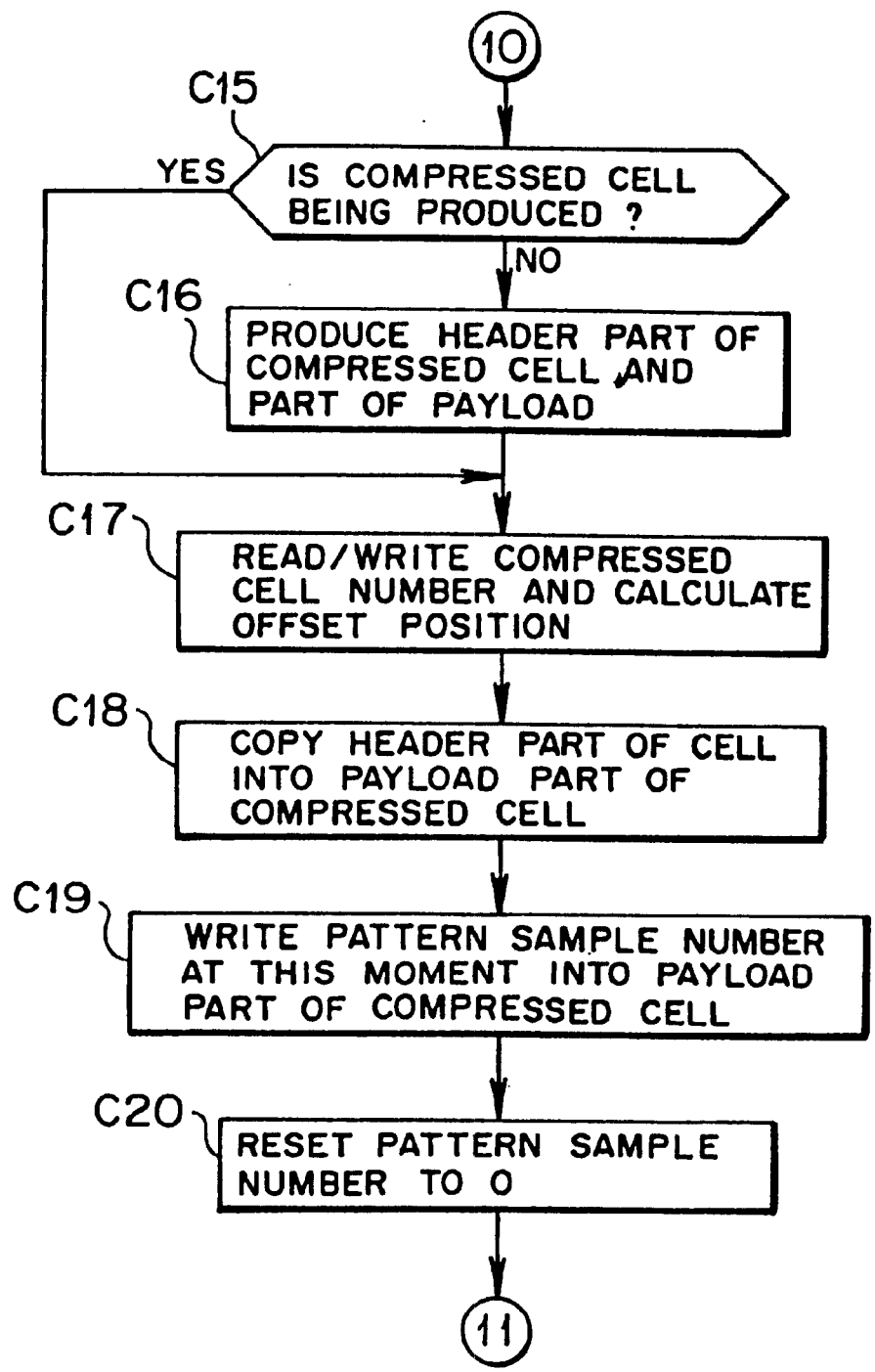

Next, the compressed cell production unit 13 determines whether the compressed cells are already produced (from Yes route of step C14 to step C15 in FIG. 28). If the compressed cells are not yet produced, the compressed cell production unit 13 produces the header parts (to indicate OAM) of the compressed cells and part of the payloads (OAM type field to indicate a compressed cell) in the compressed cell storage buffer 14 (from No route of step C15 to step C16 in FIG. 28). If the compressed cells are already produced, the compressed cell production unit 13 does not conducts the processing of this step C16 (Yes route of step C15).

And, the compressed cell production unit 13 reads/writes the number of compressed cells from/into the compressed cell storage buffer 14, and calculates the offset position (step C17 in FIG. 28).

Further, the compressed cell production unit 13 copies the header part of the cell into the payload part of the compressed cell stored in the compressed cell storage buffer 14 (step C18 in FIG. 28), and writes the pattern sample number at that moment onto the foregoing payload part (step C19 in FIG. 28). Thereafter, the compressed cell production unit 13 resets the pattern sample number to 0 (step C20 in FIG. 28), and increments by 1 the compressed cell number of the compressed cell (step C21 in FIG. 29).

Figure 29:
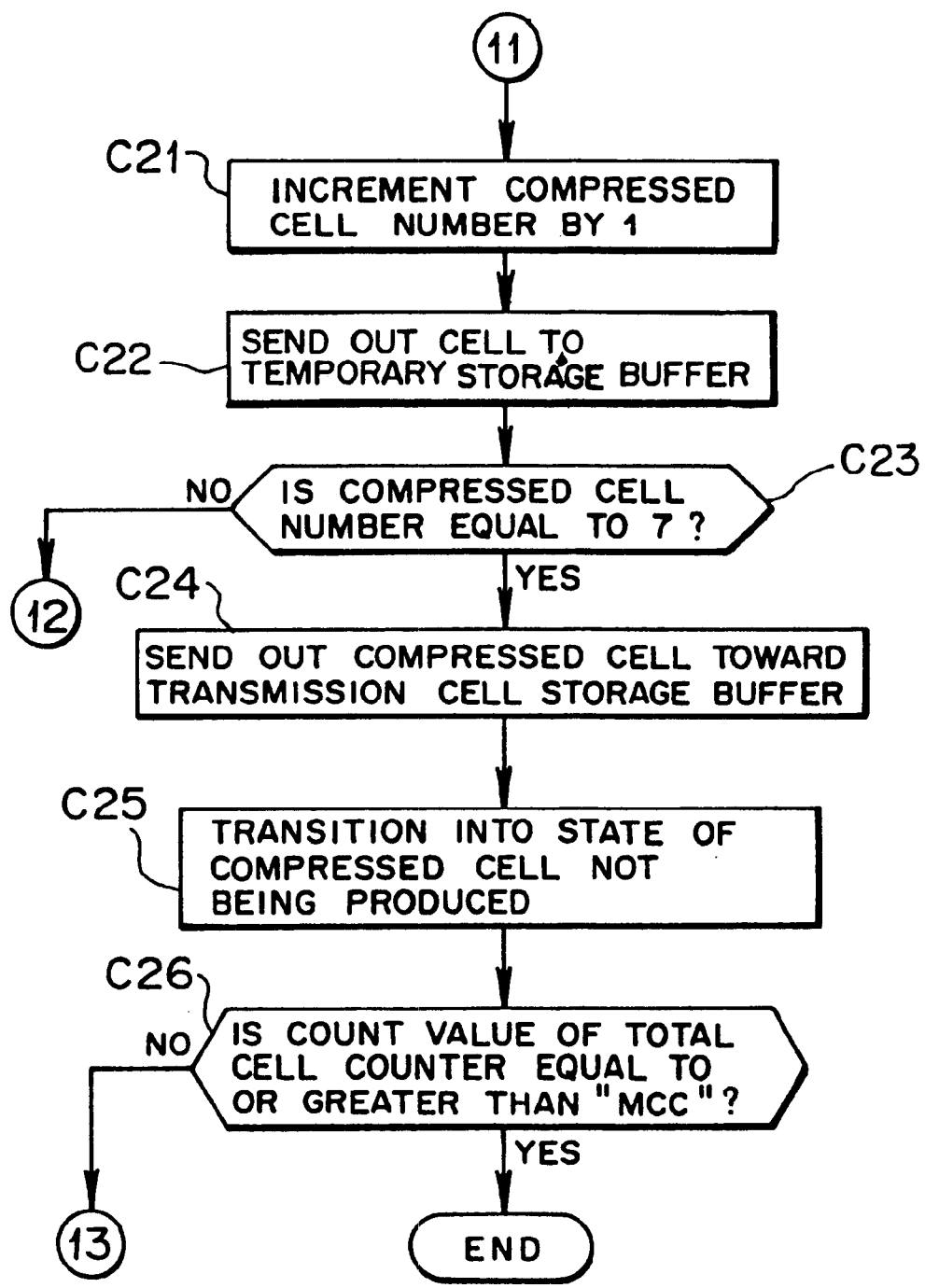

On the other hand, the stream switch unit 17 sends out the ATM cells to the temporary storage buffer 27 (step C22 in FIG. 29), and the compressed cell production unit 13 determines whether the compressed cell number is equal to 7 (step C23 in FIG. 29). If the compressed cell number is equal to 7, the stream switch unit 15 sends out the compressed cells toward the transmission cell storage buffer 18 (from Yes route of step C23 to step C24 in FIG. 29), and the status transitions into a status where the compressed cells are not produced (step C25 in FIG. 29). If the compressed cell number is determined less than 7, the foregoing steps after step C2 are repeated (from No route of step C23 to step C2).

Further, the pattern modification control unit 31 determines whether the count value of the total cell counter 30A is equal to or more than 'MCC' (namely, whether the optimization and re-sampling processing can be started) (step C26 in FIG. 29). If the count value is equal to or more than 'MCC', the processing is ended (Yes route of step C26).

Figure 31:
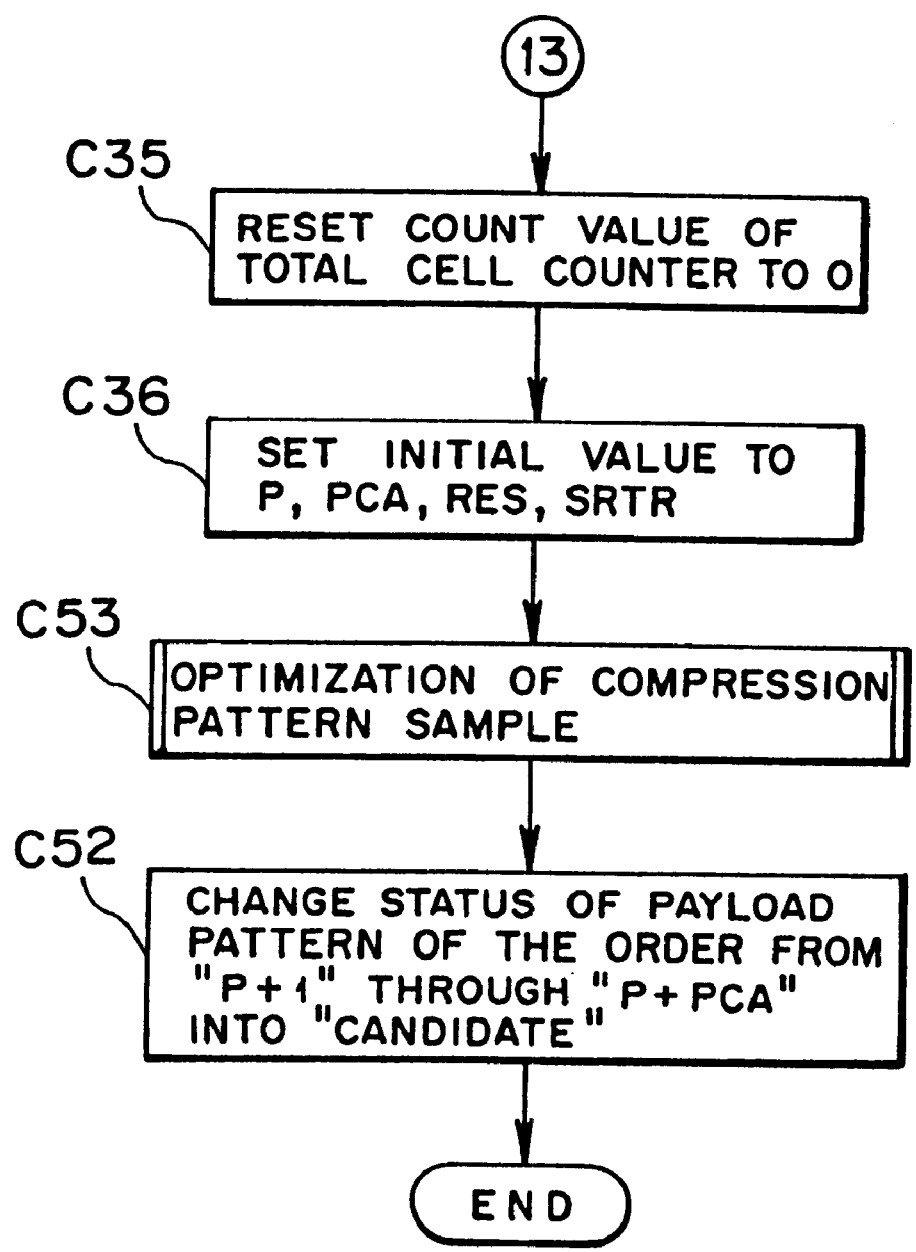

On the other hand, if the count value is not equal to and less than 'MCC', the cell count unit 30 resets the count value of the total cell counter 30A to 0 (from No route of step C26 to step C35 in FIG. 31), and sets the initial values to P, PCA, MCC, RES, and SRTR (step C36 in FIG. 31).

And, while synchronizing with the post-stage network device 6C (the pattern modification control unit 32 of the compressed cell recovery unit 2c in the post-stage network device 6C, the pattern modification control unit 31 optimizes the compressed cell pattern sample (step C53 in FIG. 31; the detail will be mentioned later), and changes the status of the payload patterns of the order from 'P+1' through 'P+PCA' into 'candidate' (step C52 in FIG. 31).

Figure 30:
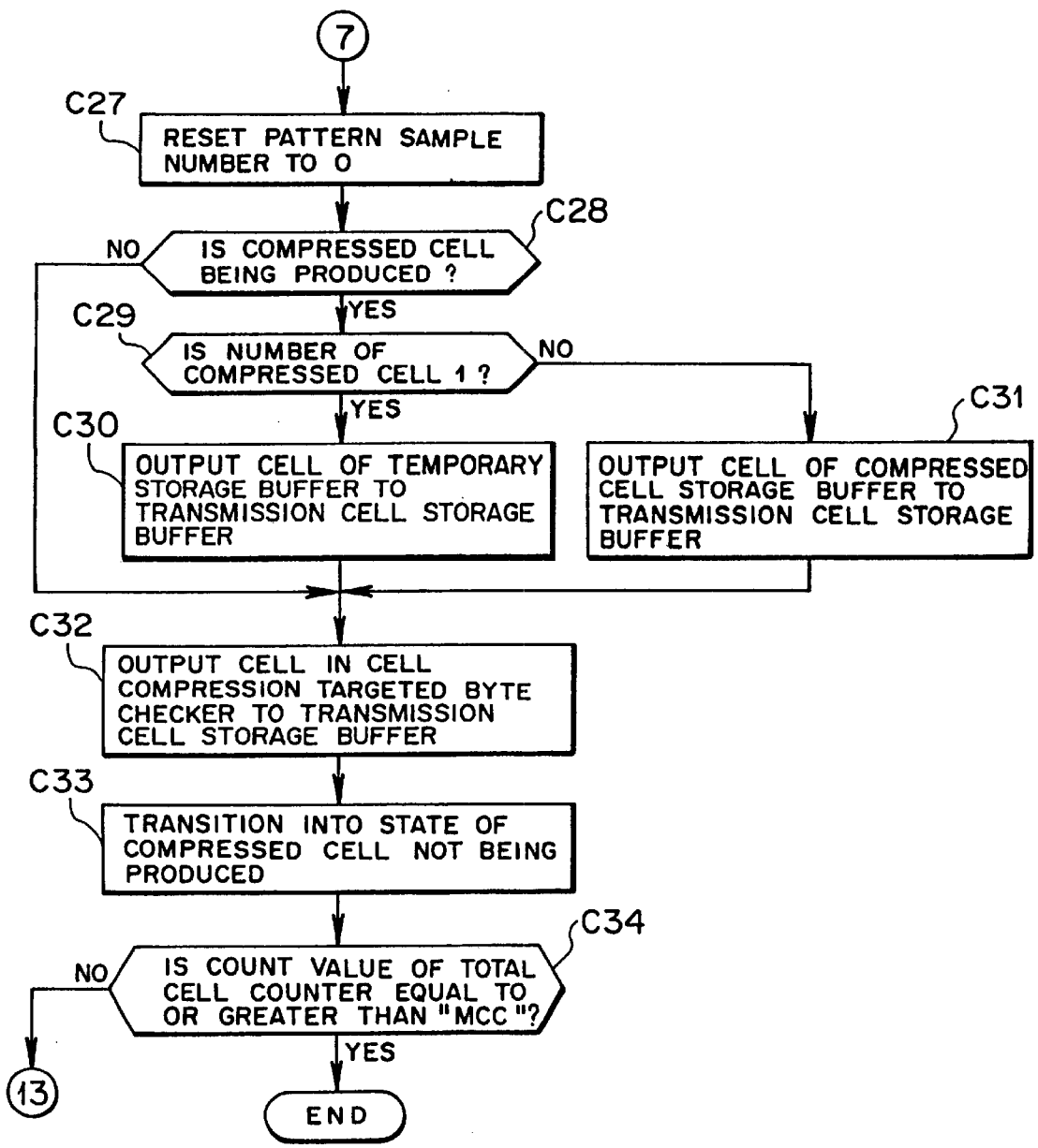

Incidentally, after the foregoing step C8 (see FIG. 26) is completed, if the pattern modification control unit 31 determines that the pattern sample number is greater than 'P' at the foregoing step C13 (see FIG. 27) (Yes route of step C13), and if the pattern modification control unit 31 determines that the status of the pattern sample number is not 'object' (No route of step C14) at the foregoing step C14 (see FIG. 27), the compressed cell production unit 13 resets the pattern sample number to 0 (step C27 in FIG. 30).

Next, the compressed cell production unit 13 determines whether the compressed cells are already produced (step C28 in FIG. 30). If the compressed cells are already produced, the compressed cell production unit 13 determines whether the number of the compressed cells is 1 (from Yes route of step C28 to step C29 in FIG. 30).

And, if the number of the compressed cells is 1, the stream switch unit 15 outputs the ATM cells in the temporary storage buffer 27 to the transmission cell storage buffer 18 (from Yes route of step C29 to step C30 in FIG. 30). If the number of the compressed cells is not equal to 1, the stream switch unit 15 outputs the ATM cells in the compressed cell storage buffer 14 to the transmission cell storage buffer 18 (from No route of step C29 to step C31 in FIG. 30). On the other hand, if the compressed cells are not being produced, the compressed cell production unit 13 does not conduct the steps from step C29 through step C31 (No route of step C28)

Thereafter, the stream switch unit 17 sends out the ATM cells in the cell compression targeted byte checker 12 to the transmission cell storage buffer 18 (step C32 in FIG. 30), and the status transitions into a status where the compressed cells are not being produced (step C33 in FIG. 30).

Further, the pattern modification control unit 31 determines whether the count value of the total cell counter 30A is greater than 'MCC' (namely, whether the optimization and re-sampling processing can be started) (step C34 in FIG. 30); and if the count value is greater than 'MCC', the processing is ended (Yes route of step C34).

On the other hand, if the count value is not greater than 'MCC', the cell count unit 30 and the pattern modification control unit 31 conduct the same processings as the ones described in the foregoing step C35 through step C37, and step C52 (from No route of step C34 to step C35).

Here, the optimization processing of the compression pattern sample at the foregoing step C53 (see FIG. 31) will be explained. The pattern modification control unit 31 sorts the candidate order from 'P+1' through 'P+PCA' in the descending order of the count number (count value) (step C37 in FIG. 32).

Figure 32:
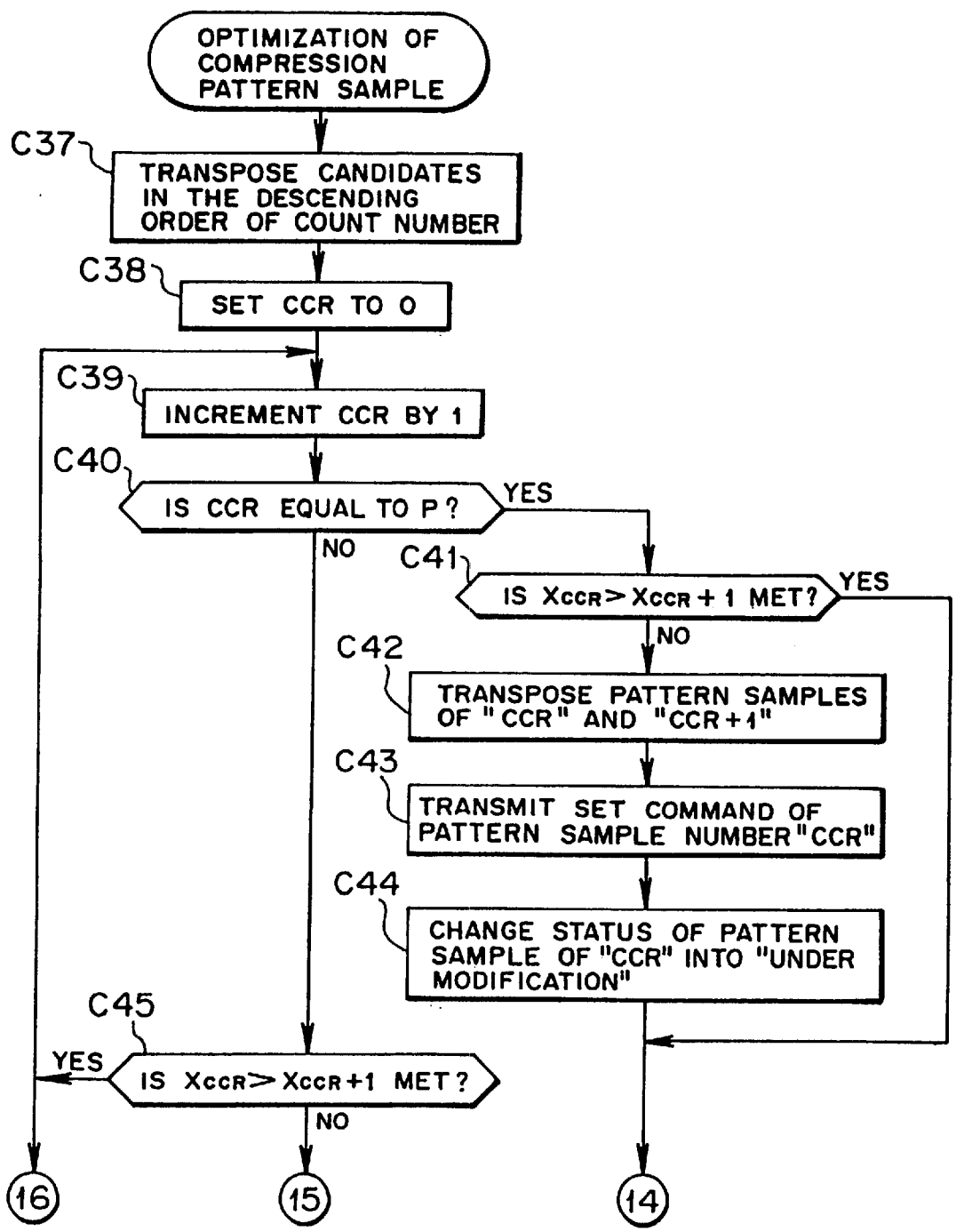

Next, the pattern modification control unit 31 sets a check object order count number (hereunder, referred to as CCR) to 0 (step C38 in FIG. 32), and then increments CCR by 1 (step C39 in FIG. 32).

And, the pattern modification control unit 31 determines whether CCR=P is met (step C40 in FIG. 32). If CCR=P is not met, the pattern modification control unit 31 determines whether $X_{CCR} > X_{CCR+1}$ is met (from No route of step C40 to step C45 in FIG. 32).

Figure 33:
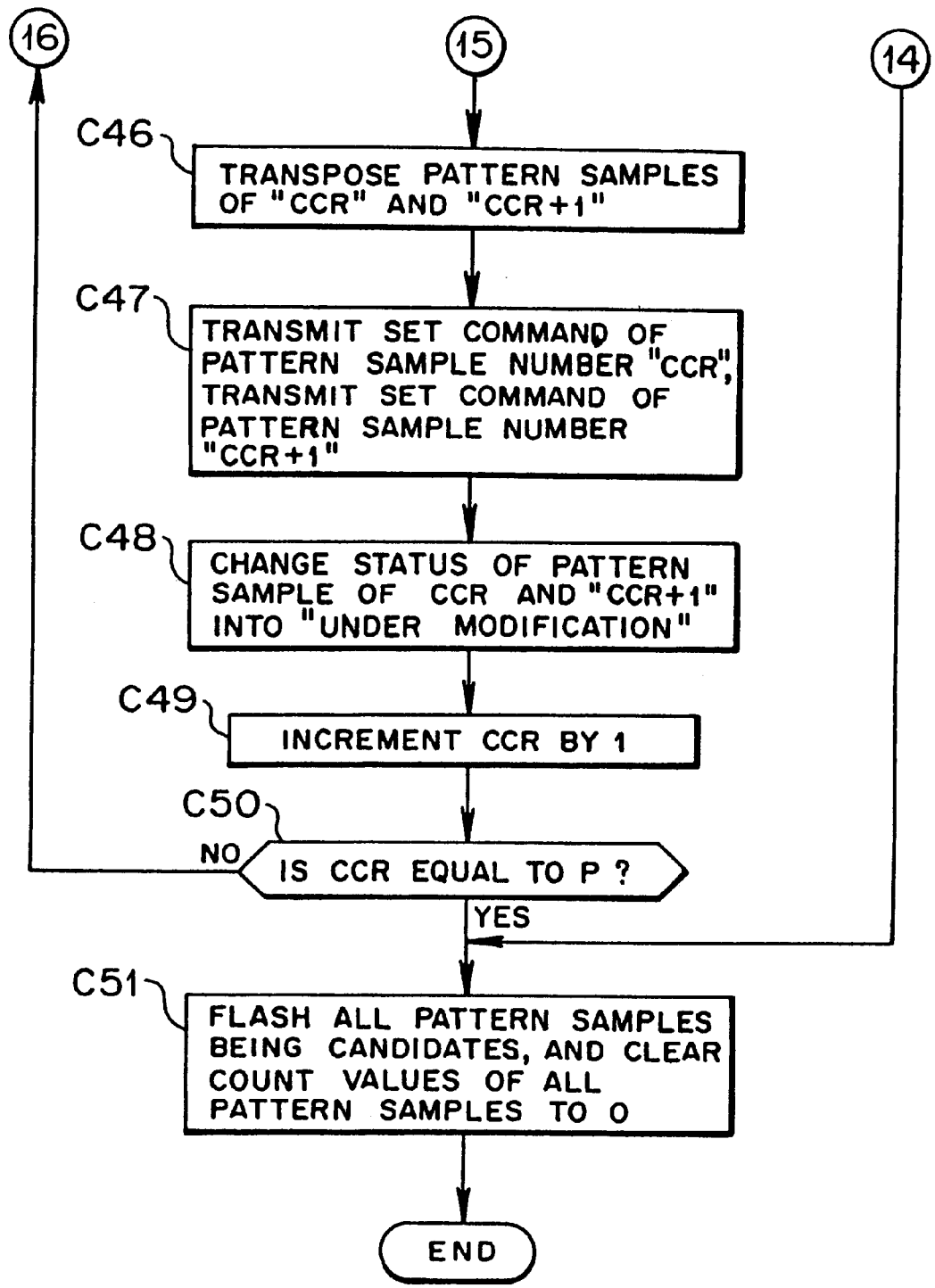

Here, if $X_{CCR} > X_{CCR+1}$ is met, the pattern modification control unit 31 repeats the steps after the foregoing step C39 (from Yes route of step C45 to step C39 in FIG. 32); if $X_{CCR} > X_{CCR+1}$ is not met, the pattern modification control unit 31 transposes the pattern samples of 'CCR' and 'CCR+1' (from No route of step C45 to step C46 in FIG. 33).

And, the pattern modification control unit 31 transmits the pattern sample modification command (SET command) of the pattern sample number 'CCR', and the pattern sample modification command (SET command) of the pattern sample number 'CCR+1' (step C47 in FIG. 33). The pattern modification control unit 31 changes the status of the pattern sample of 'CCR' and the status of the pattern sample of 'CCR+1' in the table 30d (see FIG. 19) into 'under modification' (step C48 in FIG. 33).

Further, the pattern modification control unit 31 increments CCR by 1 (step C49 in FIG. 33), and determines whether CCR=P is met (step C50 in FIG. 33). If CCR=P is met, the pattern modification control unit 31 flashes all the pattern samples (being the candidates) from the order 'P+1' through 'P+PCA' to clear the count number of the pattern samples from the order '1' through 'P+PCA' to 0 (from Yes route of step C50 to step C51 in FIG. 33). And, if CCR=P is not met, the pattern modification control unit 31 repeats the steps after the foregoing step C39 (from No route of step C50 in FIG. 33 to step C39 in FIG. 32).

On the other hand, at the foregoing step C40, if the pattern modification control unit 31 determines that CCR=P is met, the pattern modification control unit 31 further determines whether $X_{CCR} > X_{CCR+1}$ is met (from Yes route of step C40 to step C41 in FIG. 32).

And, if $X_{CCR} > X_{CCR+1}$ is not met, the pattern modification control unit 31 transposes the pattern samples of 'CCR' and 'CCR+1' (from No route of step C41 to step C42 in FIG. 32). Further, the pattern sample modification control unit 31 transmits the pattern sample modification command (SET command) of the pattern sample number 'CCR' (step C43 in FIG. 32) changes the status of the pattern sample of 'CCR' in the table 30d (see FIG. 19) into 'under modification' (step C44 in FIG. 32), and then executes the processing at the foregoing step C51 in FIG. 33.

Further, if $X_{CCR} > X_{CCR+1}$ is met, the pattern modification control unit 31 does not execute the processings from the step C42 through step C44 (Yes route of step C41), and executes the processing at the foregoing step C51 in FIG. 33.

Here as an example, the optimization processing when the number of the pattern samples of the compression objects is 6 (P=6) and the number of the candidates is 2 (PCA=2) will be described with reference to FIG. 25, and FIG. 37 through FIG. 42.

Figure 25:
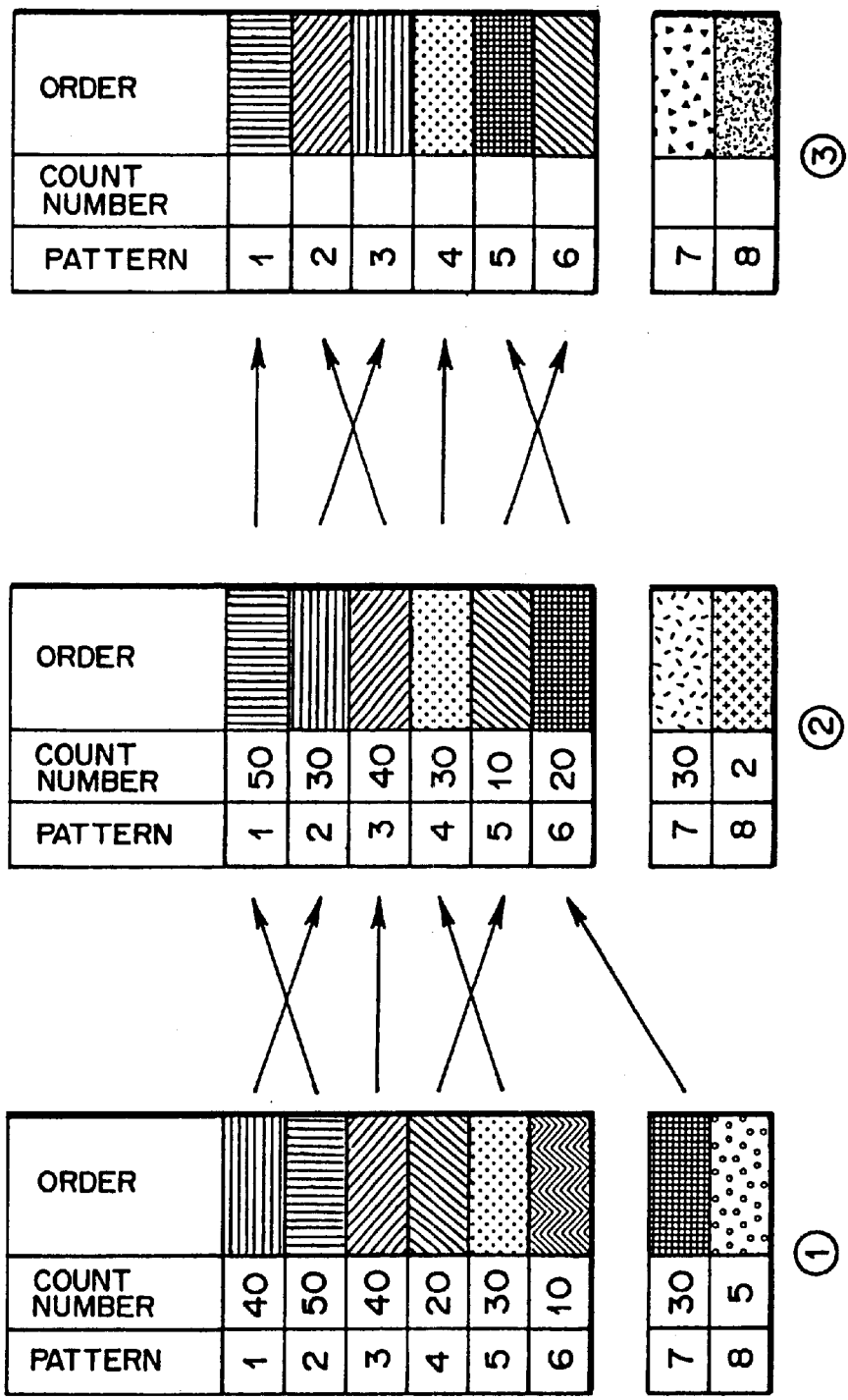
FIG. 25 is a chart to explain the optimization processing of a pattern sample.

FIG. 25 illustrates the concept of the transposition processing of the pattern samples in correspondence with the count number of the payload patterns in the optimization processing.

FIG. 25 ① illustrates the total count number of the pattern samples after a specific number ('MCC') of cells transmitted through the cell compression unit 4C. The optimization processing using the count number will be explained briefly with reference to the flowcharts shown in FIG. 37 through FIG. 39. The numerals in the steps of FIG. 37 through FIG. 39 correspond to those in the steps of FIG. 32 through FIG. 33.

Figure 37:
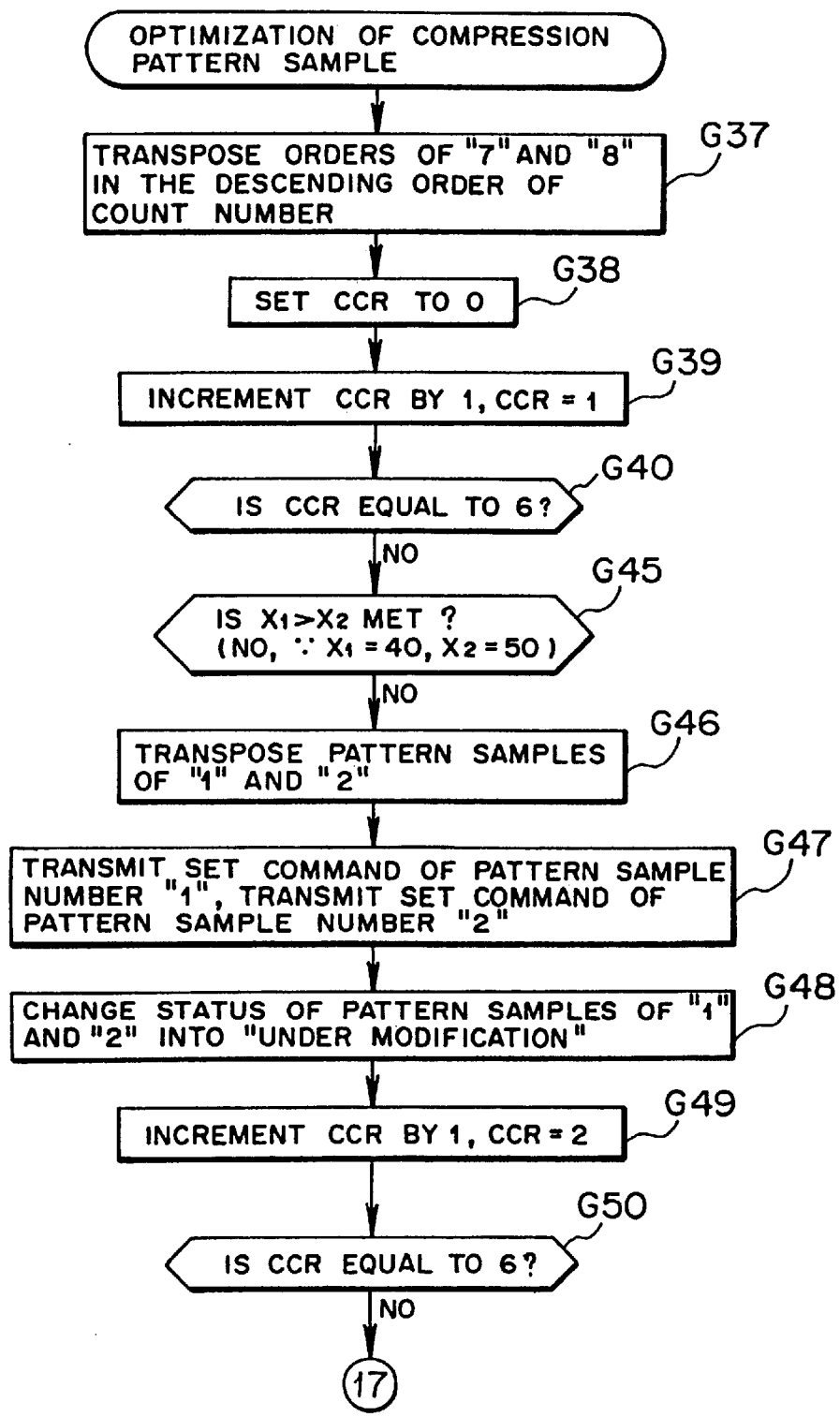
FIG. 37 through FIG. 42 are flowcharts to explain a concrete example of the optimization processing of a compression pattern sample in the network device relating to the second embodiment of the invention.

The pattern modification control unit 31 transposes the orders of '7' and '8' in the descending order of the count number (step G37 in FIG. 37), sets the check object order count number (CCR) to 0 (step G38 in FIG. 37), and then increments CCR by 1 to set CCR to 1 (step G39 in FIG. 37).

And, the pattern modification control unit 31 determines whether CCR=6 ('6' represents the maximum number of the pattern samples served as compression objects) is met (step G40 in FIG. 37). Since CCR=1 is met, the pattern modification control unit 31 determines whether $X_1>X_2$ is met (whether the count number of the pattern sample number '1' is greater than the count number of the pattern sample number '2') (from No route of step G40 to step G45 in FIG. 37).

Here, $X_1=40$, $X_2=50$. Therefore, the determination at step G45 is No, and the pattern modification control unit 31 transposes the pattern samples of the pattern sample number '1' and the pattern sample number '2' (from No route of step G45 to step G46 in FIG. 37).

And, the pattern modification control unit 31 transmits the pattern sample modification command (SET command) of the pattern sample number '1', and the pattern sample modification command (SET command) of the pattern sample number '2' (step G47 in FIG. 37). The pattern modification control unit 31 changes the status of the pattern sample of '1' and the status of the pattern sample of '2' in the table 30d (see FIG. 19) into 'under modification' (step G48 in FIG. 37).

Further, the pattern modification control unit 31 increments CCR by 1 to set CCR to 2 (step G49 in FIG. 37), and determines whether CCR=6 is met (step G50 in FIG. 37).

Here, CCR=2. Therefore, the determination at step G50 is "No". Then, the pattern modification control unit 31 further increments CCR by 1 to set CCR to 3 (from No route of step G50 to step G39' in FIG. 38), and determines whether CCR=6 is met (step G40' in FIG. 38).

Figure 38:
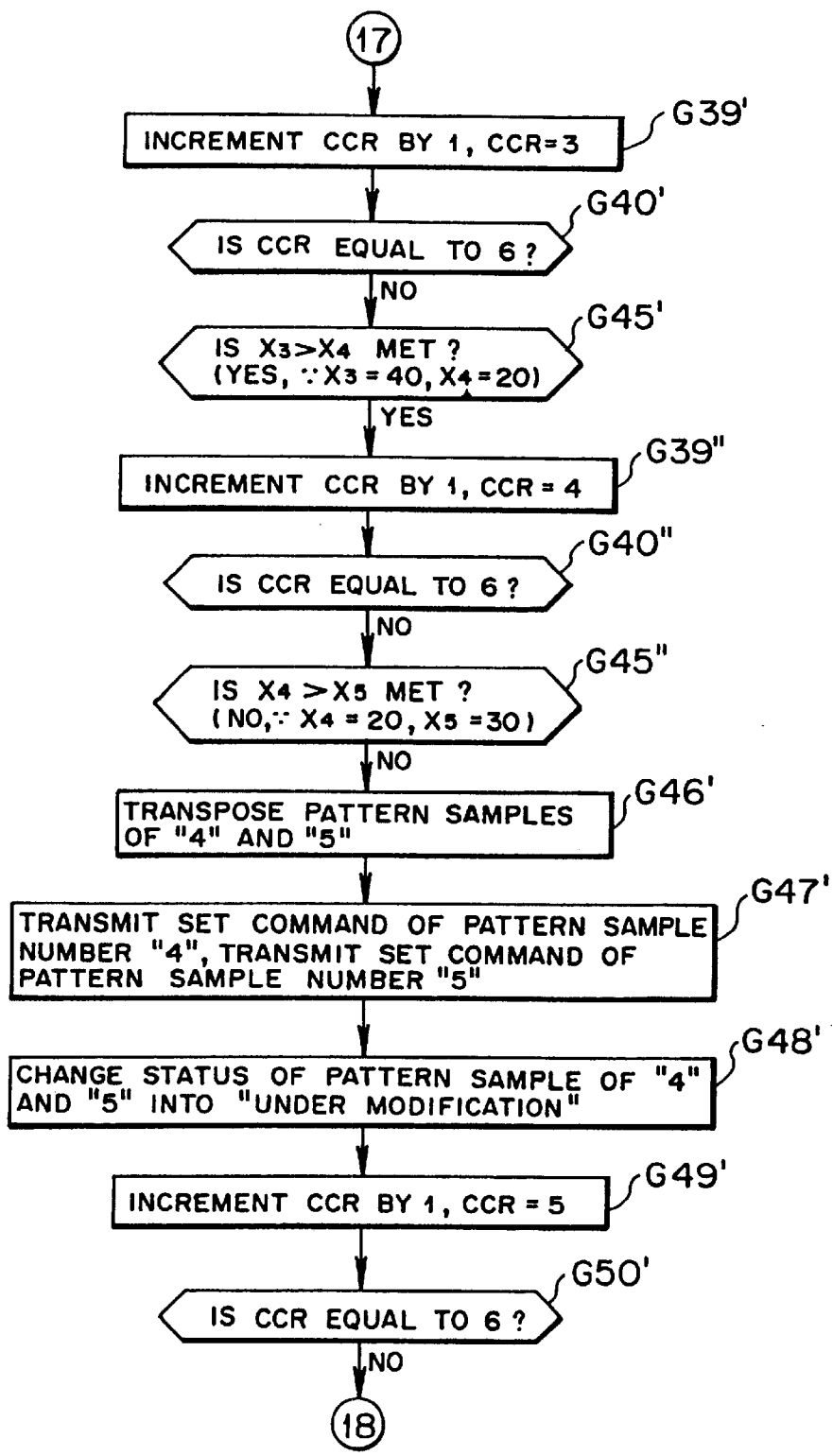

Since CCR=3 is met, the pattern modification control unit 31 determines whether $X_3>X_4$ is met (whether the count number of the pattern sample number '3' is greater than the count number of the pattern sample number '4') (from No route of step G40' to step G45' in FIG. 38).

Here, $X_3=40$, $X_4=20$. Therefore, the determination at step G45' is "Yes", and the pattern modification control unit 31 further increments CCR by 1 to set CCR to 4 (from Yes route of step G45' to step G39" in FIG. 38) and determines whether CCR 6 is met (step G40" in FIG. 38)

Since CCR=4 is met, the pattern modification control unit 31 determines whether $X_4>X_5$ is met (whether the count number of the pattern sample number '4' is greater than the count number of the pattern sample number '5') (from No route of step G40" to step G45" in FIG. 38).

Here, $X_4=20$, $X_5=30$. Therefore, the determination at step G45" is "No", and the pattern modification control unit 31 transposes the pattern samples of the pattern sample number '4' and the pattern sample number '5' (from No route of step G45" to step G46' in FIG. 38).

And, the pattern modification control unit 31 transmits the pattern sample modification command (SET command) of the pattern sample number '4', and the pattern sample modification command (SET command) of the pattern sample number '5' (step G47' in FIG. 38). The pattern modification control unit 31 changes the status of the pattern sample of '4' and the status of the pattern sample of '5' in the table 30b (see FIG. 19) into 'under modification' (step G48' in FIG. 38).

Further, the pattern modification control unit 31 increments CCR by 1 to set CCR to 5 (step G49' in FIG. 38), and determines whether CCR=6 is met (step G50' in FIG. 38).

Here, CCR=5. Therefore, the pattern modification control unit 31 further increments CCR by 1 to set CCR to 6 (from No route of step G50' to step G39'" in FIG. 39), and determines whether CCR=6 is met (step G40'" in FIG. 39).

Figure 39:
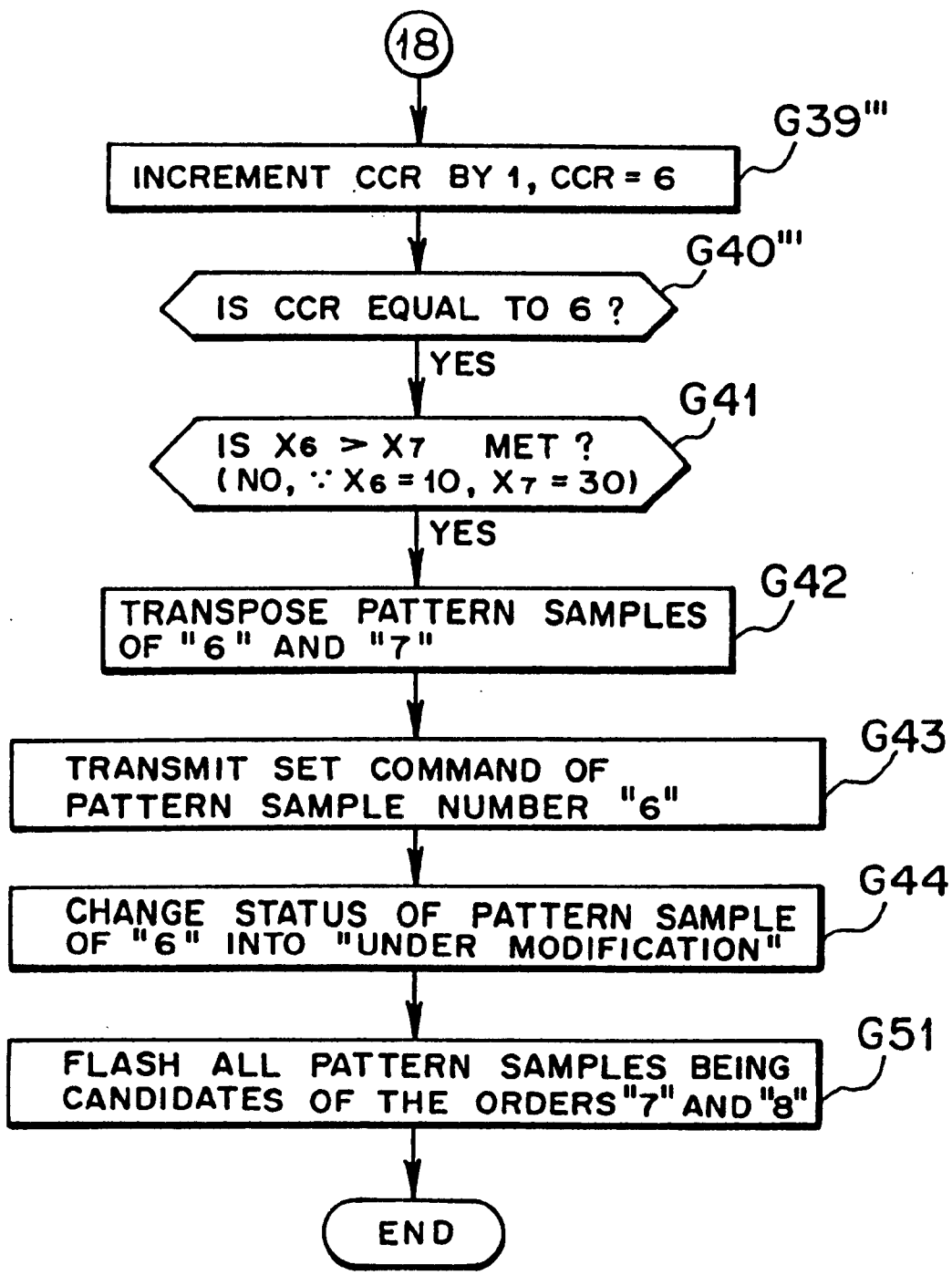
Figure 40:
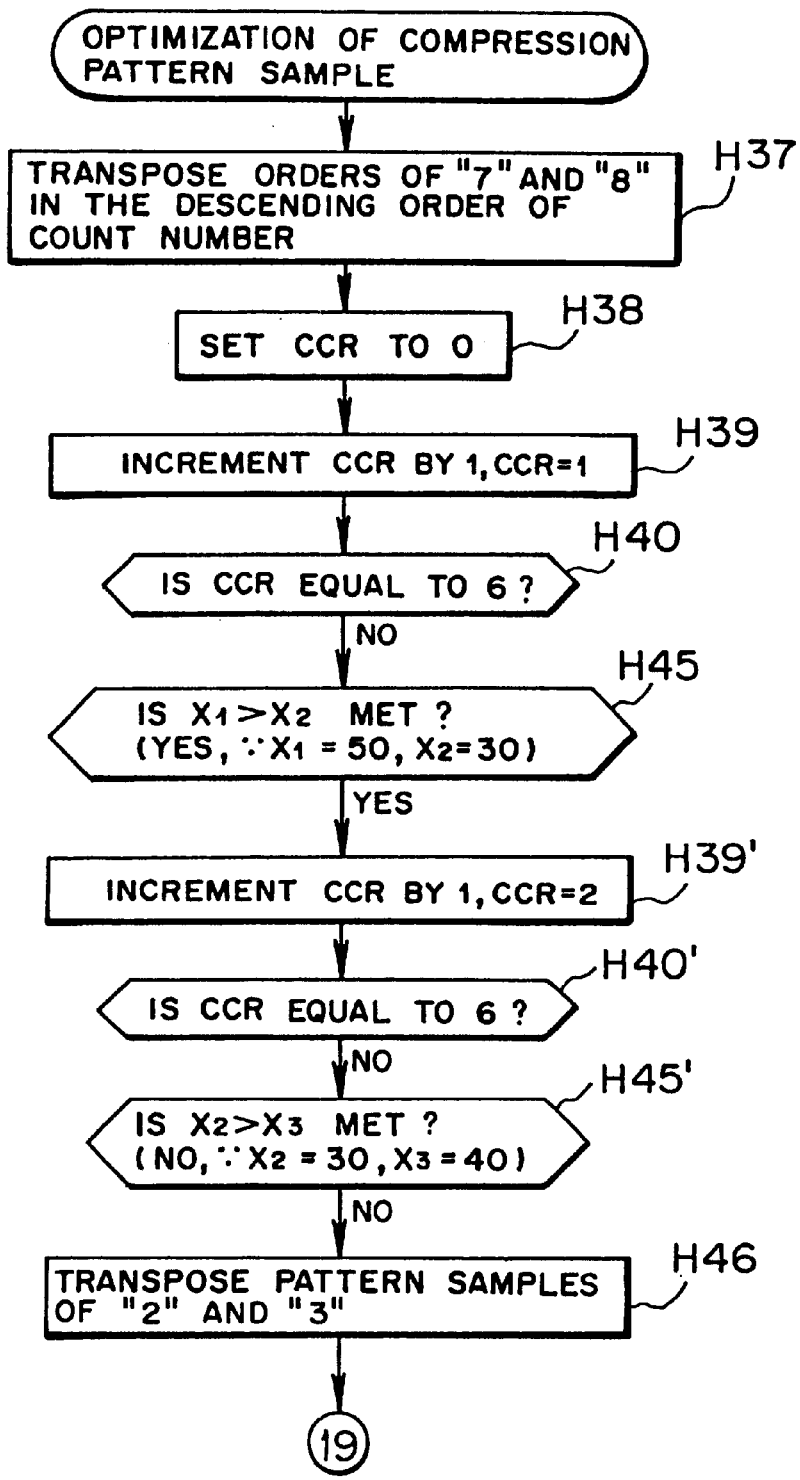
Figure 41:
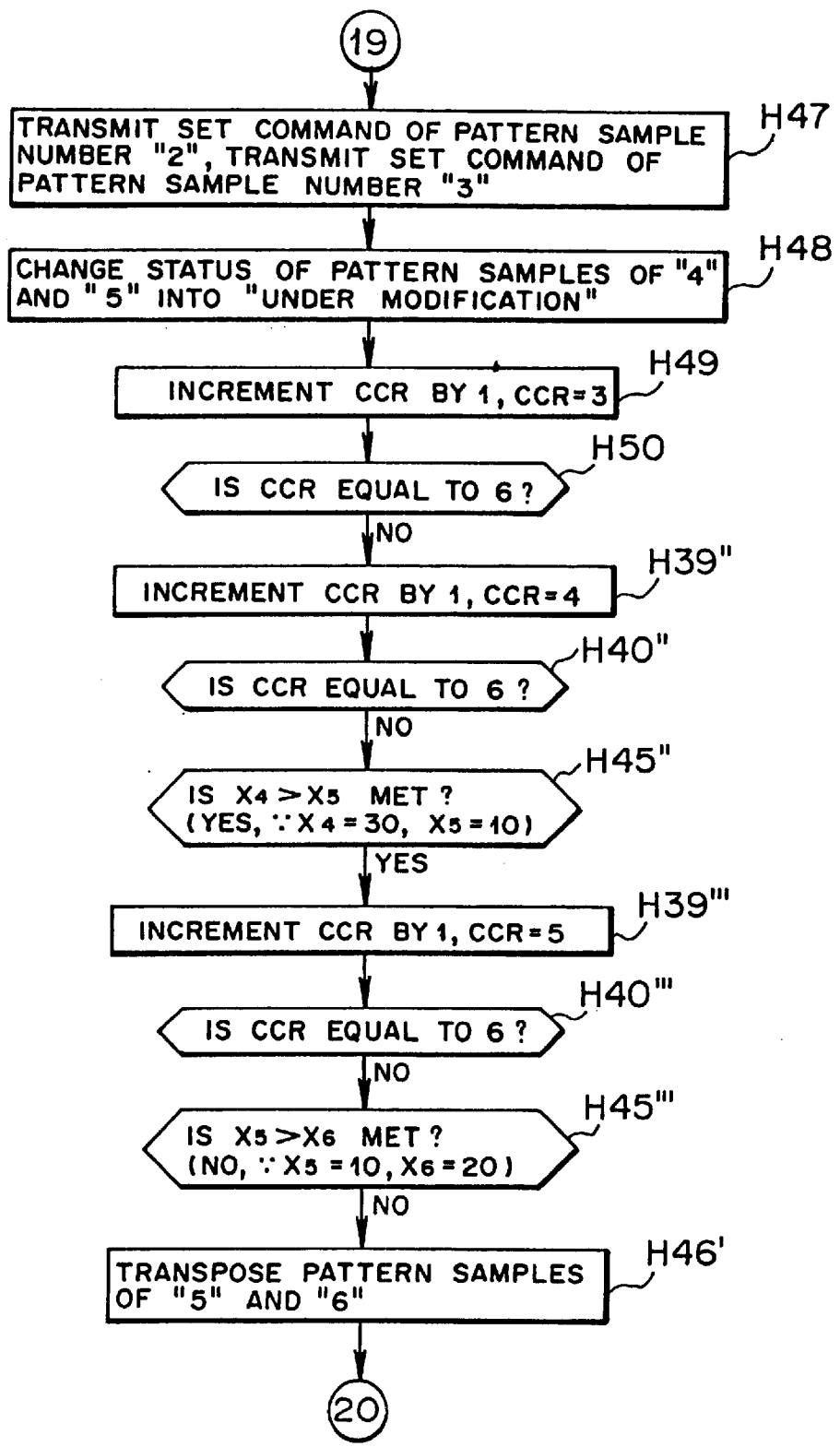
Figure 42:
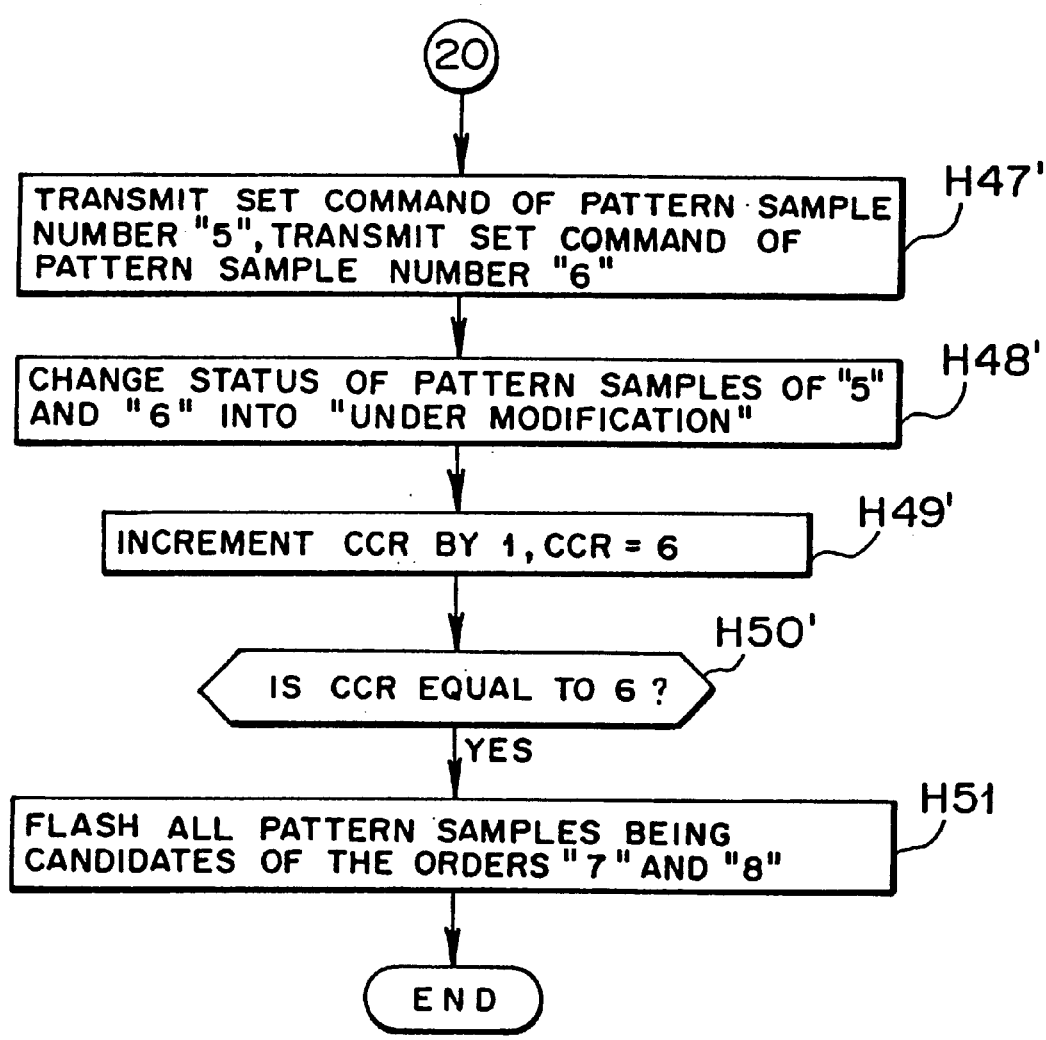

Since CCR=6 is met, the pattern modification control unit 31 determines whether $X_6>X_7$ is met (whether the count number of the pattern sample number '6' is greater than the count number of the pattern sample number '7') (from Yes route of step G40'"to step G41 in FIG. 39).

Here, $X_6=10$, $X_7=30$. Therefore, the determination result is "No", and the pattern modification control unit 31 transposes the pattern samples of the pattern sample number '6' and the pattern sample number '7' (from Yes route of step G41 to step G42 in FIG. 39).

And, the pattern modification control unit 31 transmits the pattern sample modification command (SET command) of the pattern sample number '6' (step G43 in FIG. 39). The pattern modification control unit 31 changes the status of the pattern sample of '6' in the table 30b (see FIG. 19) into 'under modification' (step G44 in FIG. 39).

Finally, the pattern modification control unit 31 flashes all the pattern samples being the candidates of the orders '7' and '8' (step G51 in FIG. 39).

Similarly, FIG. 25 (illustrates the total count number of the pattern samples during next optimization processing. The optimization processing in this case will be explained with reference to the flowcharts in FIG. 40 through FIG. 42. The numerals in the steps of FIG. 40 through FIG. 42 correspond to those in the steps of FIG. 32 through FIG. 33.

And, the similar processings to those explained with FIG. 37 through FIG. 39 are also conducted in this case (see step H37 in FIG. 40 through step H51 in FIG. 42), and as the result, the order of the pattern samples is turned out as illustrated in FIG. 25 ③.

Next, the recovery processing of the compressed cell in the post-stage network device 6C will be described. In the network device 6C, the compressed cell recovery unit 2C executes ATM cell recovery steps. In the ATM cell recovery steps, the compressed cell detection unit 20 of the compressed cell recovery unit 2C determines whether the ATM cells transmitted through the transmission lines 7 which were produced by the foregoing ATM cell compression steps are compressed cells or not (compressed cell determination steps).

And, as the compressed cell detection unit 20 determines that the concerned ATM cell is a compressed cell, the cell recovery unit 21 applies the recovery processing to the concerned ATM cell in the ATM layer to recover the cell into the original ATM cell (cell recovery steps). Here, the cell recovery unit 21 recovers the ATM cell into the original ATM cell on the basis of the recovery pattern samples stored in the recovery pattern sample storage unit 29.

In the compressed cell recovery unit 2C of the network device 6C relating to the second embodiment, the pattern modification control unit 32 updates plural recovery pattern samples stored in the recovery pattern sample storage unit 29, serving the pattern sample of a high coincidence with the original ATM cell corresponding to the inputted compressed cell as the recovery pattern sample having a high priority; thus optimizing the recovery pattern samples.

Concretely, receiving the foregoing SET command from the pattern modification control unit 31 of the pre-stage network device 6C, the pattern modification control unit 32 controls to change the recovery pattern samples stored in the recovery pattern sample storage unit 29 on the basis of the SET command, while following the modification contents of the compression pattern samples stored in the foregoing compression pattern sample storage unit 26.

The recovery processing of the compressed cells and the optimization processing of the recovery pattern samples in this case will further be explained with reference to the flowchart shown in FIG. 36.

Figure 36:
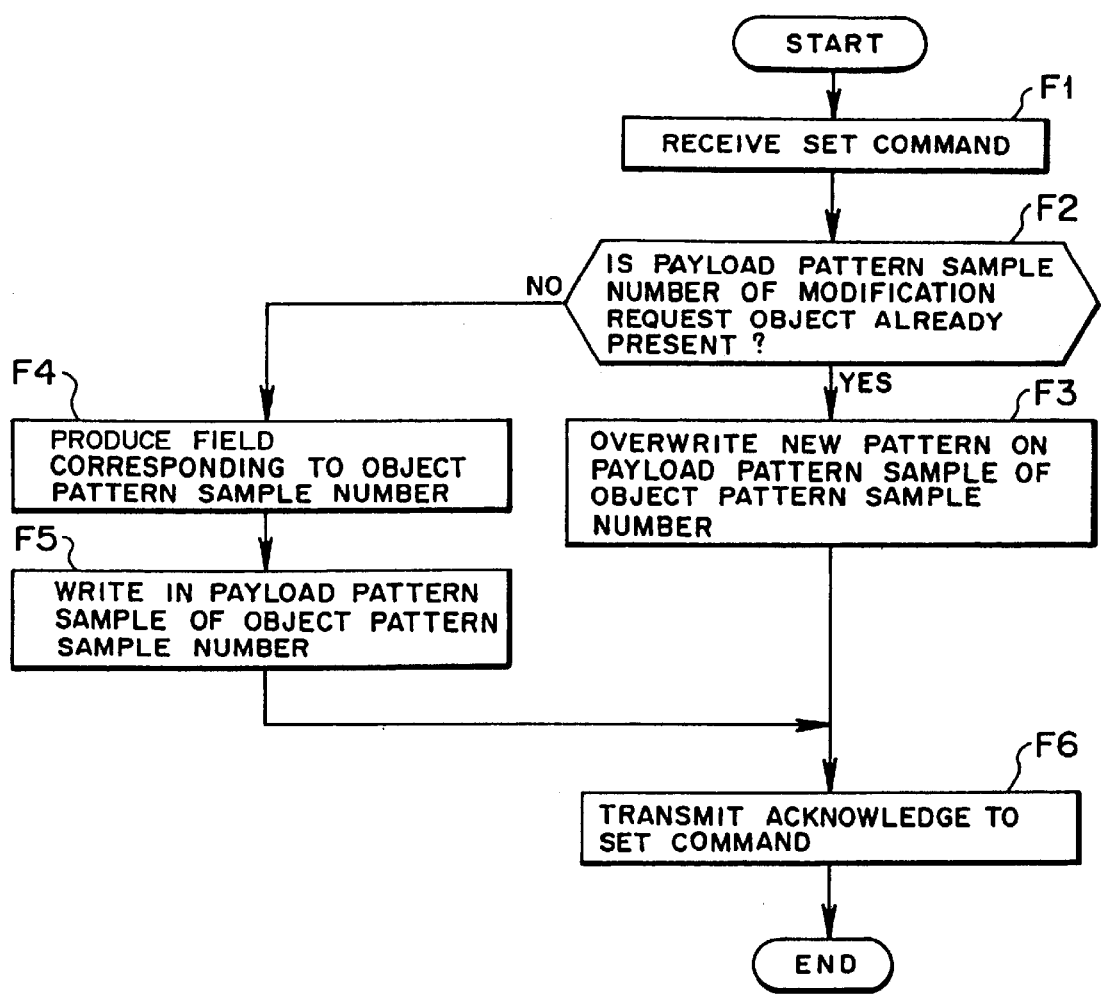
FIG. 36 is a flowchart to explain the recovery processing of a compressed cell and the optimization processing of a recovering pattern sample, in the network device relating to the second embodiment of the invention.

The pattern modification control unit 32, receiving the SET command (step F1 in FIG. 36), determines whether the payload pattern sample number of a modification request object is already present in the recovery pattern sample storage unit 29 (step F2 in FIG. 36).

And, if the payload pattern sample number of the modification request object is already present in the recovery pattern sample storage unit 29, the pattern modification control unit 32 overwrites a new pattern on the payload pattern sample of the object pattern sample number (from Yes route of step F2 to step F3 in FIG. 36), and transmits a response (Acknowledge) of the SET command (step F6 in FIG. 36).

On the other hand, if the payload pattern sample number of the modification request object is not present in the recovery pattern sample storage unit 29, the pattern modification control unit 32 produces a field corresponding to the object pattern sample number in the recovery pattern sample storage unit 29 (from No route of step F2 to step F4 in FIG. 36), thereafter writes in the payload pattern sample of the object pattern sample number (step F5 in FIG. 36), and transmits the response (Acknowledge) of the SET command (step F6 in FIG. 36).

Further, the operation of the pre-stage network device 6C after the processing at step F6 is executed will be explained with reference to the flowcharts shown in FIG. 34 and FIG. 35.

Figure 35:
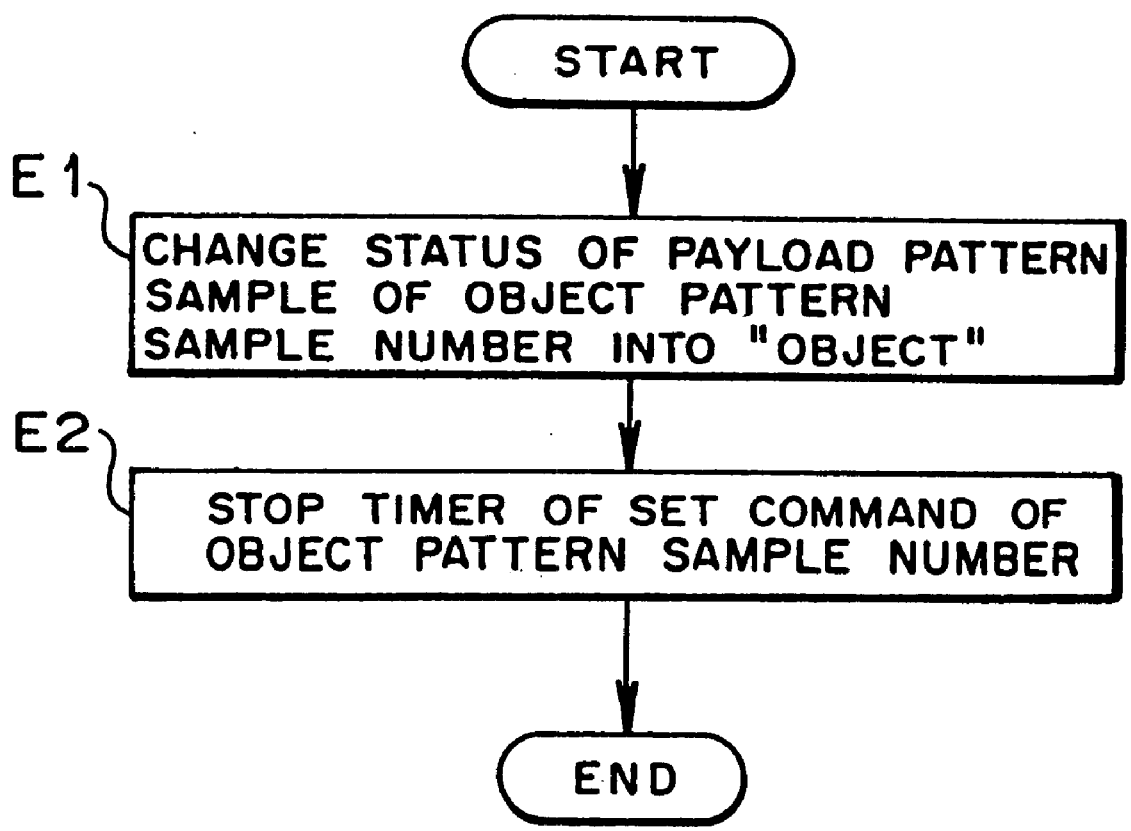
FIG. 35 is a flowchart to explain a processing when the network device relating to the second embodiment of the invention received the response to the SET command within the specific time.

In the pre-stage network device 6C, when the response of the SET command thus transmitted is received in a specific time, the pattern modification control unit 31 changes the status of the payload pattern sample of the object pattern sample number in the table 30b (see FIG. 19) of the payload pattern counter 30B into 'object' from 'under modification' (step E1 in FIG. 35), and stops the timer of the SET command of the object pattern sample number (step E2 in FIG. 35).

Further, when the pre-stage network device 6C could not receive the response of the SET command in a specific time (namely, has come to a time-out), the pre-stage network device 6C operates as explained hereunder.

Figure 34:
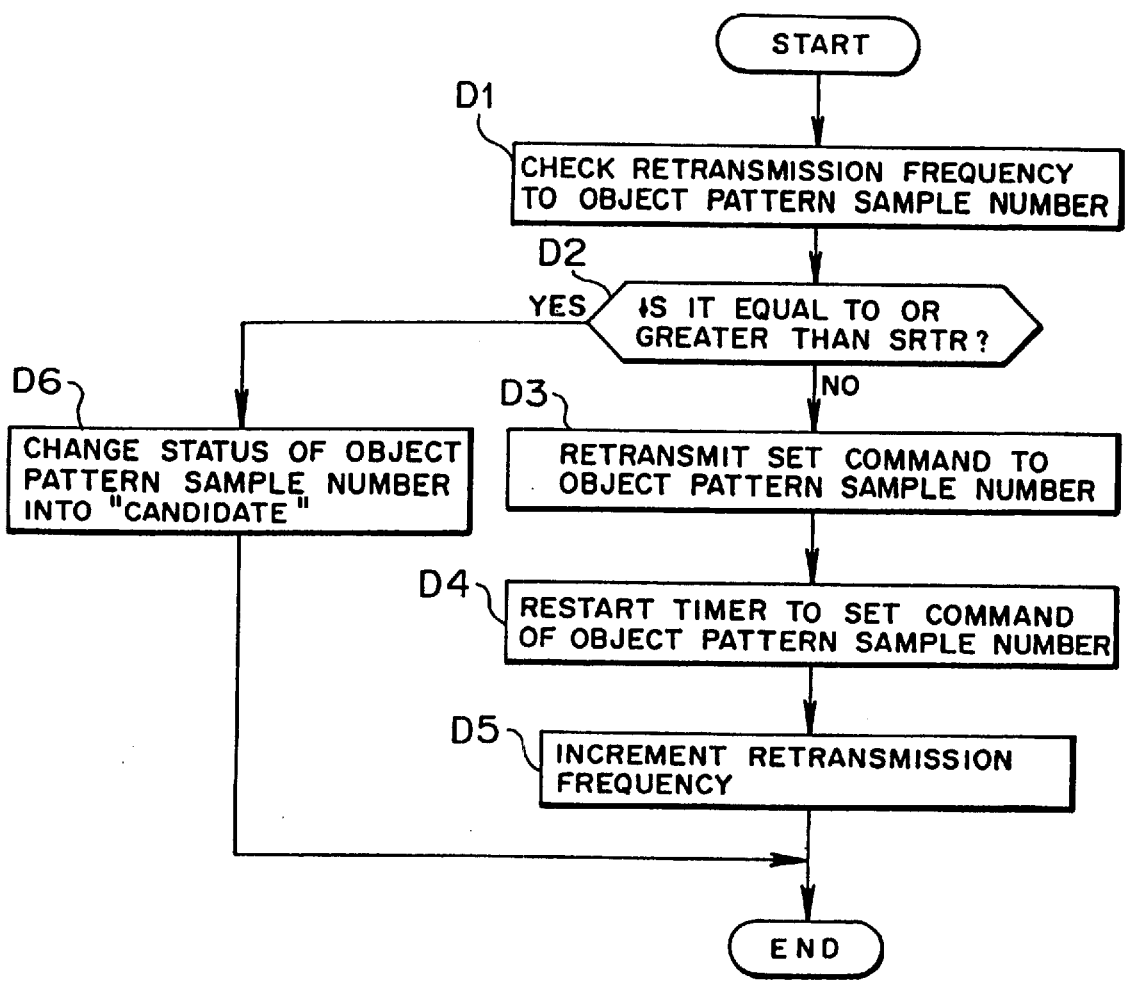
FIG. 34 is a flowchart to explain a processing when the network device relating to the second embodiment of the invention could not receive a response to the SET command within a specific time.

The pattern modification control unit 31 refers to the table 30e (see FIG. 20) of the set command retransmission counter 30C, checks the retransmission frequency of the SET command to the object pattern sample number (step D1 in FIG. 34), and determines whether the retransmission frequency is equal to or greater than 'SRTR' (step D2 in FIG. 34).

And, if the retransmission frequency is not equal to and greater than 'SRTR', the pattern modification control unit 31 retransmits the SET command to the object pattern sample number (from No route of step D2 to step D3 in FIG. 34), restarts the timer to the SET command of the object pattern sample number (step D4 in FIG. 34), and increments the retransmission frequency (step D5 in FIG. 34)

On the other hand, if the retransmission frequency is equal to or greater than 'SRTR', the pattern modification control unit 31 changes the status of the object pattern sample number into 'candidate' (from Yes route of step D2 to step D6 in FIG. 34).

Thus, according to the network device 6C relating to the second embodiment, the compression and recovery processings are applied to the data in the ATM layer while the data are transmitted; and thereby, in addition to the similar advantages obtained in the network devices 6A, 6B relating to the foregoing first embodiment, the patternizing rate can be enhanced, since the pattern modification control unit 31 of the cell compression unit 4C repeats re-samplings and optimizes to dynamically modify the types of the compression pattern samples stored in the compression pattern sample storage unit 26.

The network device 6C on the compression end that modifies the types of the compression pattern samples synchronizes in communication with the network device 6C on the recovery end. Thereby, the modification contents of the pattern samples are automatically reflected on the recovery pattern samples stored in the recovery pattern sample storage unit 29, and the compression cells can properly be recovered even though the types of the compression pattern samples are modified.

Further, the modification of the compression pattern sample stored in the compression pattern sample storage unit 26 is automatically conducted in case of the second embodiment, however, the modification of the compression pattern sample may be conducted manually.

(d) Description of the Third Embodiment

Further, a network device (not illustrated) as the ATM cell compression recovery device relating to the third embodiment of the invention will be described. This network device is also used in the same manner as the network device 6 shown in FIG. 1, as the ATM switch that applies the switching processing to the ATM cells transmitted in the ATM network as shown in FIG. 2.

Figure 43:
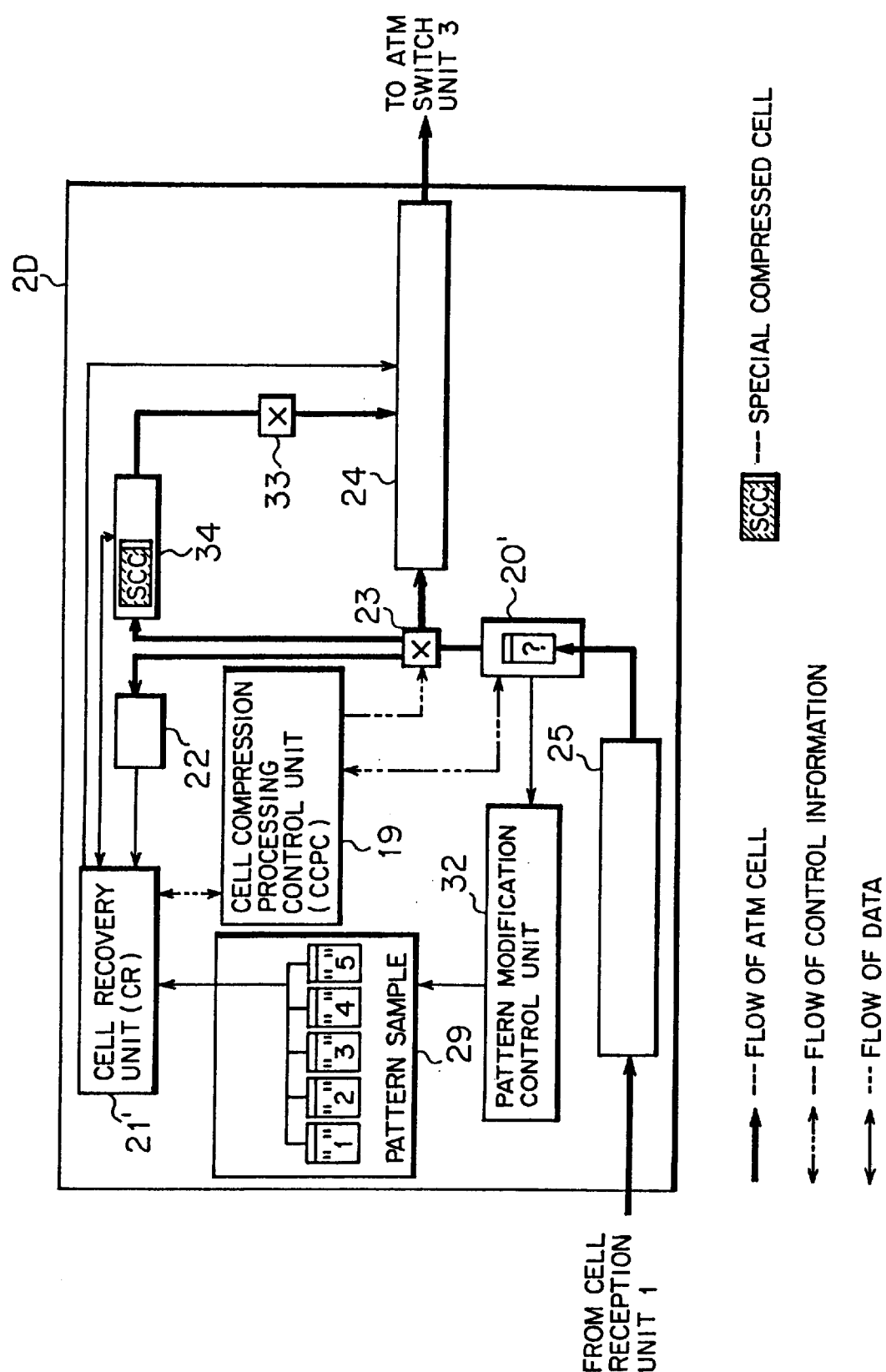
FIG. 43 is a block diagram of the compressed cell recovery unit in the network device relating to the third embodiment of the invention.

The network device relating to the third embodiment possesses the same functions and constructions as the network devices 6A, 6B (see FIG. 5, FIG. 7) relating to the first embodiment, however, the network device differs from the network devices 6A, 6B in the following points. The network device adds a new function to the compressed cell production unit 13 of the cell compression unit 4A in the network device 6A that functions as the ATM cell compression device, adds a new function to the cell recovery unit 21 and the recovered cell detection unit 20 of the compressed cell recovery unit 2B in the network device 6B that functions as the ATM cell recovery device, and newly comprises, in this compressed cell recovery unit 2B, a special compressed cell buffer 34 and a stream switch unit 33 as shown in FIG. 43. FIG. 43 is a block diagram to typically illustrate a construction of a compressed cell recovery unit 2D in the third embodiment. In FIG. 43, the cell recovery unit 21 having the new function added is denoted by the symbol 21', and the compressed cell detection unit 20 having the new function added is denoted by the symbol 20'.

Here, the compressed cell production unit in the third embodiment possesses the same function as the compressed cell production unit 13 in the first embodiment; and further, when the compression object cell determination unit detects a cell (hereunder, referred to as NM cell) that does not coincide with all the pattern samples during the production of compressed cells and the compressed cell number of the compressed cells being produced is 1, the compressed cell production unit possesses a function to produce a compressed cell (the compressed cell in this case is referred to as a special compressed cell) by carrying out the following processing.

Figure 44:
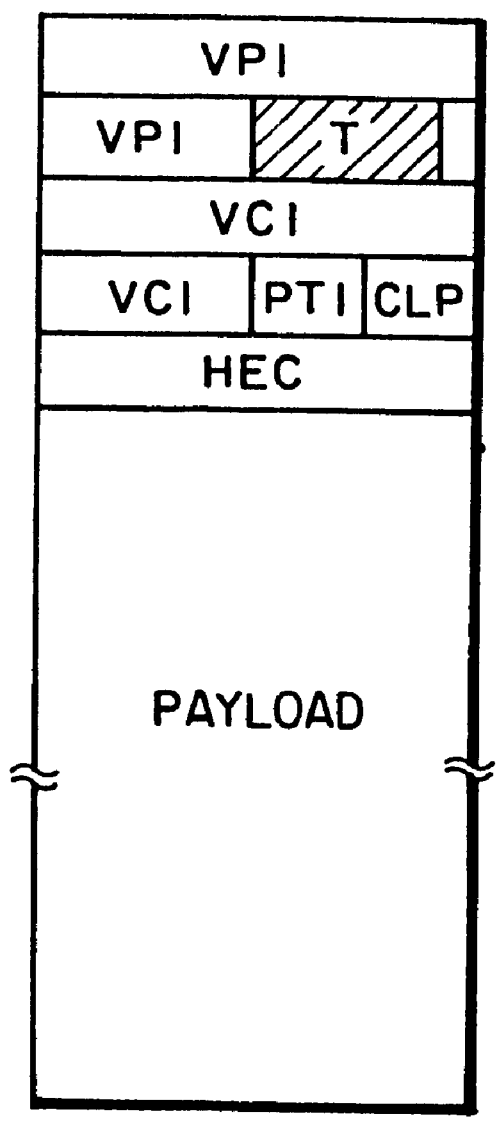
FIG. 44 is a chart to illustrate an example of the format of a special compressed cell.

FIG. 44 illustrates an example of the format of the special compressed cell. The compressed cell production unit compares the header part of the NM cell in the compression object cell determination unit with the header part of a solely compressed cell of the compression object cells. And, when the 5 bytes of both the header parts are all equal to each other, the compressed cell production unit transmits to write the pattern sample number that coincides with the payload of the solely compressed cell of the compression object cells into the upper X bits in the VCI field of the header part of the NM cell (X may be decided arbitrarily within 1 through 16, and can be set in advance in the network device; see the symbol T in FIG. 44).

At that moment, the compressed cells and the cells stored in the temporary storage buffer are nullified. When the NM cell is to be used for a special application in the OAM cell, the AAL5, or the like, the foregoing compression method cannot be used.

Further, the compressed cell detection unit 20' in the third embodiment possesses the same function as the compressed cell detection unit 20 in the first embodiment; and further, the compressed cell detection unit 20' determines whether the upper X bits in the VCI field of the header part of the inputted ATM cell are 0, if this field is rendered to 0, treats the ATM cell as the normal ATM cell, and if this field is not rendered to 0, treats the ATM cell as the special compressed cell to send out the ATM cell to the special compressed cell buffer 34.

And, the cell recovery unit 21' possesses the same function as the cell recovery unit 21 in the first embodiment, and further possesses a function that recovers the original ATM cell from the value of the upper X bits of the VCI in the header and the header part of the special compressed cell and writes the recovered ATM cell into the leading part of the special compressed cell.

Further, the special compressed cell buffer 34 is a buffer in which a special compressed cell from the compressed cell detection unit 20' is inputted, and the special compressed cell is made to be recovered in this special compressed cell buffer 34.

And, the stream switch unit 33 is to send out the special compressed cell and the recovered ATM cell in the special compressed cell buffer 34 to the transmission cell storage buffer for ATM switch unit 24.

The points of the third embodiment are as follows.

(1) The network device of the third embodiment writes the pattern number of the pattern-recognized cell not in a specially provided cell, but in an area in the header of the cell transmitted next, and gives the information to the network device on the receiving end.

With the foregoing construction, the network device relating to the third embodiment of the invention performs the operations as described below.

Here, the network device performs the same operations as the network device 6 described in the "(a) Description of the Aspect of the Invention".

On the other hand, in the ATM network comprising the foregoing two network devices connected, the pre-stage network device performs the compression processing of the ATM cells as described in the first embodiment, and the post-stage network device performs the recovery processing of the compressed cells as described in the first embodiment.

Incidentally, the compression processing of the ATM cells and the recovery processing of the compressed cells are carried out in each of the ATM service categories.

Further, in the third embodiment, when the cell compression targeted byte checker of the cell compression unit (both are not illustrated in the third embodiment) in the pre-stage network device determines that an ATM cell subsequent to the ATM cell determined as a compression object cell is determined not to be a compression object cell, the compressed cell production unit of the cell compression unit (not illustrated in the third embodiment) includes the compression pattern sample number corresponding to the ATM cell being a compression object cell in the header of the subsequent ATM cell, thereby producing the special compressed cell.

The production processing of the special compressed cell in this case will be described with reference to the flowchart shown in FIG. 45. The process to produce this special compressed cell is such that the part of the compressed cell production processing in the first embodiment, which was explained with the flowchart shown in FIG. 13, is changed as the flowchart shown in FIG. 45.

Figure 45:
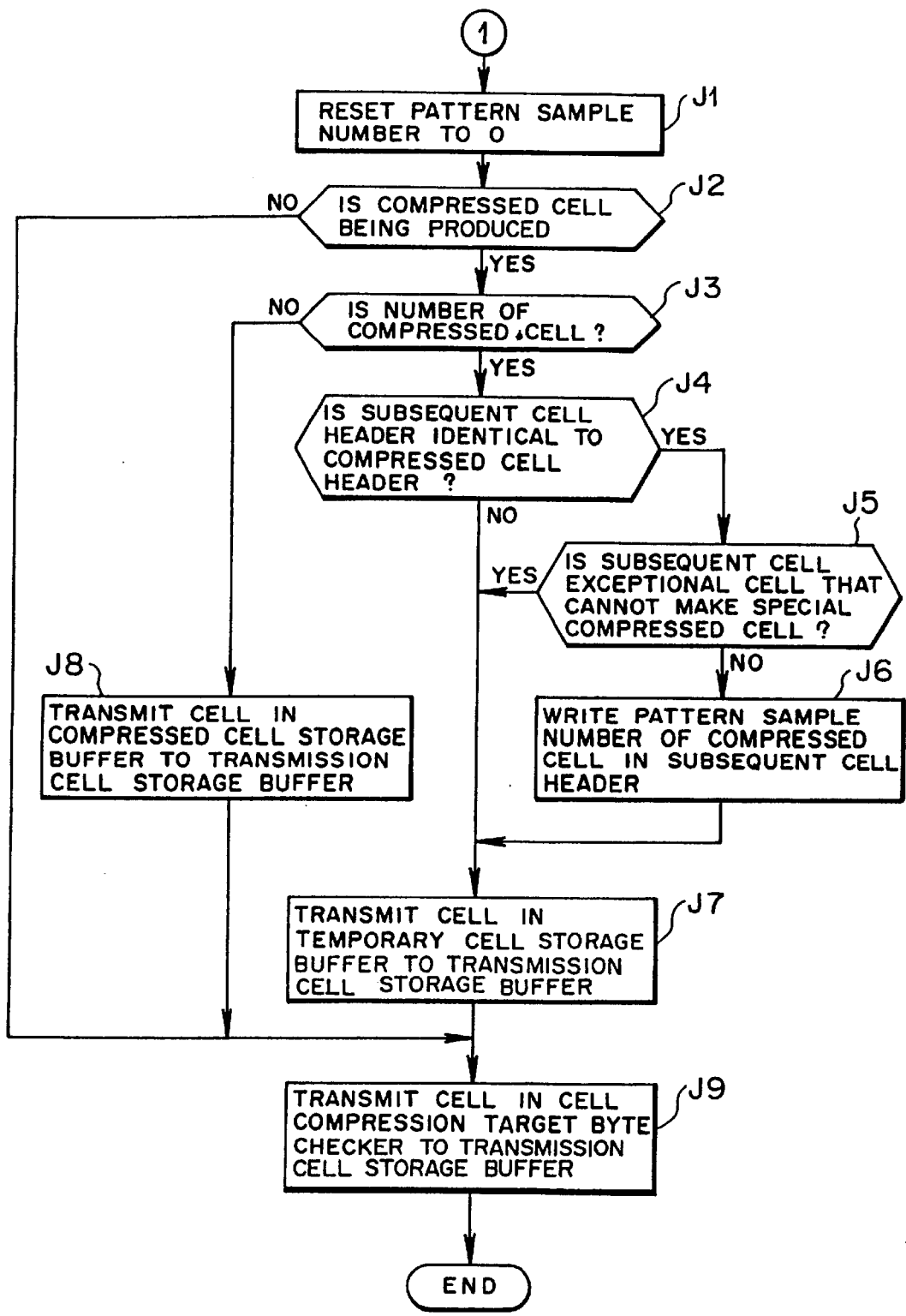
FIG. 45 is a flowchart to explain a production processing of the special compressed cell in the network device relating to the third embodiment of the invention.

At the foregoing step A4 (see FIG. 11), if the cell compression targeted byte checker determines that the pattern sample number is larger than P (that the pattern sample number does not coincides with all the pattern samples), the cell compression targeted byte checker resets the pattern sample number to 0 (from Yes route of step A4 in FIG. 11 to step J1 in FIG. 45).

The compressed cell production unit determines whether a compressed cell is already produced (step J2 in FIG. 45). If the compressed cell is already produced, the compressed cell production unit further determines whether the compressed cell number is 1 (from Yes route of step J2 to step J3 in FIG. 45).

And, If the compressed cell number is 1, the cell compression targeted byte checker determines whether the header part of the subsequent ATM cell is identical to the header part of the compressed ATM cell (from Yes route of step J3 to step J4 in FIG. 45). If both the header parts are identical, the cell compression targeted byte checker determines whether the subsequent ATM cell is an exceptional cell from which the special compressed cell is not allowed to be produced as the OAM cell and the like (from Yes route of step J4 to step J5 in FIG. 45).

Here, if the subsequent ATM cell is a cell (the foregoing NM cell) from which the special compressed cell is allowed to be produced, the compressed cell production unit writes the pattern sample number of the compressed ATM cell into the upper X bits in the VCI field of the subsequent ATM cell to thereby produce the special compressed cell (from No route of step J5 to step J6 in FIG. 45), and the stream switch unit outputs the cell stored in the temporary cell storage buffer to the transmission cell storage buffer (step J7 in FIG. 45).

Further, at the foregoing step J4, if the header part of the subsequent ATM cell is determined not to be identical to the header part of the compressed ATM cell, the processings at step J5 and step J6 are not executed and the processing at step J7 is executed (from No route of step J4 to step J7).

And at step J5, if the subsequent ATM cell is determined to be a cell from which the special compressed cell is not allowed to be produced, the processing at step J6 is not executed, but the processing at step J7 is executed (from Yes route of step J5 to step J7).

Further, if the compressed cell number is determined not to be 1 at the foregoing step J3, the stream switch unit outputs the ATM cell stored in the compressed cell buffer to the transmission cell storage buffer (from No route of step J3 to step J8 in FIG. 45).

And, after the processings at the foregoing step J7 and step J8 are completed, the stream switch unit outputs the ATM cell in the cell compression targeted byte checker to the transmission storage cell buffer (step J9 in FIG. 45). Further, if the compressed cell is determined not to be under production at the foregoing step J2, the processing at this step J9 is also conducted (from No route of step J2 to step J9).

On the other hand, in the post-stage network device, the compressed cell detection unit 20' of the compressed cell recovery unit 2D determines whether the ATM cell transmitted through the transmission lines is a special compressed cell on the basis of whether the header part of the concerned ATM cell contains the compression pattern sample number.

And, if the compressed cell detection unit 20' determines that the concerned ATM cell is the special compressed cell, the cell recovery unit 21' recovers the special compressed cell into the original ATM cell on the basis of the recovery pattern sample corresponding to the foregoing compression pattern sample number.

The recovery processing of the special compressed cell in this case will further be described with reference to the flowchart shown in FIG. 46.

Figure 46:
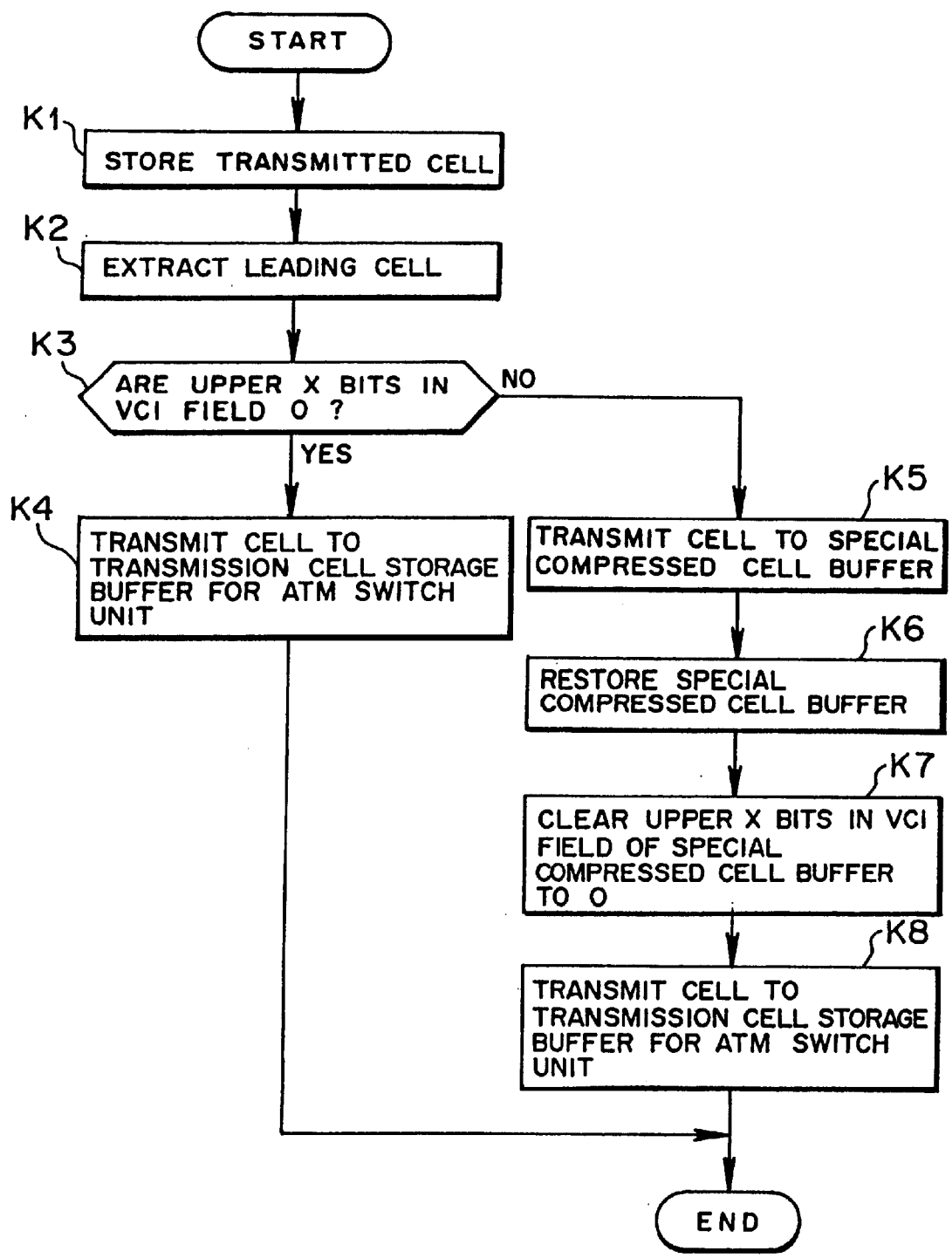
FIG. 46 is a flowchart to explain a recovery processing of the special compressed cell in the network device relating to the third embodiment of the invention.

The ATM cell transmitted to the compressed cell recovery unit 2D first enters the cell compression internal buffer 25 (step K1 in FIG. 46).

The compressed cell detection unit 20' extracts the leading ATM cell from the compression internal buffer 25 (step K2 in FIG. 46), and determines whether the upper X bits in the VCI field of the header part of the ATM cell are 0 (step K3 in FIG. 46).

Here, if the upper X bits are 0, the ATM cell is not the special compressed cell; and therefore the stream switch unit 23 sends out the ATM cell to the transmission cell storage buffer for ATM switch unit 24 (from Yes route of step K3 to step K4 in FIG. 46).

On the other hand, if the upper X bits are not 0, the ATM cell is the special compressed cell; and therefore the stream switch unit 23 sends out the ATM cell to the special compressed cell buffer 34 (from No route of step K3 to step K5 in FIG. 46).

And, the cell recovery unit 21' recovers a cell from the values of the header part of the special compressed cell and the VCI field, writes the recovered cell into the leading part of the compressed cell in the special compressed cell buffer 34 (step K6 in FIG. 46), and clears the upper X bits in the VCI field of the special compressed cell to 0 (step K7 in FIG. 46).

Thereafter, the stream switch unit 33 sends out the ATM cell stored in the special compressed cell buffer 34 to the transmission cell storage buffer for ATM switch unit 24 (step K8 in FIG. 46).

Thus, according to the network device relating to the third embodiment, the compression and recovery processings are applied to the data in the ATM layer while the data are transmitted; and thereby, in addition to the similar advantages obtained in the network devices 6A, 6B relating to the foregoing first embodiment, the ATM cells can be compressed even if the ATM cells being compression objects are not continuous.

(e) Others

Figure 47:
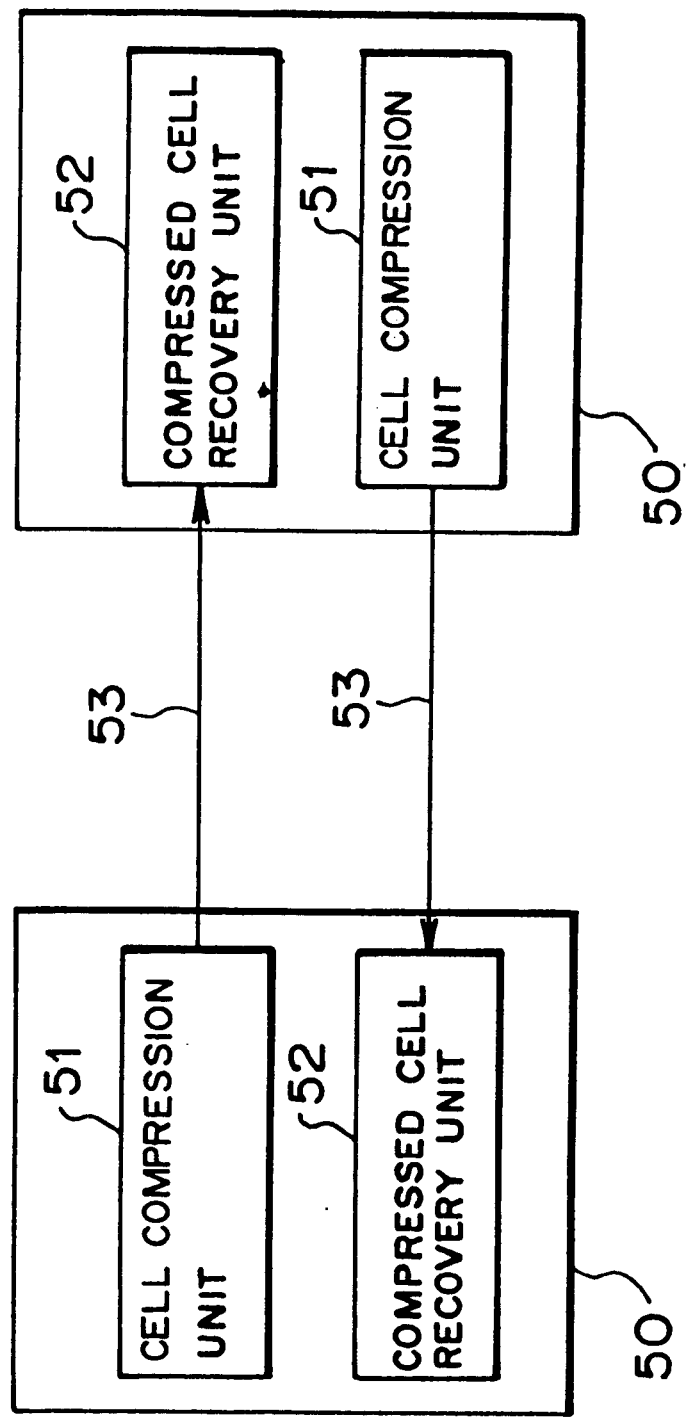
FIG. 47 is a block diagram of the ATM cell compression recovery device.

Other than the foregoing network devices 6, 6A, 6B, and 6C, the ATM cell compression recovery device that performs the compression and recovery processings of cells in the ATM layer can be made up as illustrated in FIG. 47.

An ATM cell compression recovery device 50 shown in FIG. 47 is provided with a cell compression unit 51 as the ATM cell compression device including the compression object cell determination unit that determines whether an ATM cell inputted is a compression object cell, and the compressed cell production unit that, when the compression object cell determination unit determines that the ATM cell is a compression object cell, applies the compression processing to the ATM cell in the ATM layer to produce a compressed cell; and a compressed cell recovery unit 52 as the ATM cell recovery unit including the compressed cell determination unit that determines whether an ATM cell inputted through a transmission line 53 from the opposite cell compression unit 51 as the ATM cell compression device is a compressed cell, and a cell recovery unit that, when the compressed cell determination unit determines that the ATM cell is a compressed cell, applies the recovery processing to the compressed ATM cell in the ATM layer to recover the original ATM cell.

And, the ATM cell compression recovery device 50 may be constructed such that the cell compression unit 51 as the ATM cell compression device contains the compression pattern sample storage unit that stores the compression pattern samples of the compression object cells, in which the compression object cell determination unit determines whether the ATM cell is a compression object cell on the basis of the compression pattern samples stored in the compression pattern samples storage unit, and at the same time, the compressed cell recovery unit 52 as the ATM cell recovery unit contains the recovery pattern sample storage unit that stores the recovery pattern samples of the original ATM cells corresponding to the compressed cells, in which, when the compressed cell determination unit determines that the ATM cell is a compressed cell, the cell recovery unit recovers the original ATM cell on the basis of the recovery pattern samples stored in the recovery pattern sample storage unit.

Further, in the network devices 6, 6B, 6C relating to the foregoing embodiments other than the first embodiment, and the foregoing ATM cell compression recovery device 50, the cell compression unit 4, 4C, and 51 may be provided with the transmission cell buffer monitor unit 28 (see FIG. 6), so that the transmission cell buffer monitor unit 28 may request the compressed cell production unit 13 to produce compressed cells, when the ATM cells stored in the transmission cell storage buffer 18 that should be transmitted come into the state of queue.

Further, in the network devices 6, 6A, 6B, 6C relating to the foregoing embodiments other than the third embodiment, the method of producing the special compressed cell can also be used which was described in the third embodiment.

In this case, the compressed cell production unit 13 of the cell compression units 4, 4A, 4C in the network devices 6, 6A, 6B, 6C relating to the foregoing embodiments may be constructed as the compressed cell production unit in the third embodiment, and the compressed cell recovery units 2, 2B, 2C may be constructed as the compressed cell recovery unit 2D shown in FIG. 43.

Further, the foregoing ATM cell compression recovery device 50 may use the method of producing the special compressed cell that was described in the third embodiment. In this case, the cell compression unit 51 is needed to contain the compressed cell production unit in the third embodiment, and the compressed cell recovery unit 52 is needed to be made up as the compressed cell recovery unit 2D shown in FIG. 43.

What is claimed is:

1. An ATM cell compression device in an ATM cell compression recovery system, said ATM cell compression recovery system comprising: an ATM cell recovery device including a compressed cell determination unit that determines whether an ATM cell inputted from an opposite ATM cell compression device through a transmission line is a compressed cell, and a cell recovery unit that, when the compressed cell determination unit determines that the ATM cell is a compressed cell, applies a recovery processing to the ATM cell in an ATM layer to recover the compressed cell into a first original ATM cell; a switch device that applies a switching processing to the ATM cell recovered by the ATM cell recovery device; and an ATM cell compression device including a compression object cell determination unit that determines whether the ATM cell outputted from the switch device toward an identical path is a compression object cell, and a compressed cell production unit that, when the compression object cell determination unit determines that the ATM cell is the compression object cell, applies a compression processing to the ATM cell in an ATM layer to produce a compressed cell.

2. An ATM cell compression device as claimed in claim 1, further comprising a compression pattern sample storage unit that stores a compression pattern sample of the compression object cell, wherein the compression object cell determination unit determines whether the ATM cell is the compression object cell on the basis of the compression pattern sample stored in the compression pattern sample storage unit.

3. An ATM cell compression device, comprising:

a compression object cell determination unit that determines whether an inputted ATM cell is a compression object cell;

a compressed cell production unit that when the compression object cell determination unit determines that the ATM cell is the compression object cell, applies a compression processing to the ATM cell in an ATM layer to produce a compressed cell; and a compression pattern sample storage unit that stores a compression pattern sample of the compression object cell, wherein the compression object cell determination unit determines whether the ATM cell is the compression object cell on the basis of the compression pattern sample stored in the compression pattern sample storage unit;

wherein the compression pattern sample storage unit is capable of modifying the compression pattern sample stored in the compression pattern sample storage unit.

4. An ATM cell compression device as claimed in claim 3, wherein the compression pattern sample storage unit updates the compression pattern sample about a plurality of compression pattern samples stored in the compression pattern sample storage unit, serving a pattern sample having a high coincidence with inputted ATM cells as a compression pattern sample having a high priority.

5. An ATM cell compression device as claimed in claim 3, further comprising:

a transmission cell storage unit that stores an ATM cell to be transmitted, and a transmission cell monitor unit that requests the compressed cell production unit to produce a compressed cell, when the ATM cell in the transmission cell storage unit which is to be transmitted comes into a state of waiting.

6. An ATM cell compression recovery device comprising:

an ATM cell compression device including a compression object cell determination unit that determines whether an inputted ATM cell is a compression object cell, and a compressed cell production unit that, when the compression object cell determination unit determines that the ATM cell is the compression object cell, applies a compression processing to the ATM cell in an ATM layer to produce a compressed cell; and an ATM cell recovery device including a compressed cell determination unit that determines whether an ATM cell inputted from an opposite ATM cell compression device through a transmission line is a compressed cell, and a cell recovery unit that, when the compressed cell determination unit determines that the ATM cell is the compressed cell, applies a recovery processing to the ATM cell in an ATM layer to recover the compressed cell into a fist original ATM cell;

wherein:

the ATM cell compression device comprises a compression pattern sample storage unit that stores a compression pattern sample of the compression object cell, wherein the compression object cell determination unit determines whether The ATM cell is the compression object cell on the basis of the compression pattern sample stored in the compression pattern sample storage unit, and the ATM cell recovery device comprises a recovery pattern sample storage unit that stores a recovery pattern sample of a second original ATM cell corresponding to a compressed cell, wherein, when the compressed cell determination unit determines that the ATM cell is the compressed cell, the cell recovery unit recovers the compressed cell into the first original ATM cell on the basis of the recovery pattern sample stored in the recovery pattern sample storage unit.

7. An ATM cell recovery device comprising:

a compressed cell determination unit that determines whether an ATM cell inputted from an opposite ATM cell compression device is a compressed cell, and a cell recovery unit that, when the compressed cell determination unit determines that the ATM cell is a compressed cell, applies a recovery processing to the ATM cell in an ATM layer to recover the compressed cell into an original ATM cell;

further comprising a recovery pattern sample storage unit that stores a recovery pattern sample about a second original ATM cell corresponding to the compressed cell, wherein, when the compressed cell determination unit determines that the ATM cell is a compressed cell, the cell recovery unit recovers the compressed cell into the first original ATM cell on the basis of the recovery pattern sample for the second original cell stored in the recovery pattern sample storage unit.

8. An ATM cell recovery device as claimed in claim 7, wherein the recovery pattern sample storage unit is capable of modifying the recovery pattern sample stored in the recovery pattern sample storage unit.

9. An ATM cell recovery device as claimed in claim 8, wherein the recovery pattern sample storage unit updates the recovery pattern sample about a plurality of recovery pattern samples stored in the recovery pattern sample storage unit, serving a pattern sample having a high coincidence with the second original ATM cell corresponding to an inputted compressed cell as a recovery pattern sample having a high priority.

10. An ATM cell compression recovery device comprising:
- an ATM cell recovery device including a compressed cell determination unit that determines whether an ATM cell inputted from an opposite ATM cell compression device through a transmission line is a compressed cell, and a cell recovery unit that, when the compressed cell determination unit determines that the ATM cell is a compressed cell, applies a recovery processing to the ATM cell in an ATM layer to recover the compressed cell into a first original ATM cell;
- a switch device that applies a switching processing to the ATM cell recovered by the ATM cell recovery device; and
- an ATM cell compression device including a compression object cell determination unit that determines whether the ATM cell outputted from the switch device toward an identical path is a compression object cell, and a compressed cell production unit that, when the compression object cell determination unit determines that the ATM cell is the compression object cell, applies a compression processing to the ATM cell in an ATM layer to produce a compressed cell.

11. An ATM cell compression recovery device as claimed in claim 10, wherein:
- the ATM cell recovery device comprises a recovery pattern sample storage unit that stores a recovery pattern sample of a second original ATM cell corresponding to a compressed cell, wherein, when the compressed cell determination unit determines that the ATM cell is the compressed cell, the cell recover unit recovers the compressed cell into the fin original ATM cell on the basis of the recovery pattern sample stored in the recovery pattern sample storage unit, and
- the ATM cell recovery device comprises a compression pattern sample storage unit that stores a compression pattern sample of the compression object cell, wherein the compression object cell determination unit determines whether the ATM cell is the compression object cell on the basis of the compression pattern sample stored in the compression pattern sample storage unit.

12. An ATM cell compression recovery system comprising:
- an ATM cell compression device including a compression object cell determination unit that determines whether an inputted ATM cell is a compression object cell, and a compressed cell production unit that, when the compression object cell determination unit that the ATM cell is the compression object cell, applies a compression processing to the ATM cell in an ATM layer to produce a compressed cell; and
- an ATM cell recovery device including a compressed cell determination unit that determines whether an ATM cell inputted from the ATM cell compression device through a transmission line is a compressed cell, and a cell recovery unit that, when the compressed cell determination unit determines that the ATM cell is a compressed cell, applies a recovery processing to the ATM cell in an ATM layer to recover the compressed cell into a first original ATM cell;

wherein;
- the ATM cell compression device comprises a compression pattern sample storage unit that stores a compression pattern sample of the compression object cell, wherein the compression object cell determination unit determines whether the ATM cell is the compression object cell on the basis of the compression pattern sample stored in the compression pattern sample storage unit, and
- the ATM cell recovery device comprises a recovery pattern sample storage unit that stores a recovery pattern sample of a second original ATM cell corresponding to a compressed cell, wherein, when the compressed cell determination unit determines that the ATM cell is a compressed cell, the cell recovery unit recovers the compressed cell into the first original ATM cell on the basis of the recovery pattern sample stored in the recovery pattern sample storage unit.

13. An ATM cell compression recovery system as claimed in claim 12, wherein:
- the compression pattern sample storage unit is capable of modifying the compression pattern sample stored in the compression pattern sample storage unit, and
- the recovery pattern sample storage unit modifies the recovery pattern sample stored in the recovery pattern sample storage unit, following the modified contents of the compression pattern sample stored in the compression pattern sample storage unit.

14. An ATM cell compression recovery method comprising:
- an ATM cell compression recovery step including: an ATM cell recovery step including a compressed cell determination step that determines whether an ATM cell inputted through a transmission line is a compressed cell, and a cell recovery step that, when the compressed cell determination step determines that the ATM cell is a compressed cell, applies a recovery processing to the ATM cell in an ATM layer to recover the compressed cell into a first original ATM cell;
- a switching step that applies a switching processing to the ATM cell recovered by the ATM cell recovery step; and
- an ATM cell compression step including a compression object cell determination step that determines whether the ATM cell outputted from the switching step is a compression object cell, and a compressed cell production step that, when the compression object cell determination step determines that the ATM cell is the compression object cell, applies a compression processing to the ATM cell an ATM layer to produce a compressed cell,
- an ATM cell compression step including a compression object cell determination step that determines whether an inputted ATM cell is a compression object cell, and a compressed cell production step that, when the compression object cell determination step determines that the ATM cell is the compression object cell, applies a compression processing to the ATM cell in an ATM layer to produce a compressed cell; and
- an ATM cell recovery step including a compressed cell determination step that determines whether an ATM cell produced by the ATM cell compression step and transmitted through a transmission line is a compressed cell, and a cell recovery step that, when the compressed cell determination step determines that the ATM cell is a compressed cell, applies a recovery processing to the ATM cell in an ATM layer to recover the compressed cell into the original ATM cell.

15. An ATM cell compression recovery method as claimed in claim 14, wherein the processings in the ATM cell compression step and the ATM cell recovery step are executed independent of each ATM service category.

16. An ATM cell compression recovery method comprising:

an ATM cell compression step including a compression object cell determination step that determines whether an inputted ATM cell is a compression object cell, and a compressed cell production step that, when the compression object cell detention step determines that the ATM cell is the compression object cell, applies a compression processing to the ATM cell in an ATM layer to produce a compressed cell; and an ATM cell recovery step including a compressed cell determination step that determines whether the compressed ATM cell produced by the ATM cell compression step and transmitted through a transmission line is a compressed cell, and a cell recovery step that, when the compressed cell determination step determines that the compressed ATM cell is a compressed cell, applies a recovery processing to the compressed ATM cell in an ATM layer to recover the compressed cell into a first original ATM cell;

wherein:

the compression object cell determination step determines whether the inputted ATM cell is the compression object cell on the basis of the compression pattern sample, the compressed cell production step causes, when the compression object cell determination step determines that a subsequent ATM cell to the inputted ATM cell determined to be the compression object cell is determined not to be the compression object cell, the subsequent ATM cell to contain the compression pattern sample information corresponding to the inputted ATM cell determined to be the compression object cell to thereby produce the compressed cell, the compressed cell determination step determines whether the compressed ATM cell produced by the ATM cell compression step and transmitted through the transmission line is a compressed cell, on the basis of whether the compressed ATM cell contains the compression pattern sample information, and the cell recovery step recovers, when the compressed cell determination step determines that the compressed ATM cell is a compressed cell, the compressed cell into the first original ATM cell on the basis of the recovery pattern sample of a second original ATM cell corresponding to the compression pattern sample information.

* * * * *